(12) United States Patent
Kawazu et al.

(10) Patent No.: US 11,671,555 B2
(45) Date of Patent: Jun. 6, 2023

(54) IMAGING DEVICE AND IMAGING SYSTEM

(71) Applicant: Sony Semiconductor Solutions Corporation, Kanagawa (JP)

(72) Inventors: Naoki Kawazu, Kanagawa (JP); Masaki Murozuka, Kanagawa (JP); Yuichi Motohashi, Tokyo (JP); Atsushi Suzuki, Kanagawa (JP)

(73) Assignee: Sony Semiconductor Solutions Corporation, Kanagawa (JP)

( * ) Notice: Subject to any disclaimer, the term of this patent is extended or adjusted under 35 U.S.C. 154(b) by 18 days.

(21) Appl. No.: 16/968,123

(22) PCT Filed: Feb. 5, 2019

(86) PCT No.: PCT/JP2019/004033
§ 371 (c)(1),
(2) Date: Aug. 6, 2020

(87) PCT Pub. No.: WO2019/159755
PCT Pub. Date: Aug. 22, 2019

(65) Prior Publication Data
US 2021/0377462 A1 Dec. 2, 2021

(30) Foreign Application Priority Data
Feb. 13, 2018 (JP) .............................. JP2018-023161

(51) Int. Cl.
*H04N 5/33* (2023.01)
*B60R 11/04* (2006.01)
(Continued)

(52) U.S. Cl.
CPC ............... *H04N 5/33* (2013.01); *B60R 11/04* (2013.01); *H04N 5/23241* (2013.01);
(Continued)

(58) Field of Classification Search
CPC ...... H04N 17/002; H04N 5/378; H04N 5/374; H04N 5/23241; H04N 5/33;
(Continued)

(56) References Cited

U.S. PATENT DOCUMENTS

| | | | |
|---|---|---|---|
| 8,736,684 B1 | 5/2014 | Johansson et al. | |
| 2008/0158363 A1* | 7/2008 | Myers | H04N 5/335 |
| | | | 348/187 |
| 2014/0226027 A1* | 8/2014 | Johansson | H04N 17/002 |
| | | | 348/187 |

FOREIGN PATENT DOCUMENTS

| | | | |
|---|---|---|---|
| DE | 10 2011 087132 A1 | 5/2013 | |
| JP | 2006314025 A * | 11/2006 | ........... H04N 5/3741 |

(Continued)

OTHER PUBLICATIONS

International Search Report and Written Opinion dated Apr. 2, 2019 in connection with International Application No. PCT/JP2019/004033.

*Primary Examiner* — Masum Billah
(74) *Attorney, Agent, or Firm* — Wolf, Greenfield & Sacks, P.C.

(57) ABSTRACT

To obtain imaging device capable of reporting more reliably an occurrence of trouble. The imaging device of the present disclosure includes an imaging sensor configured to generate image data, a diagnosis circuit configured to perform diagnosis processing for the imaging sensor and an output circuit configured to output a flag signal corresponding to a result of the diagnosis processing, wherein the flag signal is set to a ground level signal in response to the result of the diagnosis processing indicating an error.

21 Claims, 53 Drawing Sheets

(51) Int. Cl.
  *H04N 5/232* (2006.01)
  *H04N 17/00* (2006.01)
  *B60R 11/00* (2006.01)

(52) U.S. Cl.
  CPC .... *H04N 17/002* (2013.01); *B60R 2011/0026* (2013.01); *B60R 2300/10* (2013.01)

(58) Field of Classification Search
  CPC .. H04N 5/35563; H04N 5/3591; G06V 10/10; G06V 10/96; G06V 20/56; G08G 1/16; A61F 2/3859; A61F 2/3877; A61F 2/389; A61F 2/0059; A61F 2/07; A61F 2/16
  USPC ....................................................... 348/148
  See application file for complete search history.

(56) References Cited

FOREIGN PATENT DOCUMENTS

| | | | | |
|---|---|---|---|---|
| JP | 2016019175 A | 2/2016 | | |
| WO | WO-2017209221 A1 | * | 12/2017 | ....... H01L 27/14618 |

* cited by examiner

FIG. 13
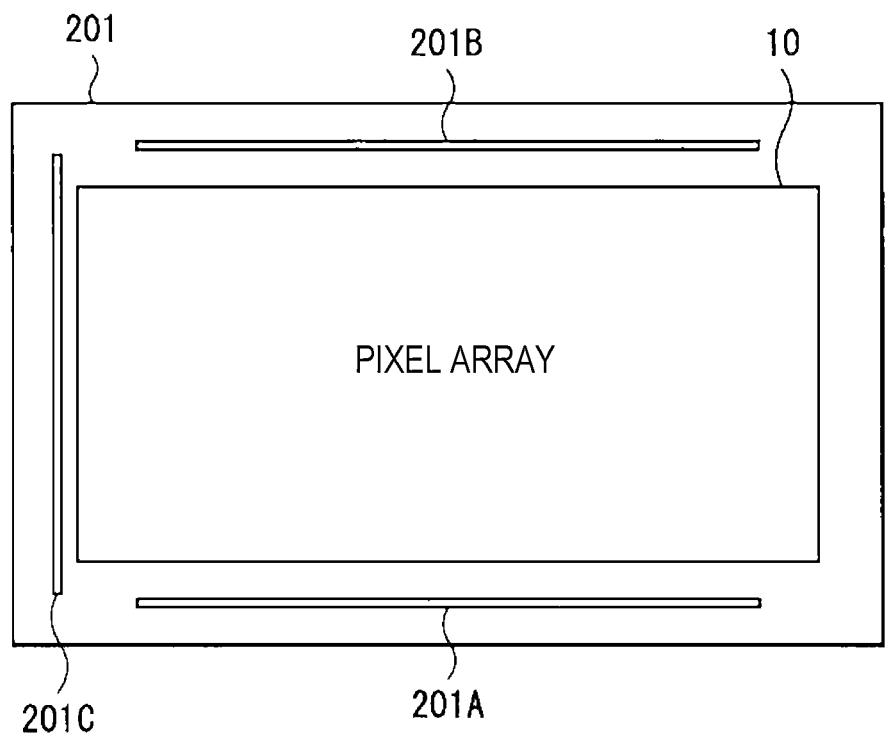
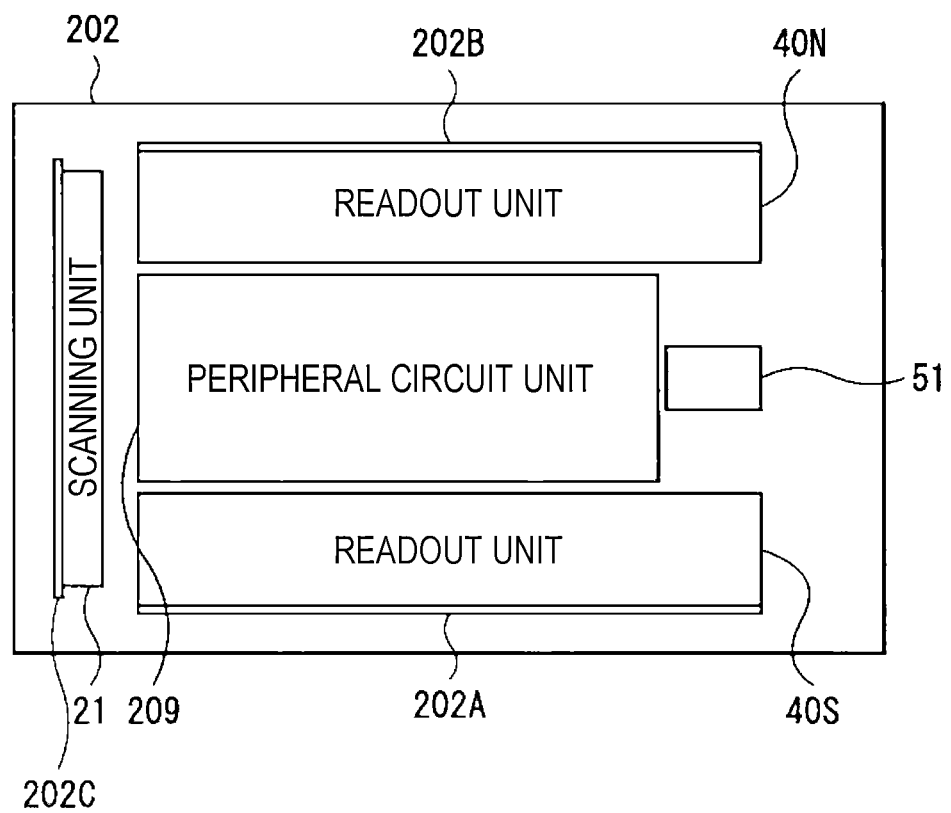

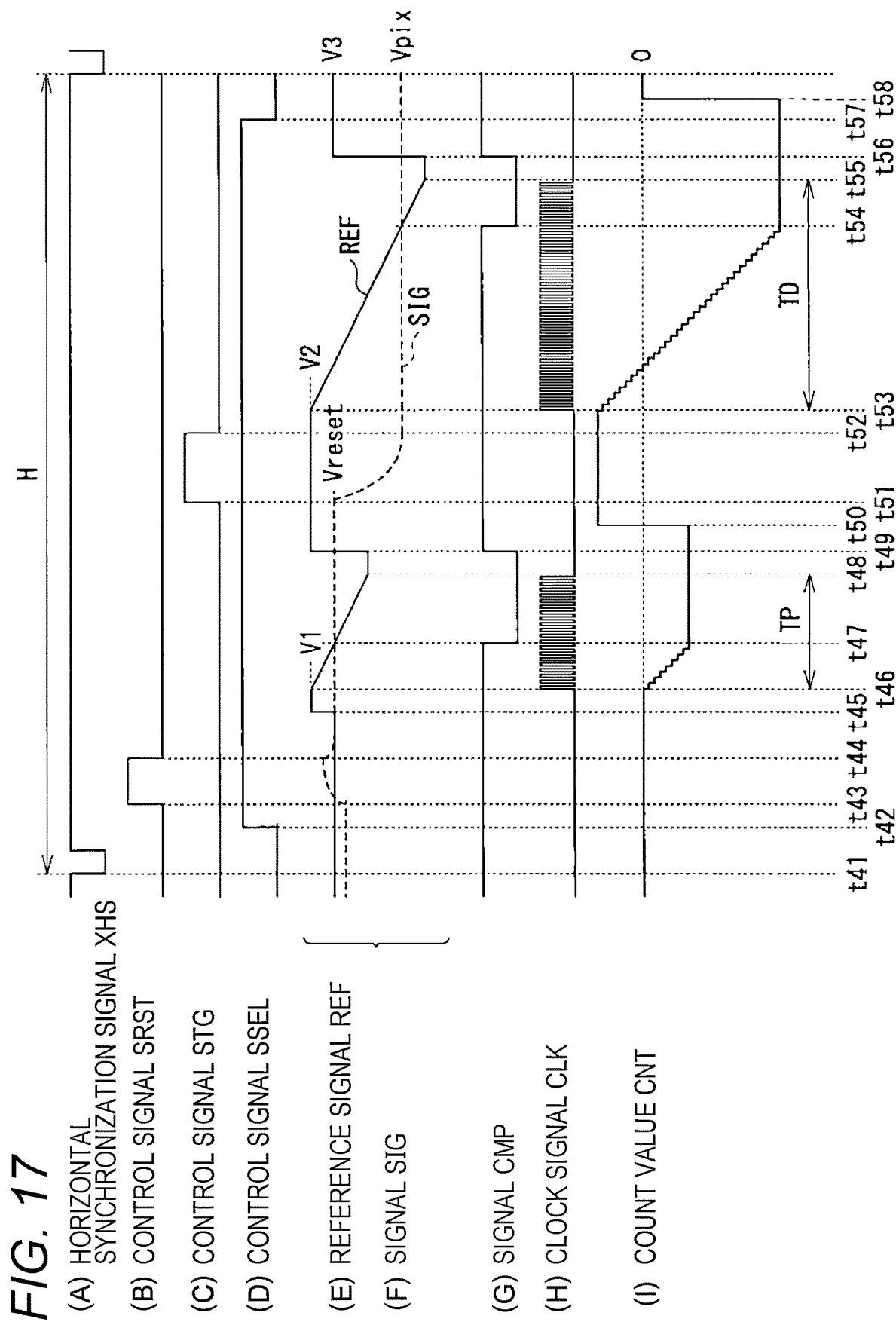

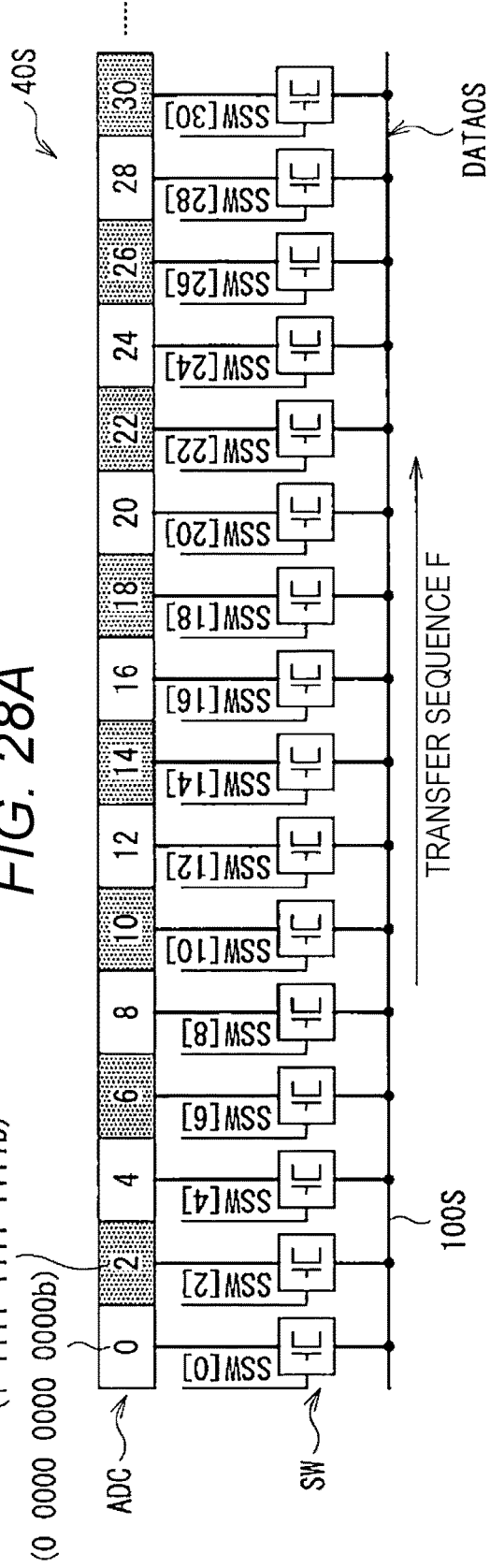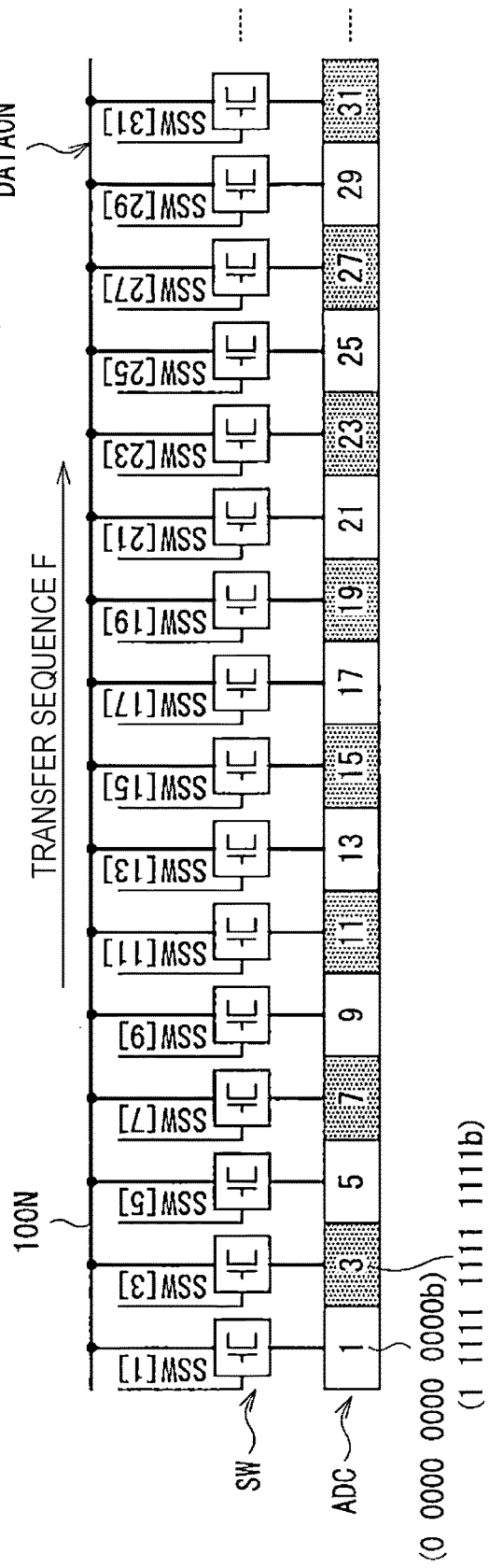

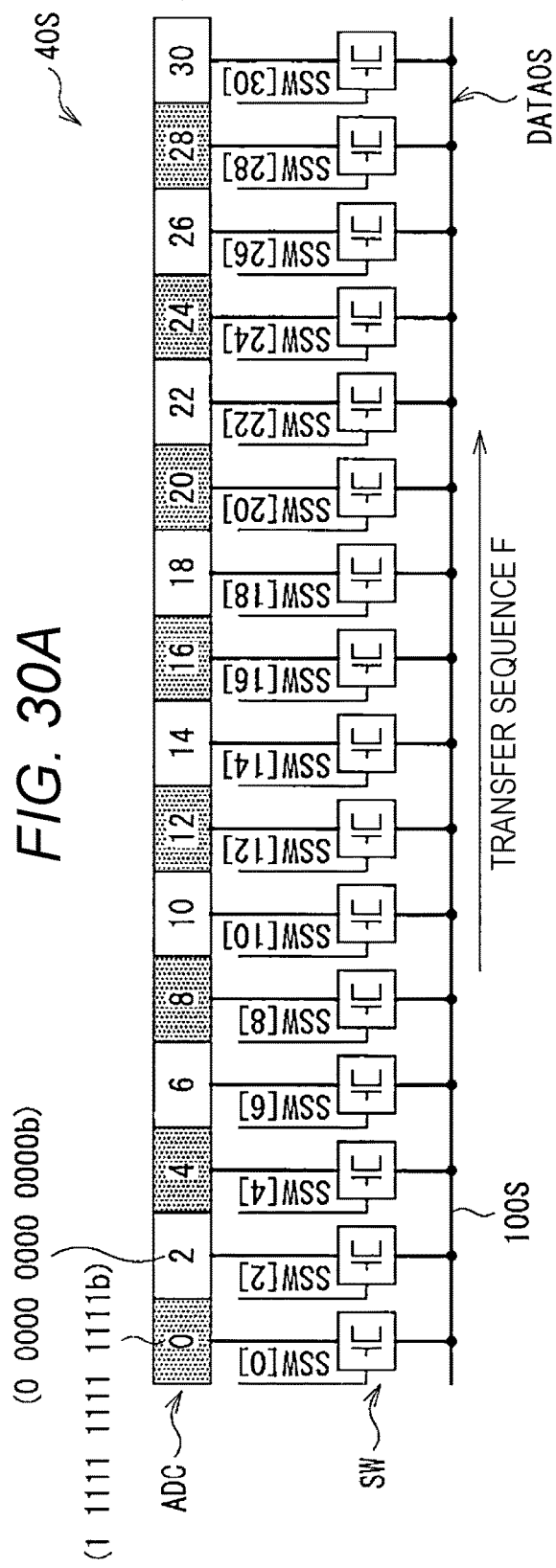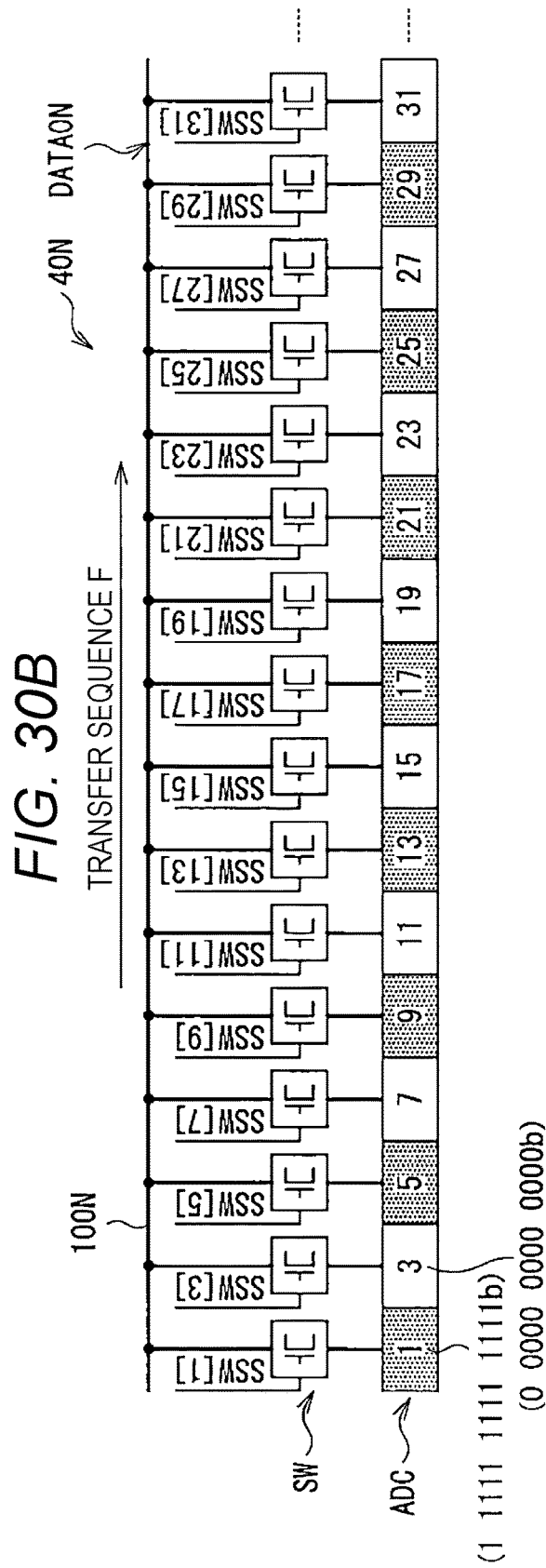

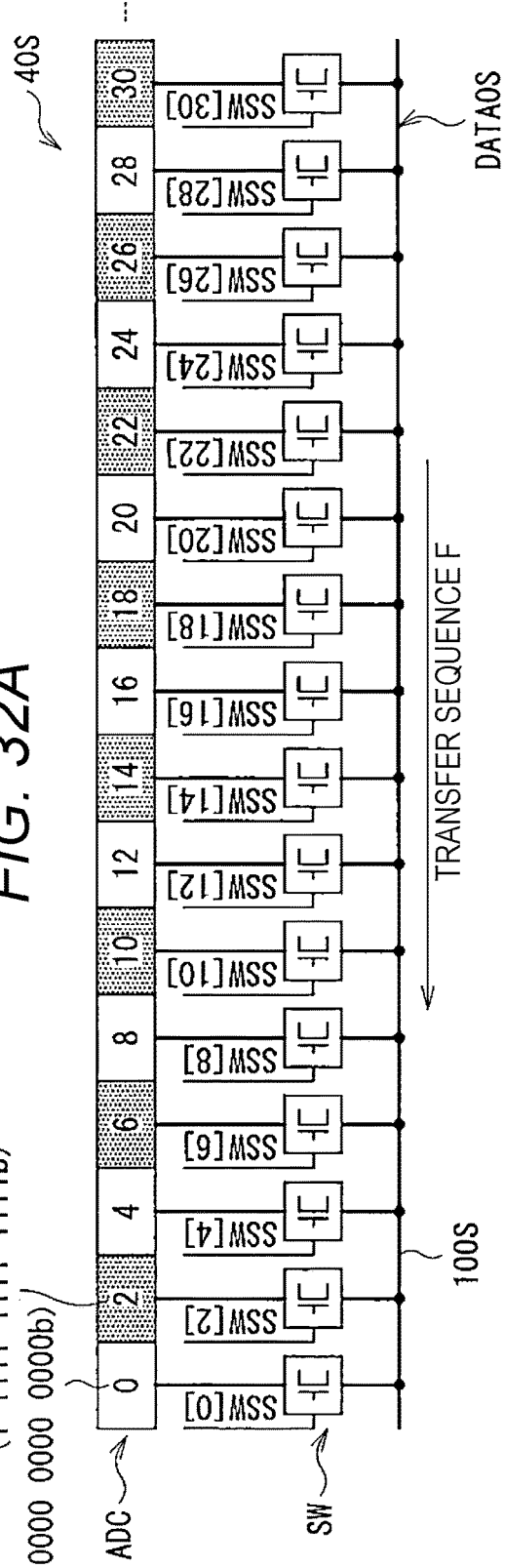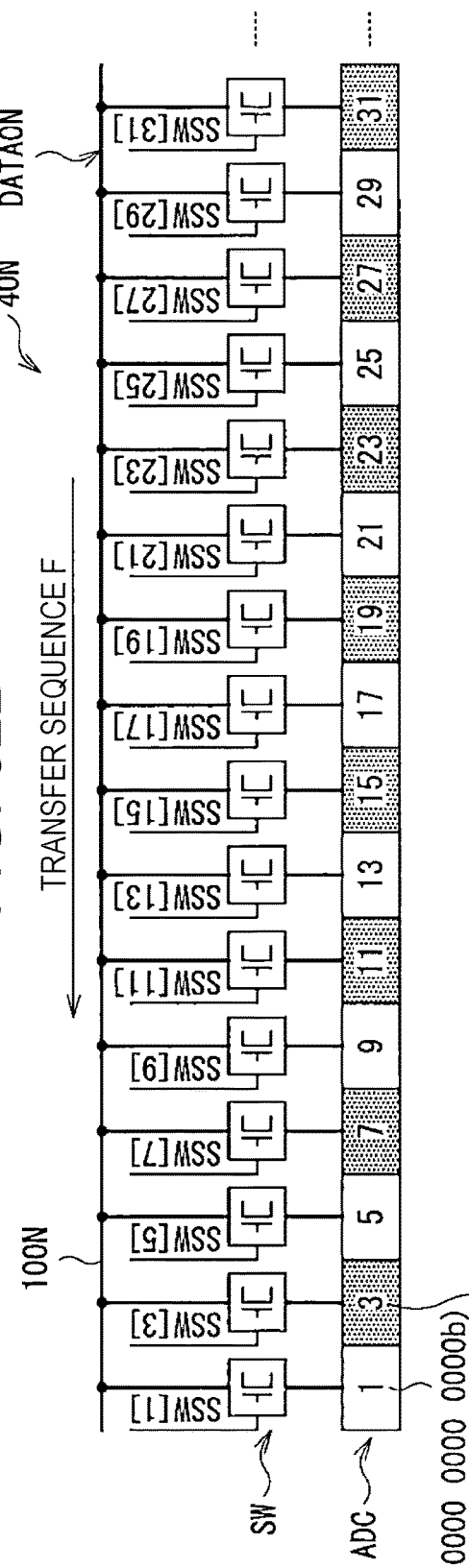

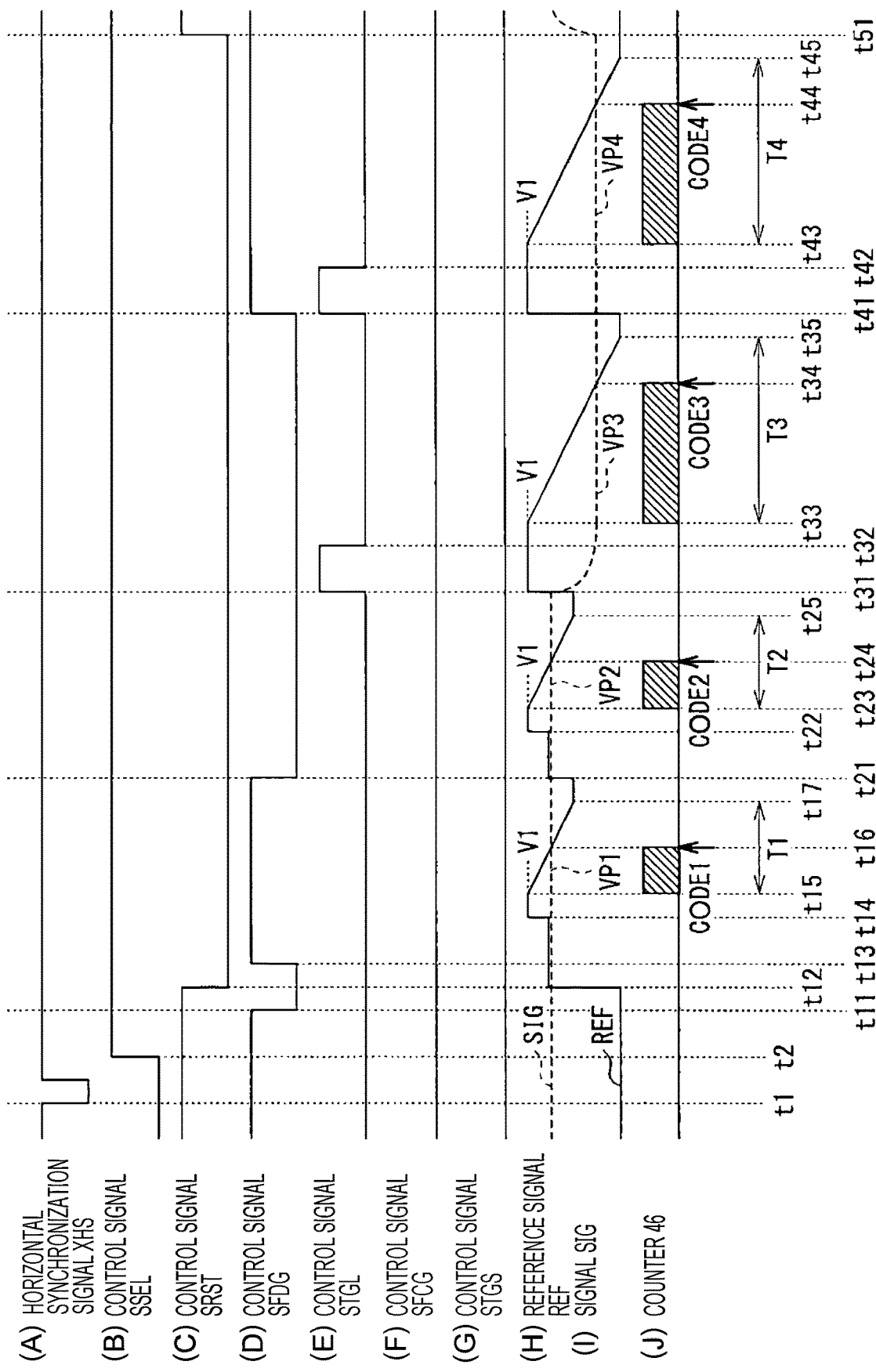

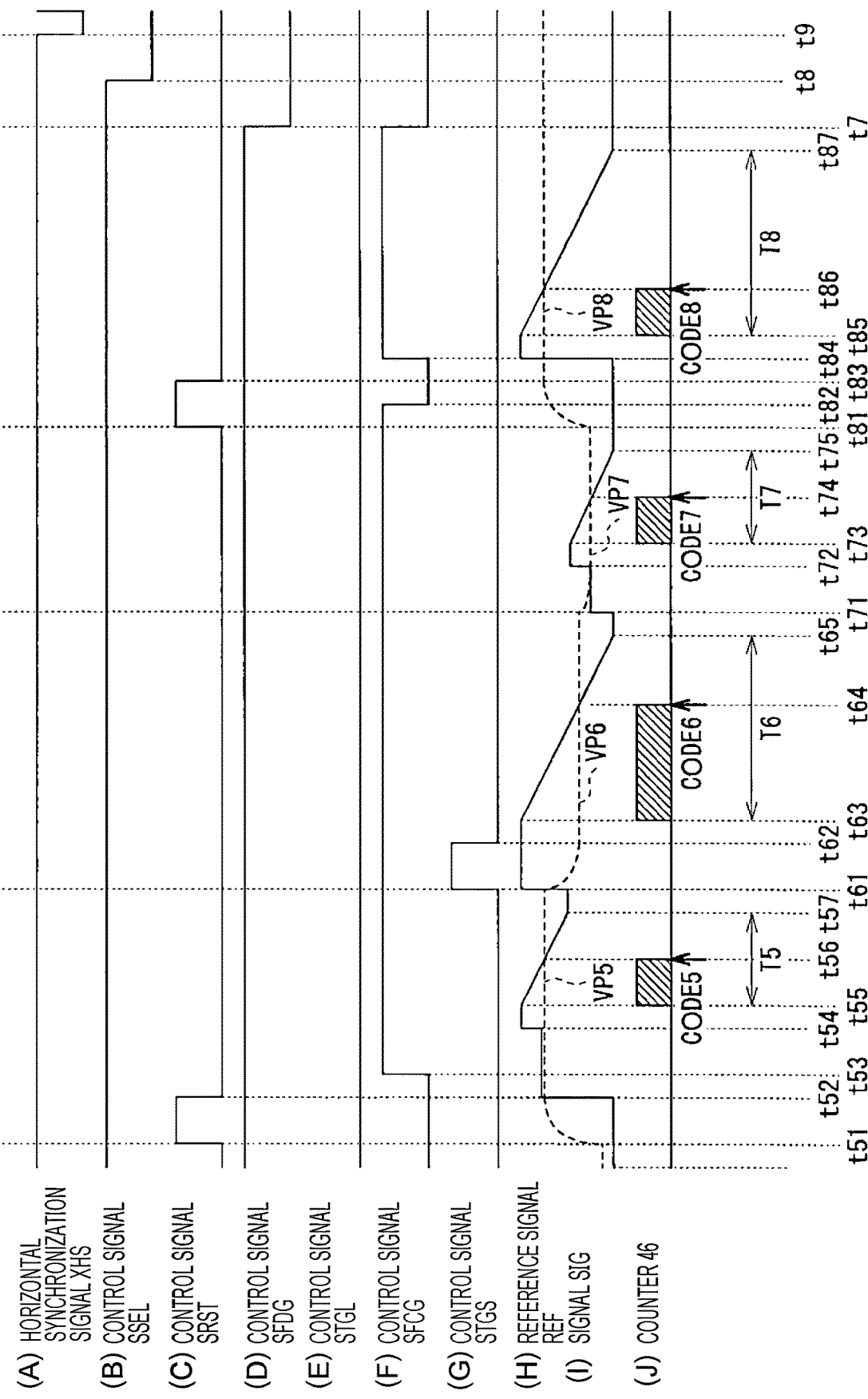

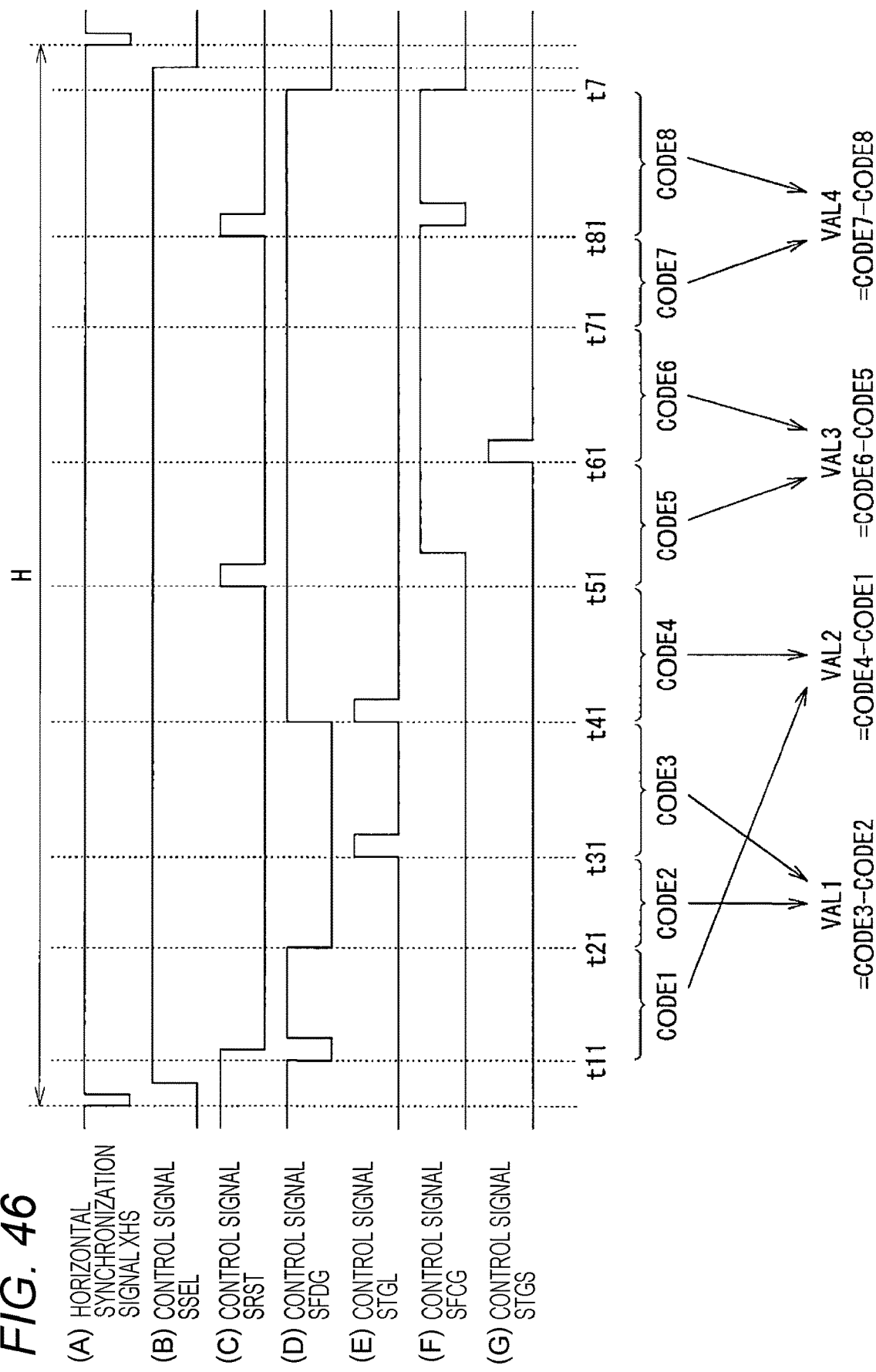

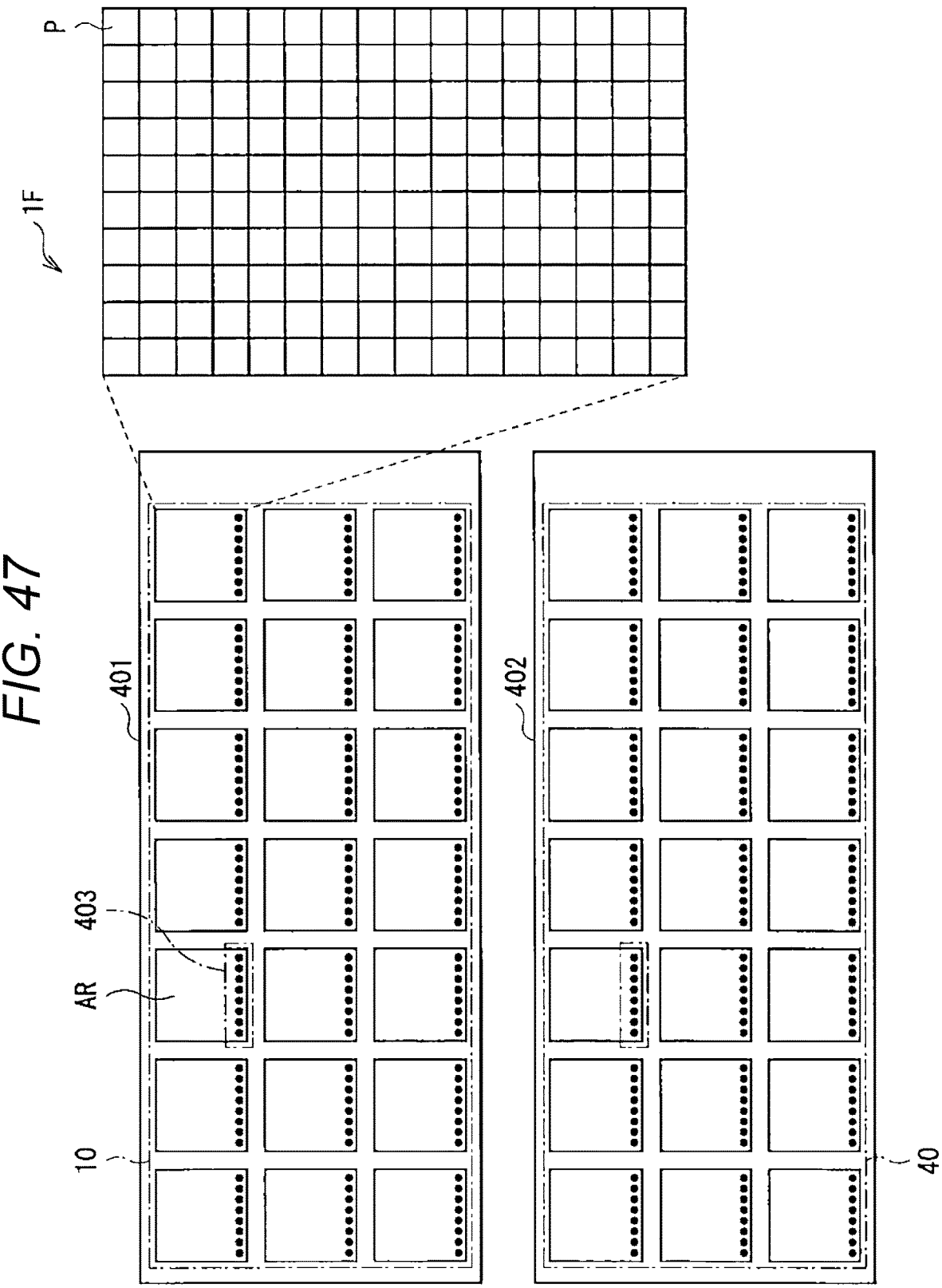

IMAGING DEVICE AND IMAGING SYSTEM

CROSS REFERENCE TO RELATED APPLICATIONS

This application is a national-stage filing under 35 U.S.C. § 371 of International Patent Application No. PCT/JP2019/004033, filed on Feb. 5, 2019, entitled "IMAGING DEVICE AND IMAGING SYSTEM," which claims the benefit of priority of Japanese Patent Application No. JP 2018-023161 filed on Feb. 13, 2018. The contents of each of these earlier applications is incorporated herein by reference in its entirety.

TECHNICAL FIELD

The present disclosure relates to an imaging device that performs an imaging operation, and an imaging system including such an imaging device.

BACKGROUND ART

Some electronic devices detect troubles, in a case where the troubles occur, and report a detection result, for example (e.g., see PTL 1).

CITATION LIST

Patent Literature

PTL 1: JP 2003-522673W

SUMMARY

Technical Problem

It is desired that an electronic device capable of detecting trouble occurred in the electronic device itself can more reliably report the occurrence of trouble. Furthermore, an imaging device is also expected to more reliably report the occurrence of trouble.

It is desirable to provide an imaging device and an imaging system capable of more reliably report the occurrence of trouble.

Solution to Problem

An imaging device according to an embodiment of the present disclosure includes an imaging sensor configured to generate image data, a diagnosis circuit configured to perform diagnosis processing for the imaging sensor and an output circuit configured to output a flag signal corresponding to a result of the diagnosis processing, wherein the flag signal is set to a ground level signal when the result of the diagnosis processing indicates an error.

An imaging system according to an embodiment of the present disclosure includes an imaging device and a monitoring device configured to monitor an operation of the imaging device, wherein the imaging device includes an imaging sensor configured to generate image data, a diagnosis circuit configured to perform diagnosis processing for the imaging sensor, an output circuit configured to output a flag signal corresponding to a result of the diagnosis processing, wherein the flag signal is set to a ground level signal when the result of the diagnosis processing indicates an error, and wherein the monitoring device is configured to monitor the operation of the imaging device based on the flag signal.

A method according to an embodiment of the present disclosure includes performing diagnosis processing for an imaging sensor configured to generate image data and outputting a flag signal corresponding to a result of the diagnosis processing, wherein the flag signal is set to a ground level signal when the result of the diagnosis processing indicates an error.

Advantageous Effects of Invention

In the imaging device and the imaging system according to one embodiment of the present disclosure, since the flag signal is set to the ground level in a case where the result of the diagnosis processing indicates an error, the occurrence of the trouble can be reported more reliably. Note that the effects described herein are not limiting, and any one effect disclosed herein may be obtained.

BRIEF DESCRIPTION OF DRAWINGS

FIG. 13 is an explanatory diagram illustrating an example of another circuit arrangement of the imaging device illustrated in FIG. 1.

FIG. 17 is another timing waveform of another operation example of the imaging device illustrated in FIG. 1.

FIG. 28A is an explanatory diagram of an operation example of the readout unit illustrated in FIG. 7A.

FIG. 28B is an explanatory diagram of another operation example of the readout unit illustrated in FIG. 7B.

FIG. 30A is an explanatory diagram of an operation example of the readout unit illustrated in FIG. 7A.

FIG. 30B is an explanatory diagram of another operation example of the readout unit illustrated in FIG. 7B.

FIG. 32A is an explanatory diagram of another operation example of the readout unit illustrated in FIG. 7A.

FIG. 32B is an explanatory diagram of another operation example of the readout unit illustrated in FIG. 7B.

FIG. 44A is a timing waveform of another operation example of the imaging device according to another modified example.

FIG. 44B is a timing waveform of another operation example of the imaging device according to another modified example.

FIG. 46 is an explanatory diagram of an example of combining images in an imaging device according to another modified example.

FIG. 47 is an explanatory diagram illustrating an implementation example of an imaging device according to another modified example.

DESCRIPTION OF EMBODIMENTS

Hereinafter, embodiments of the present disclosure will be described in detail with reference to the drawings. Note that the description is given in the following order:
1. Embodiment
2. Usage Example of Imaging Device
3. Application Example to Mobile Body

1. Embodiment

CONFIGURATION EXAMPLE

Figure 1:
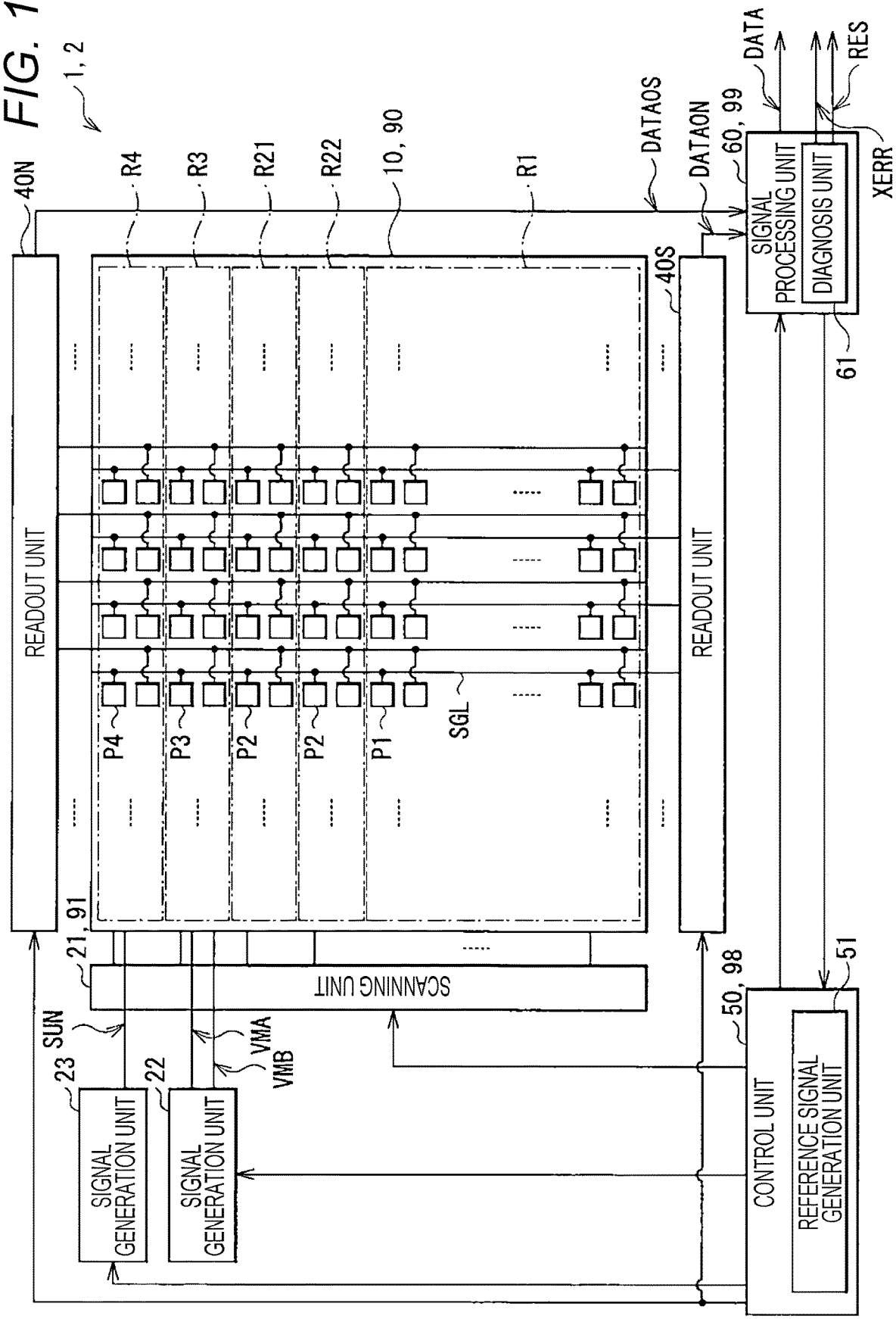
FIG. 1 is a block diagram illustrating a configuration example of an imaging device according to an embodiment of the present disclosure.

FIG. 1 illustrates a configuration example of an imaging device (imaging device 1) according to an embodiment. The imaging device 1 includes a pixel array 10, a scanning unit 21, signal generation units 22 and 23, a readout unit 40 (readout units 40S and 40N), a control unit 50, and a signal processing unit 60. Three power supply voltages VDD (power supply voltages VDDH, VDDM, VDDL) are supplied to the imaging device 1, as described later, and the imaging device 1 operates on the basis of these power supply voltages VDD.

The pixel array 10 includes a plurality of pixels P arranged in a matrix. The plurality of pixels P include a plurality of imaging pixels P1, a plurality of light shielding pixels P2, a plurality of dummy pixels P3, and a plurality of dummy pixels P4. The imaging pixels P1 each include a photodiode and generate a pixel voltage Vpix corresponding to the amount of received light. The light shielding pixels P2 are shielded pixels for detecting dark current of the photodiodes, as described later. The dummy pixels P3 and P4 are pixels with which no photodiodes are provided. In the pixel array 10, a normal pixel region R1, light shielding pixel regions R21 and R22, and dummy pixel regions R3 and R4 are provided. The plurality of imaging pixels P1 are arranged in the normal pixel region R1, the plurality of light shielding pixels P2 are arranged in the light shielding pixel regions R21 and R22, the plurality of dummy pixels P3 are arranged in the dummy pixel region R3, and the plurality of dummy pixels P4 are arranged in the dummy pixel region R4. In this example, the dummy pixel region R4, the dummy pixel region R3, the light shielding pixel region R21, the light shielding pixel region R22, and the normal pixel region R1 are arranged in this order in the pixel array 10 vertically from top to bottom (vertical direction in FIG. 1).

The pixel array 10 includes a plurality of signal lines SGL (4,096 signal lines SGL(0) to SGL(4095) in this example) extending vertically (vertical direction in FIG. 1). The plurality of signal lines SGL are arranged to pass through the normal pixel region R1, the light shielding pixel regions R21 and R22, and the dummy pixel regions R3 and R4. In this example, one column of pixels P and two signal lines SGL are alternately arranged horizontally (in the horizontal direction in FIG. 1). Even-numbered signal lines SGL (SGL(0), SGL(2), . . . ) are connected to the readout unit 40S, while odd-numbered signal lines SGL (SGL(1), SGL(3), . . . ) are connected to the readout unit 40N.

In the following, the normal pixel region R1, the light shielding pixel regions R21 and R22, and the dummy pixel regions R3 and R4 will be described.

Figure 2:
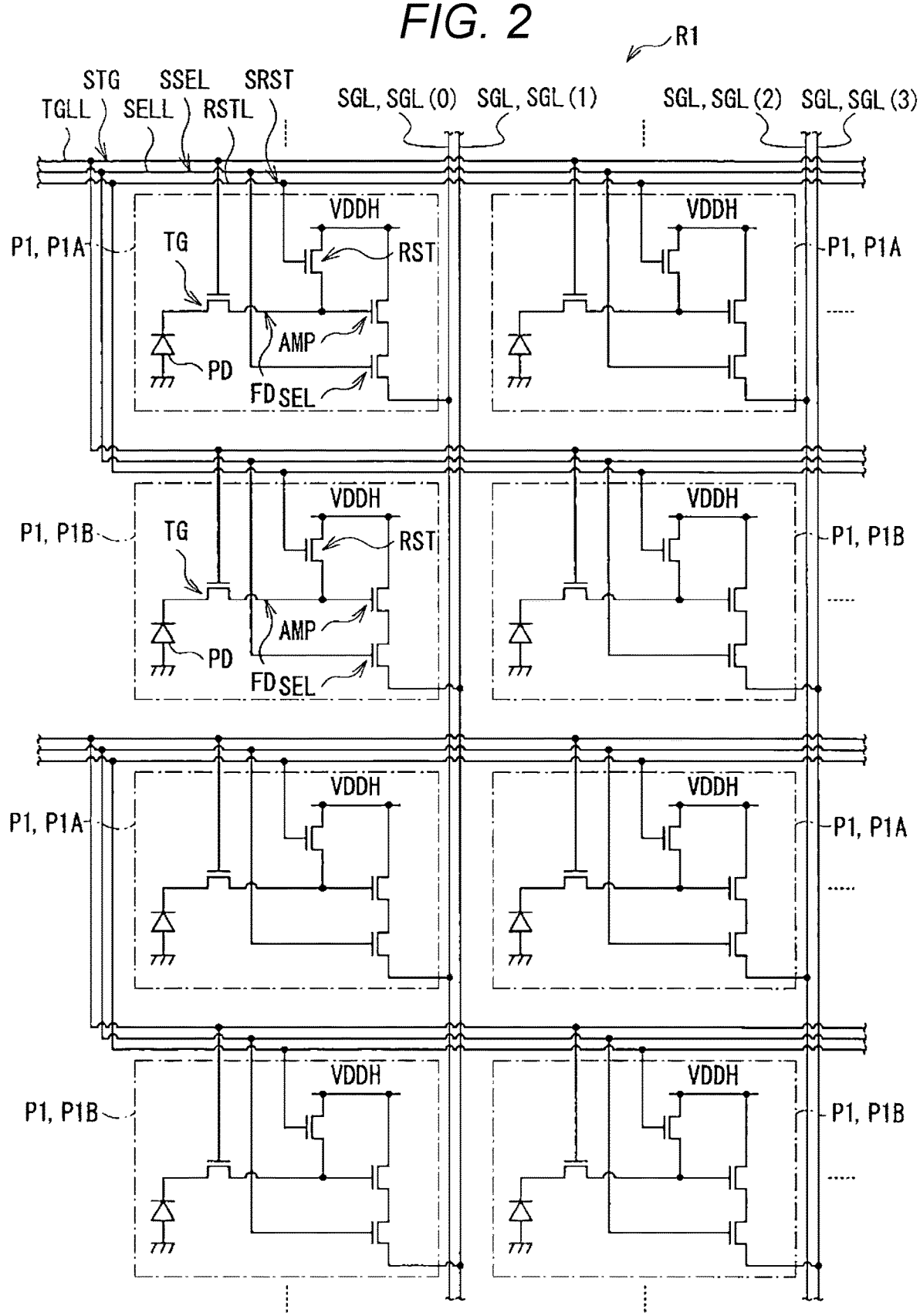
FIG. 2 is a circuit diagram illustrating a configuration example of a pixel array illustrated in FIG. 1.

FIG. 2 illustrates a configuration example of the normal pixel region R1. In the normal pixel region R1, the pixel array 10 includes a plurality of control lines TGLL, a plurality of control lines SELL, and a plurality of control lines RSTL. The control lines TGLL extend horizontally (in the horizontal direction in FIG. 2), and a control signal STG is applied to each of the control lines TGLL from the scanning unit 21. The control line SELL extends horizontally, and a control signal SSEL is applied to each of the control lines SELL from the scanning unit 21. The control line RSTL extends horizontally, and a control signal SRST is applied to each of the control lines RSTL from the scanning unit 21.

The plurality of imaging pixels P1 include a plurality of imaging pixels P1A and a plurality of imaging pixels P1B. The imaging pixels P1A and the imaging pixels P1B are in the identical circuit configuration. The imaging pixels P1A and P1B are alternately arranged vertically (vertical direction in FIG. 2).

The imaging pixels P1 (imaging pixels P1A and P1B) each include a photodiode PD and transistors TG, RST, AMP, and SEL. In this example, the transistors TG, RST, AMP, and SEL are N-type metal oxide semiconductor (MOS) transistors.

The photodiode PD is a photoelectric conversion element that generates electric charges in an amount corresponding to the amount of received light and accumulates the electric charges therein. The anode of the photodiode PD is grounded, and the cathode of the photodiode PD is connected to the source of the transistor TG.

The transistor TG has its gate connected to the control line TGLL, its source connected to the cathode of the photodiode PD, and its drain connected to a floating diffusion FD. The gate of the transistor TG of the imaging pixel P1A and the gate of the transistor TG of the imaging pixel P1B under the imaging pixel P1A are connected to the same control line TGLL.

The floating diffusion FD accumulates the electric charge supplied from the photodiode PD, and is configured using, for example, a diffusion layer formed on the surface of a semiconductor substrate.

With this configuration, the transistor TG of each imaging pixel P1 is turned on, on the basis of the control signal STG, and the electric charge generated in the photodiode PD of the imaging pixel P1 is transferred to the floating diffusion FD (electric charge transfer operation).

The transistor RST has its gate connected to the control line RSTL, its drain supplied with the power supply voltage VDDH, and its source connected to the floating diffusion FD. The gate of the transistor RST of one imaging pixel P1A and the gate of the transistor RST of another imaging pixel P1B located under the one imaging pixel P1A are connected to the same control line RSTL.

With this configuration, before the transfer of the electric charge from the photodiode PD to the floating diffusion FD in each imaging pixel P1, the transistor RST is turned on, on the basis of the control signal SRST, and the power supply voltage VDDH is supplied to the floating diffusion FD. As a result, in each imaging pixel P1, the voltage of the floating diffusion FD is reset (reset operation).

The transistor AMP has its gate connected to the floating diffusion FD, its drain supplied with the power supply voltage VDDH, and its source connected to the drain of the transistor SEL.

The transistor SEL has its gate connected to the control line SELL, its drain connected to the source of the transistor AMP, and its source connected to the signal line SGL. The source of the transistor SEL of the imaging pixel P1A is connected to the even-numbered signal line SGL (e.g., the signal line SGL(0)), the source of the transistor SEL of the imaging pixel P1B is connected to the odd-numbered signal line SGL (e.g., the signal line SGL(1)).

With this configuration, the transistor SEL is turned on in each of the imaging pixels P1 (imaging pixels P1A and P1B), whereby the transistor AMP is connected to a current source 44 (which is described later) of the readout unit 40. As a result, the transistor AMP operates as a so-called source follower, and outputs a voltage corresponding to the voltage of the floating diffusion FD as a signal SIG to the signal line SGL via the transistor SEL. Specifically, in a pre-charge phase (P-phase) period TP after the voltage of the floating diffusion FD is reset, the transistor AMP outputs reset voltage Vreset corresponding to the voltage of the floating diffusion FD at that time as the signal SIG. In addition, in a data phase (D-phase) period TD after the electric charge is transferred from the photodiode PD to the floating diffusion FD, the transistor AMP supplies pixel voltage Vpix corresponding to the voltage of the floating diffusion FD at that time and the amount of received light, as the signal SIG.

Next, the light shielding pixel regions R21 and R22 will be described. As illustrated in FIG. 1, two rows of light shielding pixels P2 are arranged in the light shielding pixel region R21, and two rows of light shielding pixels P2 are arranged in the light shielding pixel region R22. The light shielding pixel region R21 will be described below as an example, as the light shielding pixel regions R21 and R22 are in the similar configuration.

Figure 3:
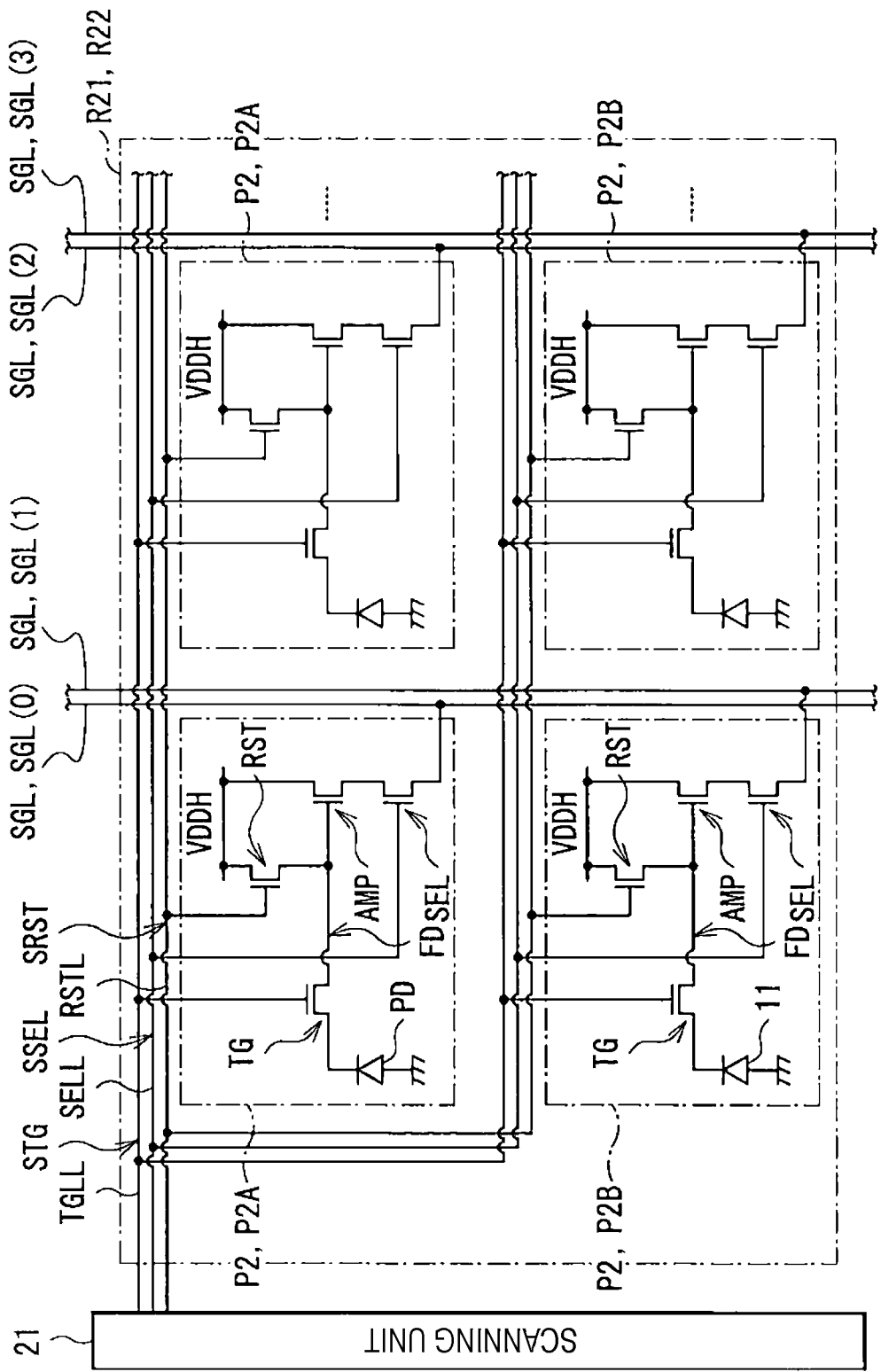
FIG. 3 is a circuit diagram illustrating another configuration example of the pixel array illustrated in FIG. 1.

FIG. 3 illustrates a configuration example of the light shielding pixel region R21. Note that in FIG. 3, the scanning unit 21 is also illustrated in addition to the light shielding pixel region R21 of the pixel array 10. The pixel array 10 includes the control line TGLL, the control line SELL, and the control line RSTL in the light shielding pixel region R21. The control line TGLL extends horizontally (in the horizontal direction in FIG. 3), and the control signal STG is applied to the control line TGLL from the scanning unit 21. The control line SELL extends horizontally, and a control signal SSEL is applied to each of the control lines SELL from the scanning unit 21. The control line RSTL extends horizontally, and a control signal SRST is applied to each of the control lines RSTL from the scanning unit 21.

The plurality of light shielding pixels P2 include a plurality of light shielding pixels P2A and a plurality of light shielding pixels P2B. The light shielding pixels P2A and the light shielding pixels P2B are in the same circuit configuration. The light shielding pixels P2A are pixels in the upper row of the two rows of the light shielding pixels P2 and the light shielding pixels P2B are pixels in the lower row of the two rows of the light shielding pixels P2.

The light shielding pixels P2 (light shielding pixels P2A and P2B) each include a photodiode PD and transistors TG, RST, AMP and SEL. The light shielding pixels P2 are in the same circuit configuration as that of the imaging pixels P1 (FIG. 2), but are shielded, unlike the imaging pixels P1, from light to prevent light from entering the photodiode PD.

With this configuration, in each of the light shielding pixels P2 (light shielding pixels P2A and P2B), similarly to the imaging pixels P1, the transistor SEL is turned on, so that the transistor AMP outputs the signal SIG corresponding to the voltage of the floating diffusion FD to the signal line SGL via the transistor SEL. Since the light shielding pixels P2 are shielded from light, the voltage of the floating diffusion FD in the D-phase period TD becomes a voltage corresponding to the dark current of the photodiode PD. Therefore, in the D-phase period TD, the transistor AMP outputs the pixel voltage Vpix corresponding to the dark current as the signal SIG.

Next, the dummy pixel regions R3 and R4 will be described. As illustrated in FIG. 1, two rows of dummy pixels P3 are arranged in the dummy pixel region R3, and two rows of dummy pixels P4 are arranged in the dummy pixel region R4.

Figure 4:
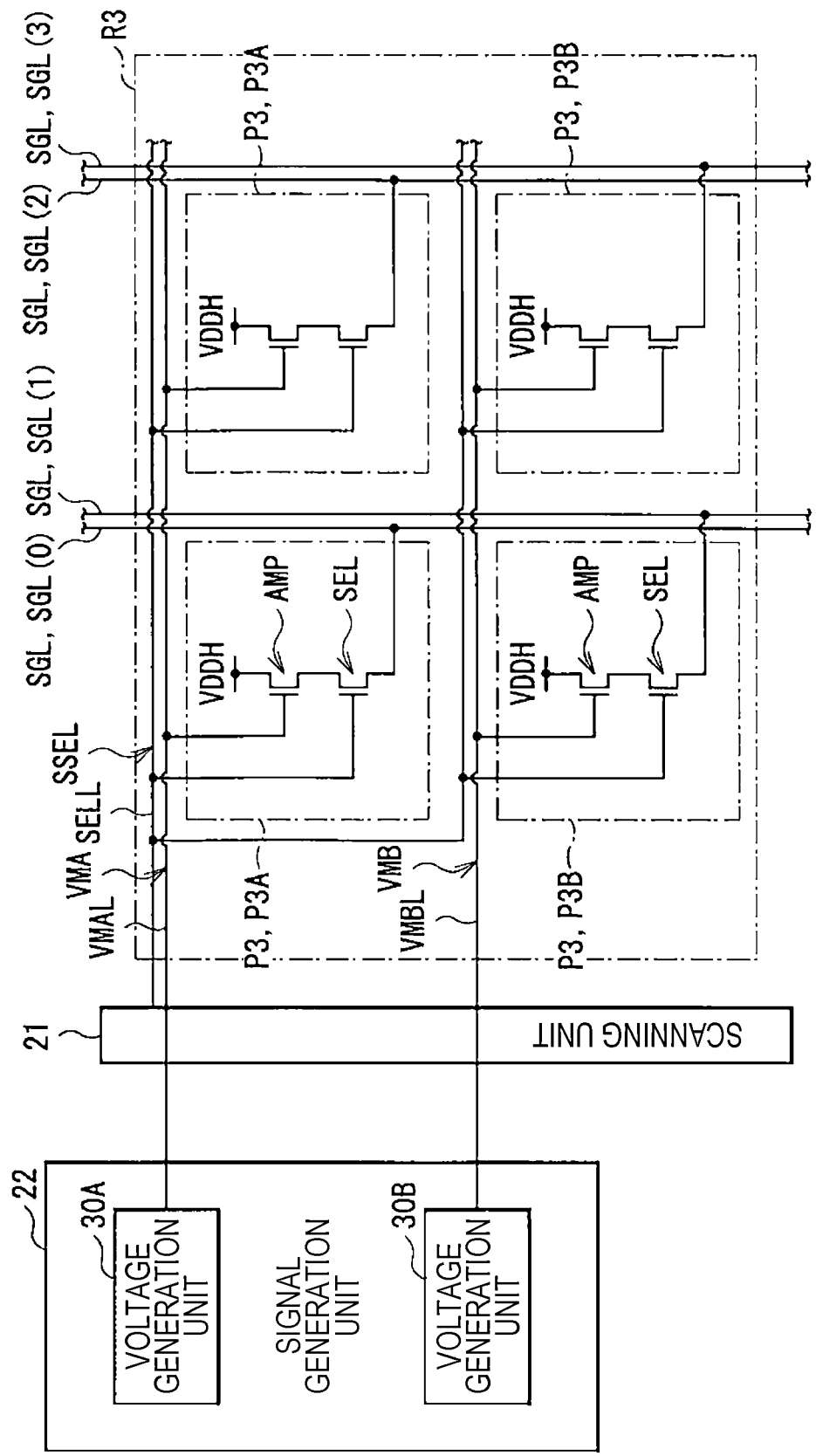
FIG. 4 is a circuit diagram illustrating another configuration example of the pixel array illustrated in FIG. 1.

FIG. 4 illustrates a configuration example of the dummy pixel region R3. Note that in FIG. 4, the scanning unit 21 and the signal generation unit 22 are also illustrated in addition to the dummy pixel region R3 of the pixel array 10. In the dummy pixel region R3, the pixel array 10 includes the control line SELL, a control line VMAL, and a control line VMBL. The control line SELL extends horizontally (in the horizontal direction in FIG. 4), and the control signal SSEL is applied to the control line SELL from the scanning unit 21. The control line VMAL extends horizontally, and the control signal VMA is applied to the control line VMAL by a voltage generation unit 30A (which is described later) of the signal generation unit 22. The control line VMBL extends horizontally, and the control signal VMB is applied to the control line VMBL from the voltage generation unit 30B (which is described later) of the signal generation unit 22.

The plurality of dummy pixels P3 include a plurality of dummy pixels P3A and a plurality of dummy pixels P3B. The dummy pixels P3A and the dummy pixels P3B are in the same circuit configuration. The dummy pixel P3A is a pixel on the upper row of the two rows of the dummy pixels P3 and the dummy pixel P3B is a pixel on the lower row of the two rows of the dummy pixels P3.

The dummy pixels P3 (dummy pixels P3A and P3B) include the transistors AMP and SEL. In other words, the dummy pixels P3 are obtained by eliminating the photodiodes PD and the transistors TG and RST from the imaging pixels P1 (FIG. 2).

In each dummy pixel P3A, the transistor AMP has its gate connected to the control line VMAL, its drain supplied with the power supply voltage VDDH, and its source connected to the drain of the transistor SEL. The transistor SEL has its gate connected to the control line SELL, its drain is connected to the source of the transistor AMP, and its source connected to the even-numbered signal line SGL (e.g., the signal line SGL(0)).

In each dummy pixel P3B, the transistor AMP has its gate connected to the control line VMBL, its drain supplied with the power supply voltage VDDH, and its source connected to the drain of the transistor SEL. The transistor SEL has its gate connected to the control line SELL, its drain is connected to the source of the transistor AMP, and its source connected to the odd-numbered signal line SGL (e.g., the signal line SGL(1)).

With this configuration, in each of the dummy pixels P3A, the transistor SEL is turned on, so that the transistor AMP outputs the signal SIG corresponding to the voltage of the control signal VMA in the P-phase period TP and the D-phase period TD to the signal line SGL via the transistor SEL. Similarly, in each of the dummy pixels P3B, the transistor SEL is turned on, so that the transistor AMP supplies the signal SIG corresponding to the voltage of the control signal VMB in the P-phase period TP and the D-phase period TD to the signal line SGL via the transistor SEL.

Figure 5:
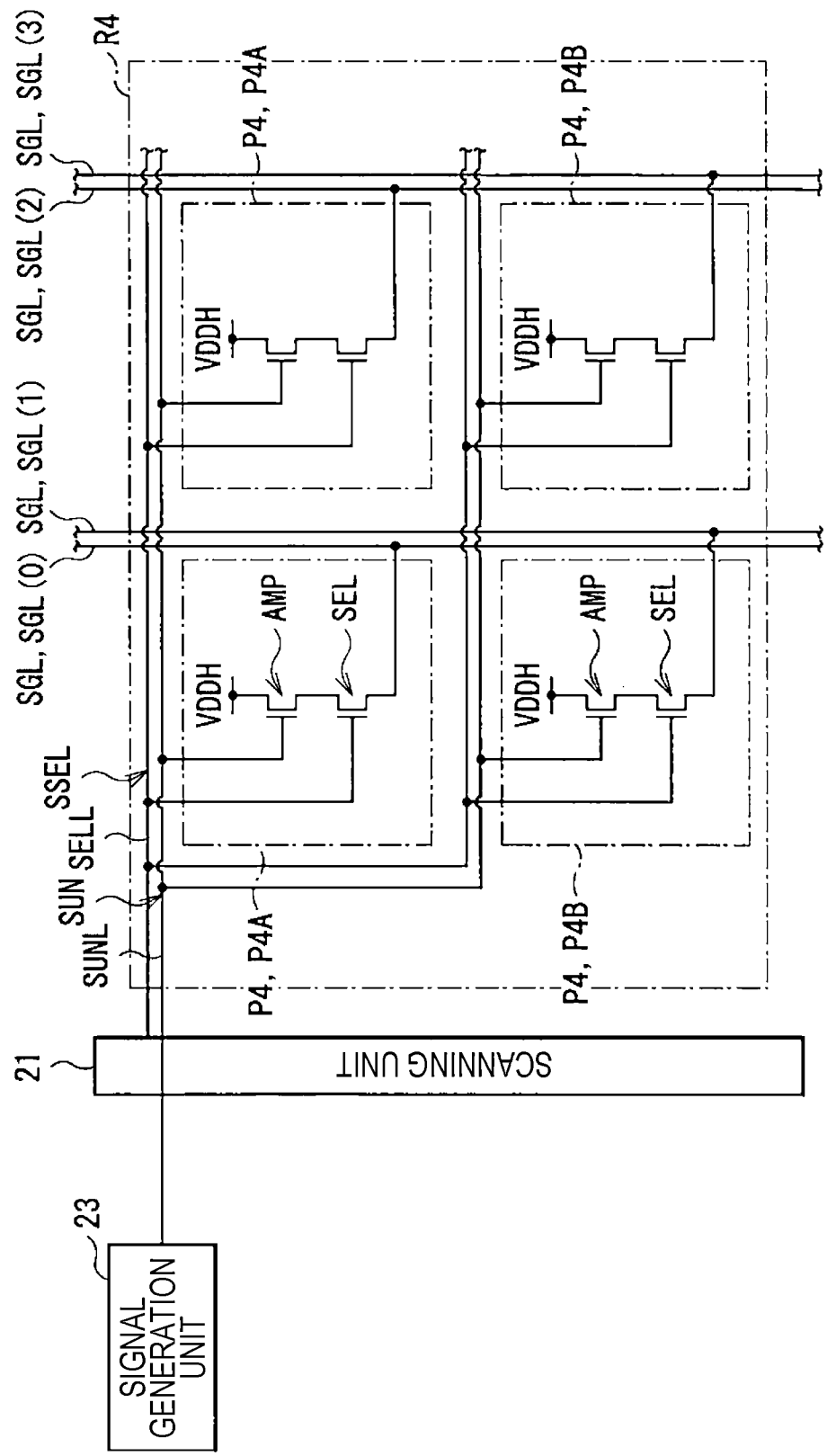
FIG. 5 is a circuit diagram illustrating another configuration example of the pixel array illustrated in FIG. 1.

FIG. 5 illustrates a configuration example of the dummy pixel region R4. Note that in FIG. 5, the scanning unit 21 and the signal generation unit 23 are also illustrated in addition to the dummy pixel region R4 of the pixel array 10. The pixel array 10 includes the control line SELL and the control line SUNL in the dummy pixel region R4. The control line SELL extends horizontally (in the horizontal direction in FIG. 5), and the control signal SSEL is applied to the control line SELL from the scanning unit 21. The control line SUNL extends horizontally, and the control signal SUN is applied to the control line SUNL from the signal generation unit 23.

The plurality of dummy pixels P4 include a plurality of dummy pixels P4A and a plurality of dummy pixels P4B. The dummy pixels P4A and the dummy pixels P4B are in the same circuit configuration. The dummy pixels P4A are the pixels on the upper row of the two rows of the dummy pixels P4 and the dummy pixels P4B are the pixels on the lower row of the two rows of the dummy pixels P4.

The dummy pixels P4 (dummy pixels P4A and P4B) each include the transistors AMP and SEL. The dummy pixels P4 are in the same circuit configuration as the dummy pixels P3 (FIG. 4). The transistor AMP has its gate connected to the control line SUNL, its drain supplied with the power supply voltage VDDH, and the source is connected to the drain of the transistor SEL. The transistor SEL has its gate connected to the control line SELL, its drain connected to the source of the transistor AMP, and its source connected to the signal line SGL. The transistor SEL of the dummy pixel P4A has its source connected to the even-numbered signal line SGL (e.g., the signal line SGL(0)), the transistor SEL of the dummy pixel P4B has its source connected to the odd-numbered signal line SGL (e.g., the signal line SGL(1)).

In the dummy pixels P4, the transistor SEL is turned on in a case where the imaging pixel P1 in the normal pixel region R1, the light shielding pixel P2 in the light shielding pixel regions R21 and R22, and the dummy pixel P3 in the dummy pixel region R3 are selected as reading targets, as will be described later. Then, for example, in a case where the imaging device 1 shoots an image of a very bright subject, the dummy pixels P4 output the voltage corresponding to the voltage of the control signal SUN to the signal line SGL via the transistor SEL in a predetermined period before the P-phase period TP. As a result, in shooting a very bright subject, the dummy pixels P4 are configured to limit the voltage of the signal SIG so that the voltage of the signal SIG does not become excessively low in a predetermined period before the P-phase period TP, as will be described later.

The scanning unit 21 (FIG. 1) sequentially drives a plurality of imaging pixels P1 in the normal pixel region R1 on the basis of the instruction from the control unit 50, and is configured to include, for example, an address decoder and a driver. The address decoder selects the pixel line L corresponding to the address indicated by the address signal in the pixel array 10 on the basis of the address signal supplied from the control unit 50. The driver generates control signals SRST, STG, and SSEL on the basis of the instruction from the address decoder.

Specifically, the scanning unit 21 sequentially applies the control signal SRST to the plurality of control lines RSTL in the normal pixel region R1, the control signal STG to the plurality of control lines TGLL, and the control signal SSEL to the plurality of control lines SELL.

In addition, as will be described later, the scanning unit 21 also has a function of driving the plurality of light shielding pixels P2 in the light shielding pixel regions R21 and R22 and the plurality of dummy pixels P3 in the dummy pixel region R3 in a blanking period T20.

Furthermore, as will be described later, the scanning unit 21 also has a function of driving the dummy pixels P4 in the dummy pixel region R4 in a case where the imaging pixels P1 in the normal pixel region R1, the light shielding pixels P2 in the light shielding pixel regions R21 and R22, and the dummy pixels P3 in the dummy pixel region R3 are selected as the reading targets.

The scanning unit 21 operates on the basis of the power supply voltage VDDH and the power supply voltage VDDL of the three supplied power supply voltages VDD.

The signal generation unit 22 applies a control signal VMA to the control line VMAL in the pixel array 10 and a control signal VMB to the control line VMBL on the basis of the instruction from the control unit 50. As illustrated in FIG. 4, the signal generation unit 22 includes two voltage generation units 30 (voltage generation units 30A and 30B). The voltage generation unit 30A will be described below as an example, as the voltage generation units 30A and 30B are in the same circuit configuration.

Figure 6:
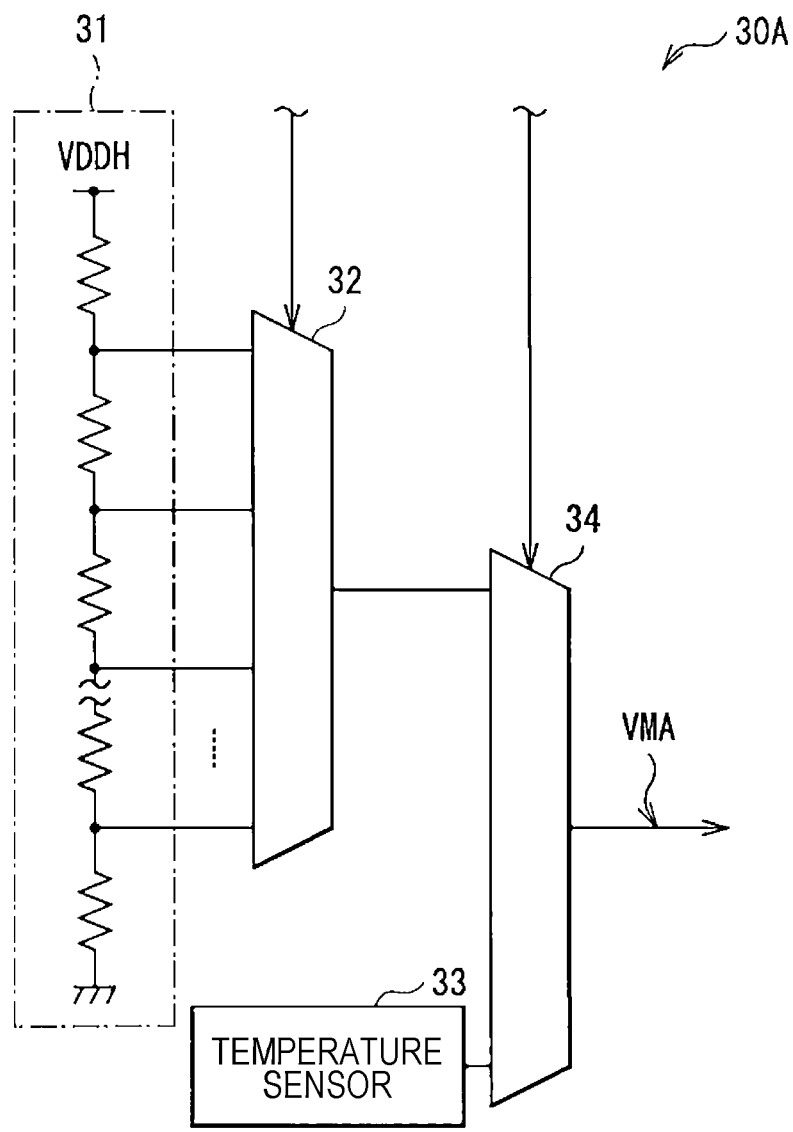
FIG. 6 is a circuit diagram illustrating a configuration example of a voltage generation unit illustrated in FIG. 4.

FIG. 6 illustrates a configuration example of the voltage generation unit 30A. The voltage generation unit 30A includes a resistance circuit section 31, a selector 32, a temperature sensor 33, and a selector 34. The resistance circuit section 31 includes a plurality of resistance elements connected in series, and generates a plurality of voltages by dividing the power supply voltage VDDH. The selector 32 selects and outputs one of the plurality of voltages generated in the resistance circuit section 31 on the basis of the control signal supplied from the control unit 50. The temperature sensor 33 detects temperature and generates a voltage Vtemp corresponding to the detected temperature. On the basis of the control signal supplied from the control unit 50, the selector 34 selects the voltage supplied from the selector 32 or the voltage Vtemp supplied from the temperature sensor 33 and outputs the selected voltage as the control signal VMA.

Control signals are individually supplied from the control unit 50 to the voltage generation units 30A and 30B. As a result, the voltage generation units 30A and 30B can generate the same control signals VMA and VMB, or can generate different control signals VMA and VMB.

The signal generation unit 23 (FIG. 1) applies the control signal SUN to the control line SUNL in the pixel array 10 on the basis of the instruction from the control unit 50. As will be described later, the control signal SUN is provided to limit the voltage of the signal SIG so that the voltage of the signal SIG does not become excessively low in a predetermined period before the P-phase period TP in a case where the imaging device 1 shoots a very bright subject.

The readout unit 40 (readout units 40S and 40N) performs AD conversion on the basis of the signal SIG supplied from the pixel array 10 via the signal line SGL to generate the image signal DATA0 (image signals DATA0S and DATA0N). The readout unit 40S is connected to even-numbered signal lines SGL (signal lines SGL(0), SGL(2), SGL(4), . . . ), and is disposed, in this example, under the pixel array 10 in the vertical direction (vertical direction in FIG. 1). The readout unit 40N is connected to odd-numbered signal lines SGL (signal lines SGL(1), SGL(3), SGL (5), . . . ), and is disposed, in this example, on the pixel array 10.

Figure 7A:
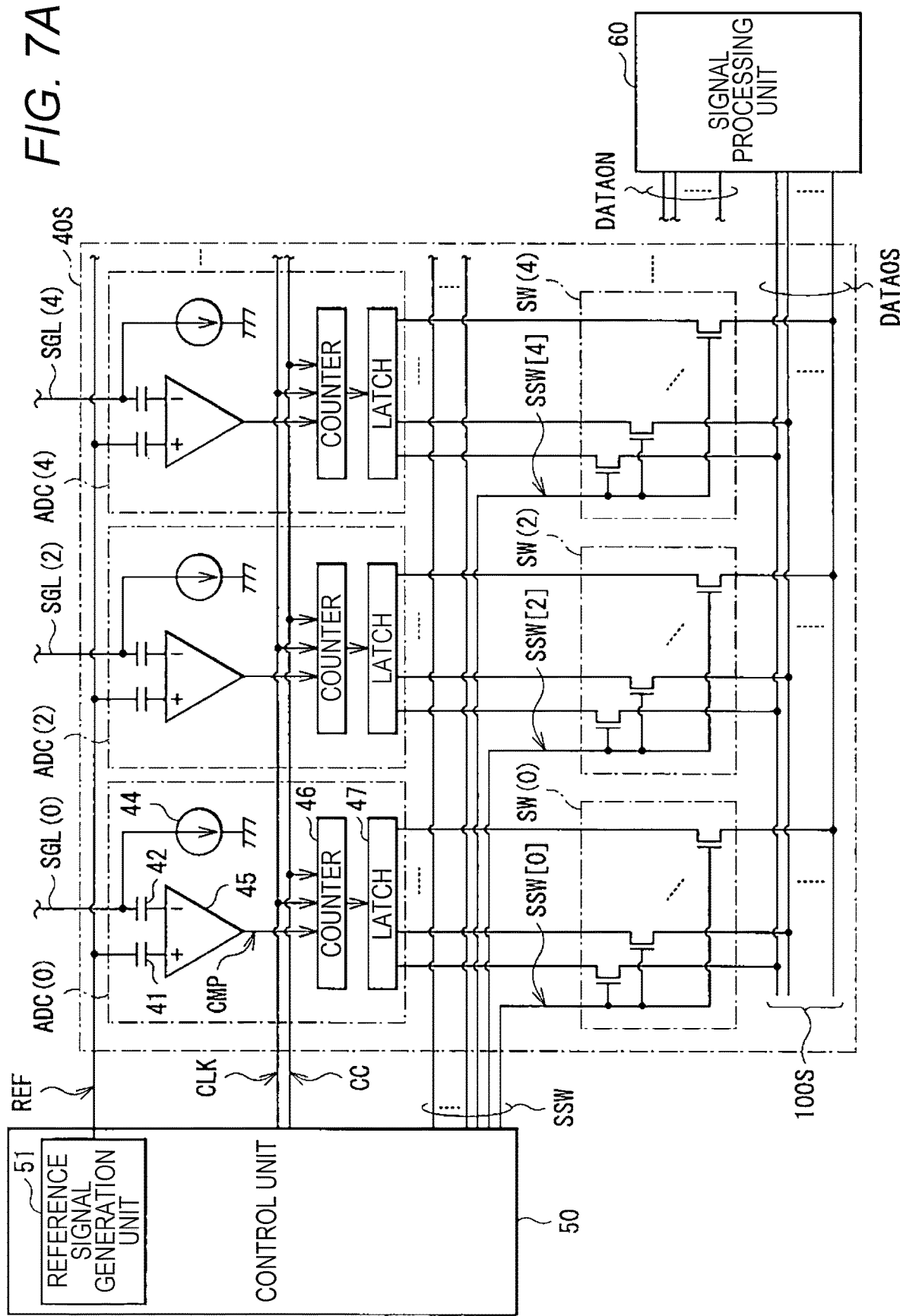
FIG. 7A is a circuit diagram illustrating a configuration example of a readout unit illustrated in FIG. 1.
Figure 7B:
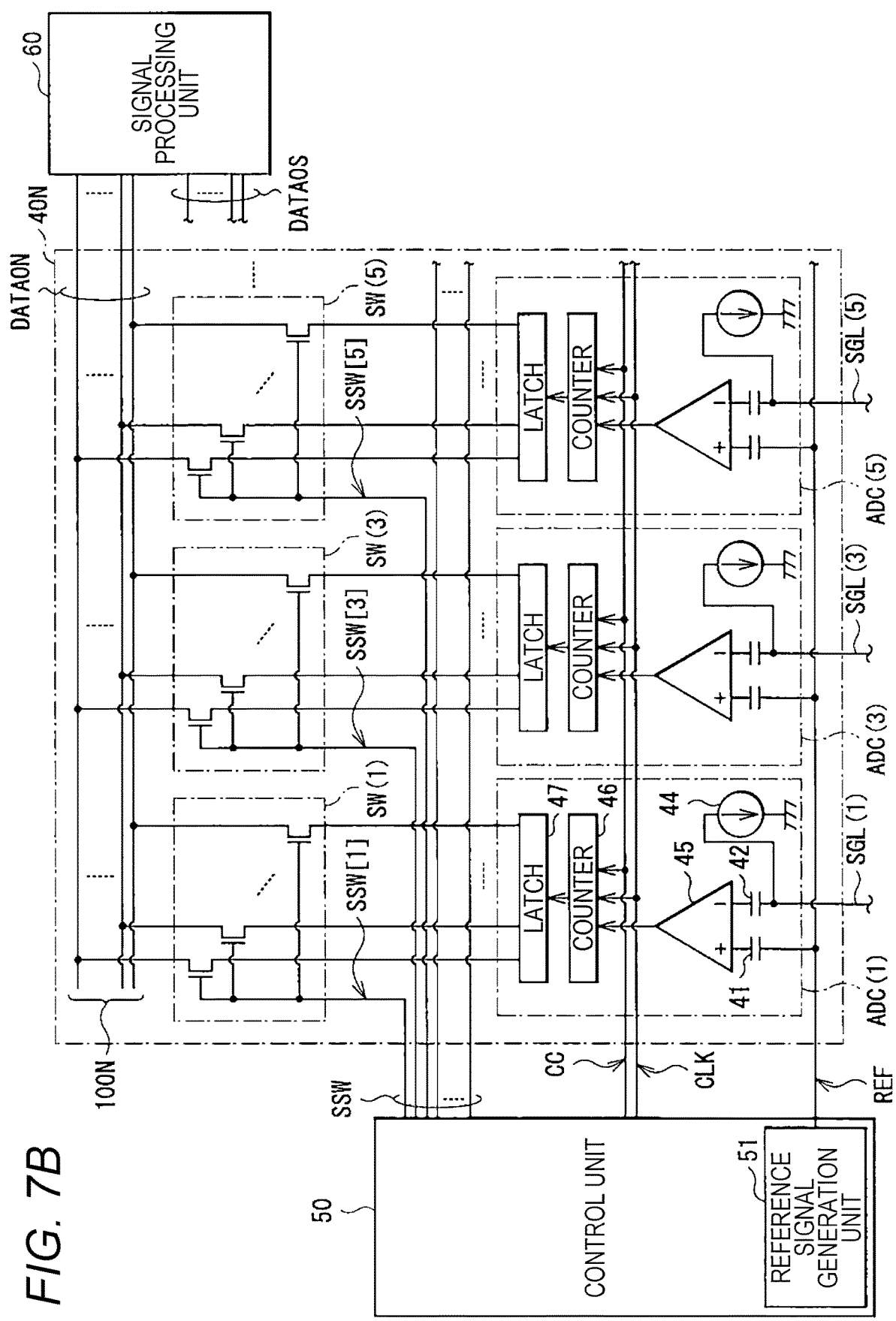
FIG. 7B is a circuit diagram illustrating a configuration example of another readout unit illustrated in FIG. 1.

FIG. 7A illustrates a configuration example of the readout unit 40S, and FIG. 7B illustrates a configuration example of the readout unit 40N. Note that FIG. 7A also illustrates the control unit 50 and the signal processing unit 60 in addition to the readout unit 40S. Similarly, FIG. 7B illustrates the control unit 50 and the signal processing unit 60 in addition to the readout unit 40N. The readout unit 40S operates on the basis of the power supply voltages VDDH and VDDL of the three power supply voltages VDD that have been supplied.

The readout unit 40 (readout units 40S and 40N) includes a plurality of analog-to-digital (AD) conversion units ADC (AD conversion units ADC(0), ADC(1), ADC(2), . . . ), a plurality of switch units SW (switch units SW(0), SW(1), SW(2), . . . ), and bus lines 100 (bus lines 100S and 100N).

The AD conversion units ADC perform AD conversion on the basis of the signal SIG supplied from the pixel array 10 to convert the pixel voltage Vpix into digital code CODE. The plurality of AD conversion units ADC are provided corresponding to the plurality of signal lines SGL. Specifically, in the readout unit 40S (FIG. 7A), the 0th AD conversion unit ADC(0) is provided corresponding to the 0th signal line SGL(0), the second AD conversion unit ADC(2) is provided corresponding to the second signal line SGL(2), and the fourth AD conversion unit ADC(4) is provided corresponding to the fourth signal line SGL(4). Similarly, in the readout unit 40N (FIG. 7B), the first AD conversion unit ADC(1) is provided corresponding to the first signal line SGL(1), the third AD conversion unit ADC(3) is provided corresponding to the third signal line SGL(3), and the fifth AD conversion unit ADC(5) is provided corresponding to the fifth signal line SGL(5).

The AD conversion units ADC each include capacitance elements 41 and 42, a current source 44, a comparator 45, a counter 46, and a latch 47. One end of the capacitance element 41 is supplied with a reference signal REF supplied from the control unit 50 and the other end is connected to the positive input terminal of the comparator 45. The reference signal REF creates a so-called ramp waveform in which the voltage level gradually decreases with the lapse of time in the P-phase period TP and the D-phase period TD. One end of the capacitance element 42 is connected to the signal line SGL and the other end is connected to the negative input terminal of the comparator 45. The current source 44 allows a current having a predetermined current value to flow from the signal line SGL to the ground. The comparator 45 compares the input voltage at the positive input terminal with the input voltage at the negative input terminal and outputs the comparison result as the signal CMP. The reference signal REF is supplied to the positive input terminal of the comparator 45 via the capacitance element 41, and the signal SIG is supplied to the negative input terminal via the capacitance element 42. The comparator 45 also has a function of performing zero adjustment for electrically connecting the positive input terminal and the negative input terminal in the predetermined period before the P-phase period TP. On the basis of the signal CMP supplied from the comparator 45 and the control signal CC supplied from the control unit 50, the counter 46 performs a counting operation of counting pulses of a clock signal CLK supplied from the control unit 50. The latch 47 holds a count value CNT obtained from the counter 46 as the digital code CODE having a plurality of bits (13 bits in this example). With this configuration, the AD conversion unit ADC performs AD conversion on the basis of the signal SIG to generate the digital code CODE, and outputs the digital code CODE.

The switch units SW each supply the digital code CODE output from the AD conversion unit ADC to the bus line 100 on the basis of the control signal SSW supplied from the control unit 50. The plurality of switch units SW are provided corresponding to the plurality of AD conversion units ADC. Specifically, in the readout unit 40S (FIG. 7A), the 0th switch unit SW(0) is provided corresponding to the 0th AD conversion unit ADC(0), the second switch unit SW(2) is provided corresponding to the second AD conversion unit ADC(2), and the fourth switch unit SW(4) is provided corresponding to the fourth AD conversion unit ADC(4). Similarly, in the readout unit 40N (FIG. 7B), the first switch unit SW(1) is provided corresponding to the first AD conversion unit ADC(1), the third switch unit SW(3) is provided corresponding to the third AD conversion unit ADC(3), and the fifth switch unit SW(5) is provided corresponding to the fifth AD conversion unit ADC(5).

In this example, the switch units SW are formed using the number of (13 in this example) transistors which is the same number as the number of bits of the digital code CODE. These transistors are controlled to be turned on/off on the basis of each bit of the control signals SSW (control signals SSW[0] to SSW[4095]) supplied from the control unit 50. More specifically, for example, in the 0th switch unit SW (SW(0)) (FIG. 7A), each transistor is turned on, on the basis of the control signal SSW[0] to allow the digital code CODE output from the 0th AD conversion unit ADC(0) to the bus line 100S. Similarly, for example, in the first switch unit SW (SW(1)) (FIG. 7B), each transistor is turned on, on the basis of the control signal SSW[1] to allow the digital code CODE output from the first AD conversion unit ADC(1) to the bus line 100N. The same procedure applies to other switch units SW.

The bus lines 100S (FIG. 7A) include a plurality of (13 in this example) lines and transmits the digital code CODE output from the AD conversion unit ADC of the readout unit 40S. The readout unit 40S supplies the plurality of digital codes CODE supplied from the AD conversion unit ADC of the readout unit 40S to the signal processing unit 60 as the image signal DATA0S by using the bus line 100S.

Similarly, the bus lines 100N (FIG. 7B) include a plurality of (13 in this example) lines and transmits the digital code CODE output from the AD conversion unit ADC of the readout unit 40N. The readout unit 40N supplies the plurality of digital codes CODE supplied from the AD conversion unit ADC of the readout unit 40N to the signal processing unit 60 as the image signal DATA0N by using the bus line 100N.

The control unit 50 (FIG. 1) supplies control signals to the scanning unit 21, the signal generation units 22 and 23, the readout unit 40 (readout units 40S and 40N), and the signal processing unit 60, and controls the operation of these circuits to control the operation of the imaging device 1. The control unit 50 operates on the basis of the power supply voltage VDDH and the power supply voltage VDDL of the three supplied power supply voltages VDD.

The control unit 50 includes a reference signal generation unit 51. The reference signal generation unit 51 generates the reference signal REF. The reference signal REF creates the so-called ramp waveform in which the voltage level gradually decreases with the lapse of time in the P-phase period TP and the D-phase period TD. The reference signal generation unit 51 is configured to be able to change the slope of the ramp waveform and a voltage offset amount OFS of the reference signal REF. Then, the reference signal generation unit 51 supplies the generated reference signal REF to the AD conversion units ADC of the readout unit 40 (readout units 40S and 40N).

With this configuration, for example, the control unit 50 supplies the control signal to the scanning unit 21, so that the scanning unit 21 sequentially drives the plurality of imaging pixels P1 in the normal pixel region R1 and, in the blanking period T20, drives the plurality of light shielding pixels P2 in the light shielding pixel regions R21 and R22 and the plurality of dummy pixels P3 in the dummy pixel region R3. Furthermore, for example, the control unit 50 supplies the control signal to the scanning unit 21, so that the scanning unit 21 drives the dummy pixels P4 in the dummy pixel region R4 in a case where the imaging pixels P1 in the normal pixel region R1, the light shielding pixels P2 in the light shielding pixel regions R21 and R22, and the dummy pixels P3 in the dummy pixel region R3 are selected as the reading targets.

Furthermore, the control unit 50 supplies the control signal to the signal generation unit 22, so that the signal generation unit 22 applies the control signal VMA to the control line VMAL in the dummy pixel region R3 and the control signal VMB to the control line VMBL. In addition, the control unit 50 supplies the control signal to the signal generation unit 23, so that the signal generation unit 23 applies the control signal SUN to the control line SUNL in the dummy pixel region R4.

Furthermore, the control unit 50 supplies the reference signal REF, the clock signal CLK, the control signal CC, and the control signal SSW (control signals SSW[0] to SSW [4095]) to the readout unit 40 (readout units 40S and 40N), so that the readout unit 40 is controlled to generate the image signal DATA0(image signals DATA0S and DATA0N) on the basis of the signal SIG.

Furthermore, the control unit 50 supplies the control signal to the signal processing unit 60 to control the operation of the signal processing unit 60.

The signal processing unit 60 performs predetermined signal processing on the basis of the image signal DATA0 (image signals DATA0S and DATA0N) supplied from the readout unit 40, and outputs the image signal subjected to the signal processing as the image signal DATA. Furthermore, the signal processing unit 60 also has a function of performing diagnosis processing on the basis of the image signal DATA0 (image signals DATA0S and DATA0N) and outputting an error flag signal XERR and a diagnosis result RES. The signal processing unit 60 operates on the basis of the power supply voltage VDDL of the three supplied power supply voltages VDD.

Figure 8:
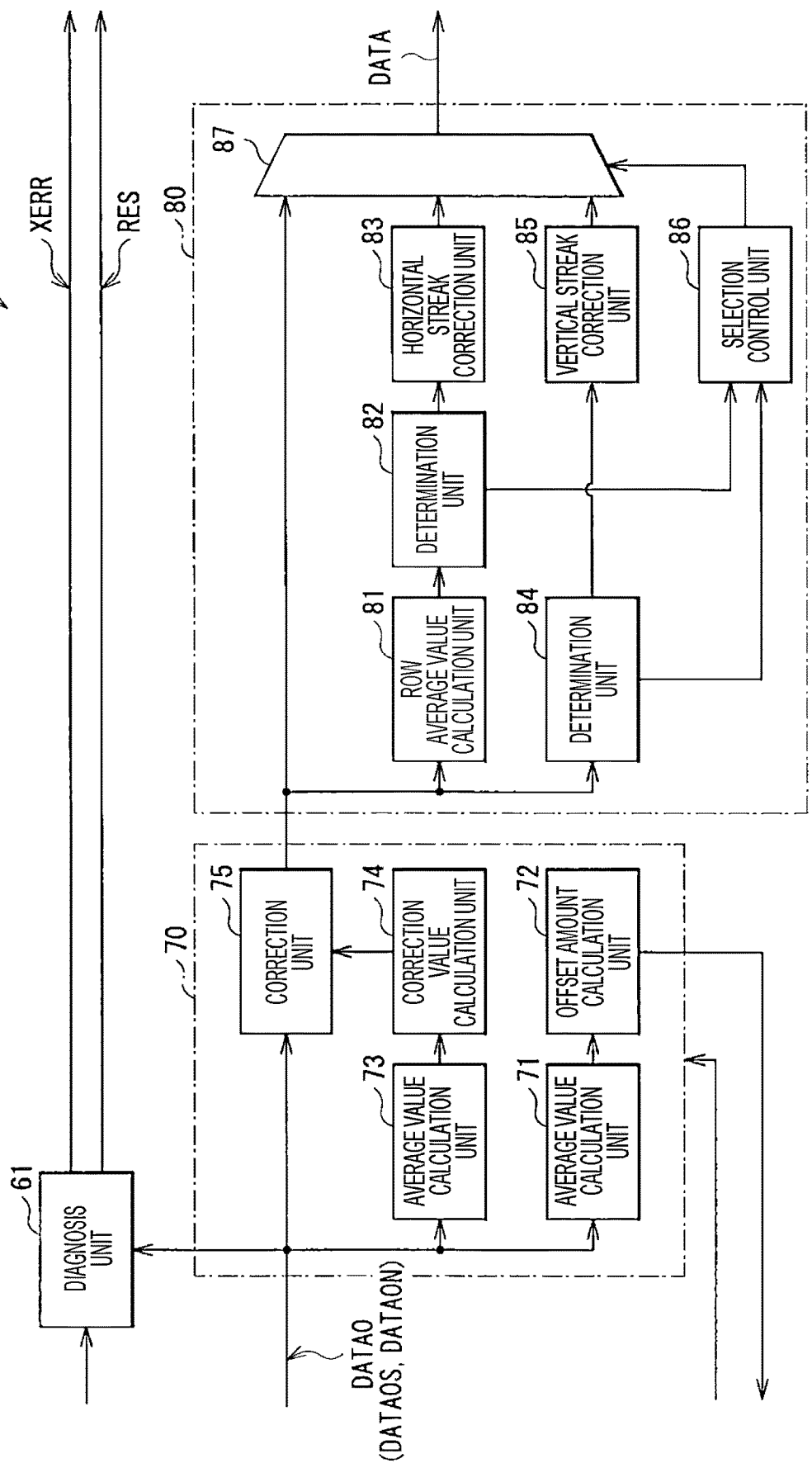
FIG. 8 is a block diagram illustrating a configuration example of a signal processing unit illustrated in FIG. 1.

FIG. 8 illustrates a configuration example of the signal processing unit 60. The signal processing unit 60 includes processing units 70 and 80 and a diagnosis unit 61.

On the basis of the image signal DATA0 (image signals DATA0S and DATA0N), the processing unit 70 performs dark current correction of subtracting the contribution of the dark current of the photodiodes PD from the digital codes CODE included in the image signal DATA0. The processing unit 70 includes an average value calculation unit 71, an offset amount calculation unit 72, an average value calculation unit 73, a correction value calculation unit 74, and a correction unit 75.

On the basis of the instruction from the control unit 50, the average value calculation unit 71 obtains the average value of the digital codes CODE relating to the plurality of light shielding pixels P2 in the light shielding pixel region R21 included in the image signal DATA0. In other words, when the scanning unit 21 drives the plurality of light shielding pixels P2 in the light shielding pixel region R21 and the readout unit 40 performs the AD conversion on the basis of the signal SIG to generate the digital codes CODE, the average value calculation unit 71 calculates the average value of these digital codes CODE.

The offset amount calculation unit 72 calculates the voltage offset amount OFS of the reference signal REF in the D-phase period TD on the basis of the calculation result of the average value calculation unit 71. Then, the offset amount calculation unit 72 supplies the calculation result to the control unit 50. The control unit 50 stores the voltage offset amount OFS in a register, and the reference signal generation unit 51 of the control unit 50 generates the reference signal REF on the basis of the voltage offset amount OFS. Thus, the reference signal generation unit 51 thereafter generates the reference signal REF whose voltage is shifted by the voltage offset amount OFS in the D-phase period TD. Then, the scanning unit 21 drives the plurality of light shielding pixels P2 in the light shielding pixel region R22, and the readout unit 40 performs AD conversion using this reference signal REF on the basis of the signal SIG to generate the digital codes CODE.

On the basis of the instruction from the control unit 50, the average value calculation unit 73 obtains the average value of the digital codes CODE relating to the plurality of light shielding pixels P2 in the light shielding pixel region R22 included in the image signal DATA0. The digital codes CODE are generated by the readout unit 40 using the reference signal REF whose voltage is shifted by the voltage offset amount OFS in the D-phase period TD. The average value calculation unit 73 obtains the average value of the digital codes CODE thus generated.

The correction value calculation unit 74 calculates the correction value of the digital codes CODE on the basis of the calculation result of the average value calculation unit 73.

Using the correction value calculated by the correction value calculation unit 74, the correction unit 75 corrects the digital codes CODE relating to the plurality of imaging pixels P1 in the normal pixel region R1 included in the image signal DATA0.

With this configuration, the processing unit 70 determines how the dark current of the photodiodes PD affects the digital codes CODE on the basis of the digital codes CODE relating to the plurality of light shielding pixels P2 of the light shielding pixel regions R21 and R22, and then subtracts the contribution of the dark current from the digital codes CODE relating to the plurality of imaging pixels P1 of the normal pixel region R1.

The processing unit 80 performs image correction processing in a case where, for example, a linear streak is generated in the image because of abnormal operation of one row of the imaging pixels P1 or one column of the imaging pixels P1 The processing unit 80 includes a row average value calculation unit 81, a determination unit 82, a horizontal streak correction unit 83, a determination unit 84, a vertical streak correction unit 85, a selection control unit 86, and a selector 87.

On the basis of the image signal supplied from the processing unit 70, the row average value calculation unit 81 calculates the average value of the digital codes CODE relating to the one row of the imaging pixels P1 in the normal pixel region R1.

The determination unit 82 determines whether or not a linear streak extending horizontally is generated on the basis of the average value of the plurality of rows of the digital codes CODE supplied from the row average value calculation unit 81. Specifically, for example, the determination unit 82 determines that the linear streak is generated in the line of interest, in a case where the difference between the average value of the digital codes CODE relating to the imaging pixels P1 of the row of interest and the average value of the digital codes CODE relating to the imaging pixels P1 of a row immediately above the row of interest is larger than a predetermined value, and the difference between the average value of the digital codes CODE relating to the imaging pixels P1 of the row of interest and the average value of the digital codes CODE relating to the imaging pixels P1 of a low immediately below the row of interest is larger than a predetermined value. Then, the determination unit 82 supplies the determination result to the selection control unit 86.

The horizontal streak correction unit 83 calculates the digital code CODE relating to the imaging pixels P1 of the row of interest on the basis of the digital codes CODE relating to the imaging pixels P1 of the row immediately above the row of interest and the digital codes CODE relating to the imaging pixels P1 of the row immediately below the row of interest. More specifically, the horizontal streak correction unit 83 calculates, for example, the average value of the digital codes CODE relating to the imaging pixels P1 immediately above the imaging pixels P1 of interest and the digital codes CODE relating to the imaging pixels P1 immediately below the imaging pixels P1 of interest, thus obtaining the digital code CODE relating to the imaging pixels P1 of interest.

The determination unit 84 determines whether or not a linear streak extending vertically can be generated on the basis of the digital code CODE relating to the imaging pixel P1 of interest included in the image signal supplied from the processing unit 70, the digital code CODE relating to the imaging pixel P1 located on the left of the imaging pixel P1 of interest, and the digital code CODE relating to the imaging pixel P1 located on the right of the imaging pixel P1 of interest. Specifically, the determination unit 84 determines, for example, that the linear streak can be generated in the column including the imaging pixel P1 of interest in a case where the difference between the digital code CODE relating to the imaging pixel P1 of interest and the digital code CODE relating to the imaging pixel P1 located on the left of the imaging pixel P1 of interest is larger than a predetermined value, and if the difference between the digital code CODE relating to the imaging pixel P1 of interest and the digital code CODE relating to the imaging pixel P1 located on the right of the imaging pixel P1 of interest is larger than the predetermined value. Then, the determination unit 84 supplies the determination result to the selection control unit 86.

The vertical streak correction unit 85 obtains, for example, the average value of the digital codes CODE relating to the imaging pixel P1 located on the right of the imaging pixel P1 of interest and the imaging pixel P1 located on the left of the imaging pixel P1 of interest to determine the digital code CODE relating to the imaging pixel P1 of interest.

On the basis of the determination results of the determination units 82 and 84, the selection control unit 86 generates a selection signal to designate the digital code CODE to be selected from the digital code CODE supplied from the processing unit 70, the digital code CODE supplied from the horizontal streak correction unit 83, and the digital code CODE supplied from the vertical streak correction unit 85.

On the basis of the selection signal supplied from the selection control unit 86, the selector 87 selects and outputs one of the digital code CODE supplied from the processing unit 70, the digital code CODE supplied from the horizontal streak correction unit 83, and the digital code CODE supplied from the vertical streak correction unit 85.

With this configuration, the processing unit 80 detects the linear streak on the basis of the image signal supplied from the processing unit 70 and corrects the digital code CODE so as to make the linear streak less noticeable. Then, the processing unit 80 outputs the processed image signal as the image signal DATA. Note that although the processing unit 80 is provided in the imaging device 1 in this example, the present disclosure is not limited thereto, and the processing unit 80 may not be provided in the imaging device 1 and a signal processing unit separate from the imaging device 1 may perform processing of the processing of the processing unit 80.

Note that, in this example, the processing unit 80 corrects the digital code CODE so as to make the linear streak less noticeable in a case where the linear streaks are generated in the image because of abnormal operation of one row of the imaging pixels P1 and one column of the imaging pixels P1, but it is no limited to this. For example, the digital code CODE may be similarly corrected in a case where linear streaks are generated in the image because the imaging pixels P1 of two adjacent rows do not normally operate.

The diagnosis unit 61 performs diagnosis processing on the basis of the image signal DATA0 (image signals DATA0S and DATA0N). Specifically, the diagnosis unit 61 performs diagnosis processing by checking whether or not the digital codes CODE included in the image signal DATA0 satisfy predetermined specification, and outputs the error flag signal XERR and the diagnosis result RES.

Figure 9:
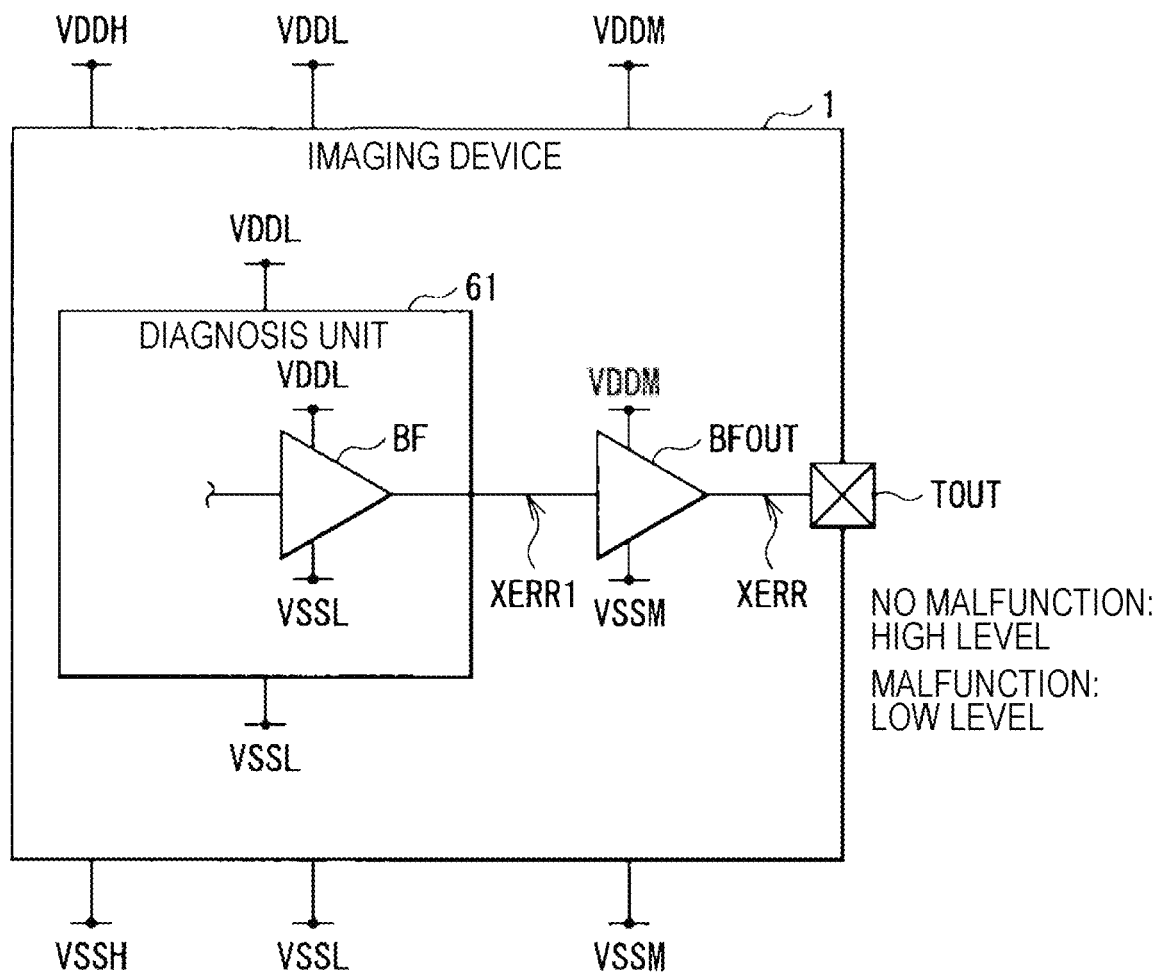
FIG. 9 is an explanatory diagram illustrating a configuration example of a circuit that outputs an error flag signal illustrated in FIG. 1.

FIG. 9 illustrates a configuration example of a circuit that outputs the error flag signal XERR in the imaging device 1. Three power supply voltages VDD (power supply voltages VDDH, VDDM, and VDDL) and three ground voltages VSS (ground voltages VSSH, VSSM, and VSSL) are supplied to the imaging device 1. The power supply voltage VDDH is, for example, 3.3 V which is a power supply voltage to be mainly supplied to an analog circuit in the imaging device 1. The power supply voltage VDDL is, for example, 1.1 V which is a power supply voltage to be mainly supplied to the logic circuit in the imaging device 1. The power supply voltage VDDM is, for example, 1.8 V which is a power supply voltage to be mainly supplied to the input/output buffer of the imaging device 1. The ground voltages VSSH, VSSL, and VSSM are all 0 V.

The diagnosis unit 61 has a buffer BF. The buffer BF generates a signal XERR1. Since the power supply voltage VDDL and the ground voltage VSSL are supplied to the diagnosis unit 61, the buffer BF operates on the basis of the power supply voltage VDDL and the ground voltage VSSL. The signal XERR1 generated by the buffer BF is a logic signal that changes between the power supply voltage VDDL and the ground voltage VSSL. The signal XERR1 is a so-called negative logic signal that comes to a high level (power supply voltage VDDL) in a case where trouble is not confirmed by the diagnosis processing in the diagnosis unit 61, while coming to a low level (ground voltage VSSL) in a case where a trouble is confirmed.

Figure 10:
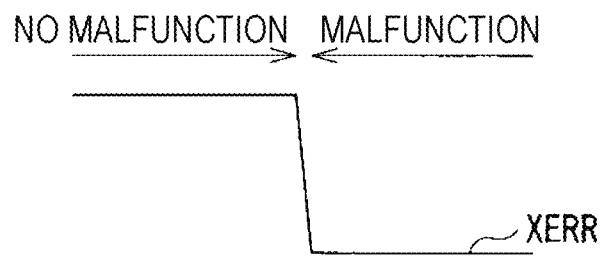
FIG. 10 is an explanatory diagram illustrating an example of the error flag signal illustrated in FIG. 9.

The imaging device 1 has an output buffer BFOUT. The output buffer BFOUT generates an error flag signal XERR on the basis of the signal XERR1 and outputs the error flag signal XERR via the output terminal TOUT. The output buffer BFOUT operates on the basis of the power supply voltage VDDM and the ground voltage VSSM. The error flag signal XERR is a logic signal that changes between the power supply voltage VDDM and the ground voltage VSSM. As illustrated in FIGS. 9 and 10, the error flag signal XERR is a so-called negative logic signal that comes to a high level (power supply voltage VDDM) in a case where the trouble is not confirmed by the diagnosis processing in the diagnosis unit 61, while coming to a low level (ground voltage VSSM) in a case where a trouble is confirmed.

Next, mounting of the imaging device 1 will be described. In the imaging device 1, the blocks illustrated in FIG. 1 may be formed on, for example, one semiconductor substrate or a plurality of semiconductor substrates.

Figure 11:
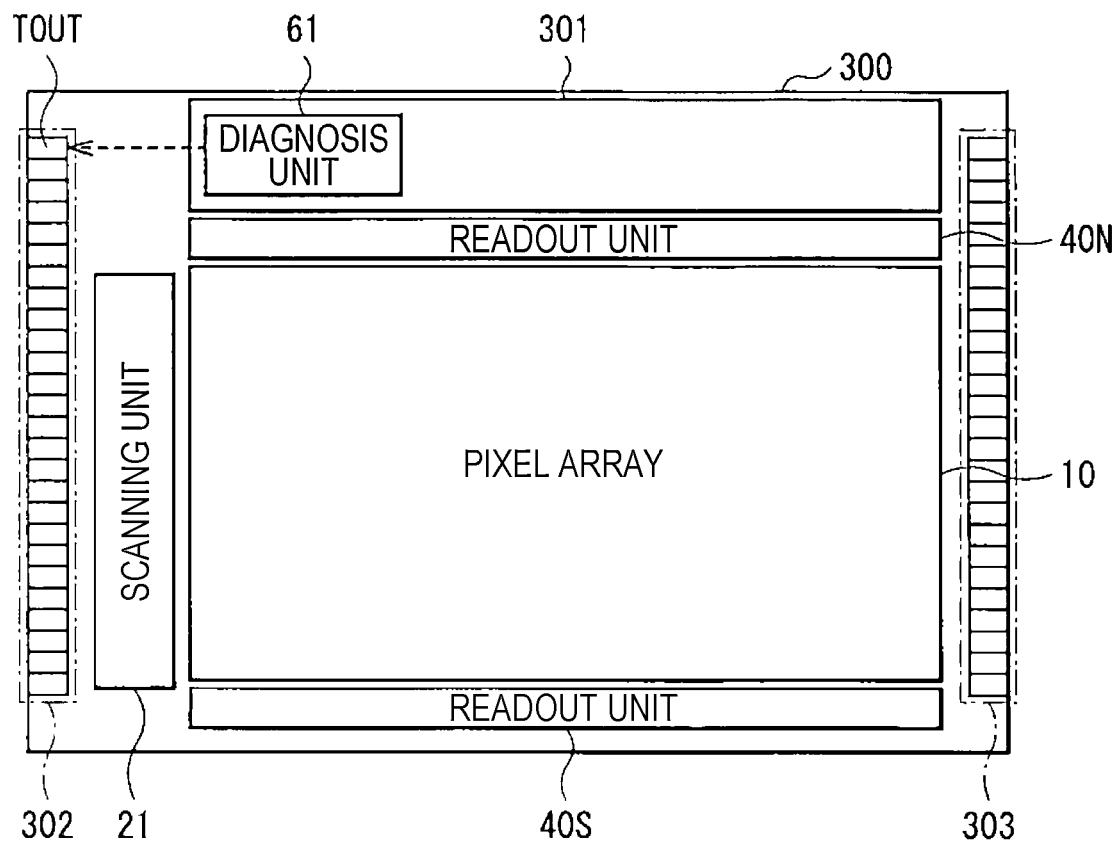
FIG. 11 is an explanatory diagram illustrating an example of a circuit arrangement arrangement of the imaging device illustrated in FIG. 1.

FIG. 11 illustrates an example of a circuit arrangement in the case where the imaging device 1 is formed on one semiconductor substrate 300. The pixel array 10 is formed on the semiconductor substrate 300. Then, in FIG. 11, the scanning unit 21 is formed on the left of the pixel array 10, the readout unit 40S is formed below the pixel array 10, and the readout unit 40N and a peripheral circuit unit 301 are formed in this order above the pixel array 10. The peripheral circuit unit 301 corresponds to the control unit 50, the signal generation units 22 and 23, and the signal processing unit 60. The diagnosis unit 61 is formed on the left part of the region where the peripheral circuit unit 301 is formed. In addition, a terminal section 302 including a plurality of terminals is formed at the left end of the semiconductor substrate 300. Similarly, a terminal section 303 including a plurality of terminals is formed at the right end of the semiconductor substrate 300. An output terminal TOUT from which the error flag signal XERR is output is disposed, for example, at a position near the diagnosis unit 61 in the terminal section 302. As a result, the signal path between the output terminal TOUT and the diagnosis unit 61 can be shortened.

Figure 12:
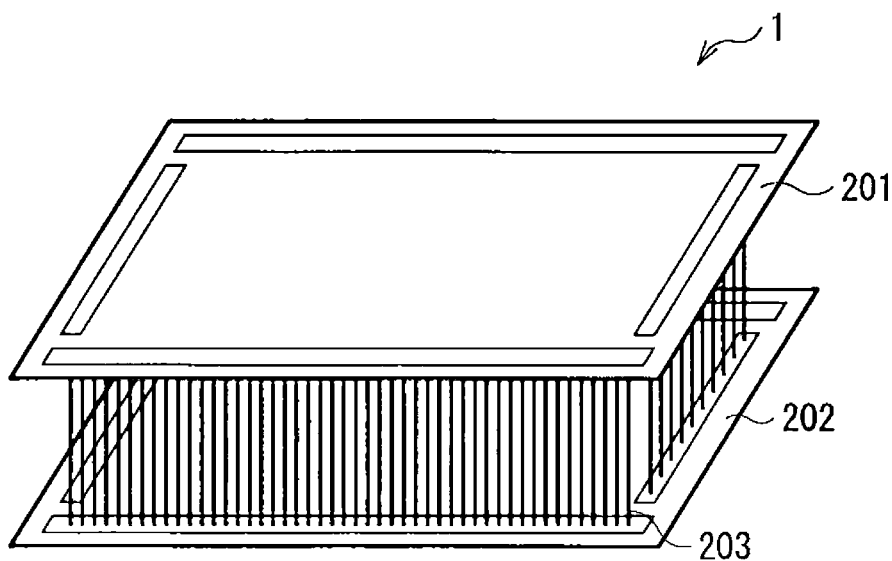
FIG. 12 is an explanatory view illustrating a configuration example of the imaging device illustrated in FIG. 1.

FIG. 12 illustrates an example of connection between two semiconductor substrates 201 and 202 in a case where the imaging device 1 is formed on two semiconductor substrates 201 and 202. In this example, the semiconductor substrates 201 and 202 are overlapped and connected to each other through a plurality of vias 203. On the semiconductor substrate 201, for example, the pixel array 10 can be formed. Furthermore, on the semiconductor substrate 202, the readout unit 40 (readout units 40S and 40N), the signal generation units 22 and 23, the control unit 50, and the signal processing unit 60 can be formed. With such a stacked structure, it is possible to realize an advantageous design from the viewpoint of layout. Furthermore, the imaging device 1 can diagnose trouble, such as short circuit, voltage fixing, or the like occurring in adjacent vias 203.

FIG. 13 illustrates an example of circuit arrangement on the semiconductor substrates 201 and 202.

The pixel array 10 is formed on the semiconductor substrate 201 in this example. In other words, on the semiconductor substrate 201, the plurality of imaging pixels P1 (imaging pixels P1A and P1B), the plurality of light shielding pixels P2 (light shielding pixels P2A and P2B), the plurality of dummy pixels P3 (dummy pixels P3A and P3B), the plurality of dummy pixels P4 (dummy pixels P4A and P4B), the control lines TGLL, SELL, RSTL, VMAL, VMBL, SUNL, and the signal lines SGL are formed.

In addition, electrode regions 201A, 201B, and 201C are provided on the semiconductor substrate 201. The electrode region 201A is provided on the lower side of the semiconductor substrate 201, the electrode region 201B is provided on the upper side of the semiconductor substrate 201, and the electrode region 201C is provided on the left side of the semiconductor substrate 201. A plurality of electrodes are formed in the electrode region 201A, and the plurality of electrodes are connected to the plurality of even-numbered signal lines SGL in the pixel array 10 via vias such as through chip vias (TCV) or the like. A plurality of electrodes are formed in the electrode region 201B, and the plurality of electrodes are connected to the plurality of odd-numbered signal lines SGL in the pixel array 10 via vias such as TCV or the like. A plurality of electrodes are formed in the electrode region 201C, and the plurality of electrodes are connected to the control lines TGLL, SELL, RSTL, VMAL, VMBL in the pixel array 10 via vias such as TCV or the like.

On the semiconductor substrate 202, the scanning unit 21, the readout units 40S and 40N, the reference signal generation unit 51, and the peripheral circuit unit 209 are formed in this example. Here, the peripheral circuit unit 209 corresponds to the circuits other than the reference signal generation unit 51 in the control unit 50, the signal generation units 22 and 23, and the signal processing unit 60. In FIG. 13, the peripheral circuit unit 209 is disposed near the center in the vertical direction, the scanning unit 21 is disposed on the left part of the peripheral circuit unit 209, the reference signal generation unit 51 is disposed on the right part of the peripheral circuit unit 209, the readout unit 40S is disposed below the peripheral circuit unit 209, and the readout unit 40N is disposed above the peripheral circuit unit 209. It is desirable that the reference signal REF supplied from the reference signal generation unit 51 to the two readout units 40S and 40N have the same waveform in the two readout units 40S and 40N. Therefore, it is preferable that the distance between the reference signal generation unit 51 and the readout unit 40S is equal to the distance between the reference signal generation unit 51 and the readout unit 40N. Note that one reference signal generation unit 51 is provided in this example, but the present disclosure is not limited thereto. Alternatively, two reference signal generation units 51 (reference signal generation units 51S and 51N) may be provided, so that the reference signal REF generated by the generation unit 51S is supplied to the readout unit 40S and the reference signal REF generated by the reference signal generation unit 51N may be supplied to the readout unit 40N, for example.

Furthermore, electrode regions 202A, 202B, and 202C are provided on the semiconductor substrate 202. The electrode region 202A is provided on the lower part of the semiconductor substrate 202 so as to be adjacent to the readout unit 40S, the electrode region 202B is provided on the upper part of the semiconductor substrate 202 so as to be adjacent to the readout unit 40N, and the electrode region 202C is provided on the left side of the semiconductor substrate 202 so as to be adjacent to the scanning unit 21. A plurality of electrodes are formed in the electrode region 202A, and the plurality of electrodes are connected to the readout unit 40S via vias such as TCV or the like. A plurality of electrodes are formed in the electrode region 202B, and the plurality of electrodes are connected to the readout unit 40N via vias such as TCV or the like. A plurality of electrodes are formed in the electrode region 202C, and the plurality of electrodes are connected to the scanning unit 21 and the signal generation units 22 and 23 of the peripheral circuit unit 209 via vias such as TCV or the like.

In the imaging device 1, the semiconductor substrate 201 and the semiconductor substrate 202 are overlapped with each other. Thus, the plurality of electrodes in the electrode region 201A of the semiconductor substrate 201 are electrically connected to the plurality of electrodes in the electrode region 202A of the semiconductor substrate 202, the plurality of electrodes in the electrode region 201B of the semiconductor substrate 201 are electrically connected to the plurality of electrodes in the electrode region 202B of the semiconductor substrate 202, and the plurality of electrodes in the electrode region 201C of the semiconductor substrate 201 are electrically connected to the plurality of electrodes in the electrode region 202C of the semiconductor substrate 202.

Thus, by mainly disposing the pixel array 10 on the semiconductor substrate 201, the semiconductor substrate 201 can be manufactured using a semiconductor manufacturing process specialized for pixels. That is, no circuit is provided other than the pixel array 10 on the semiconductor substrate 201, so that even when there is a step of annealing at 1,000 degrees, there is no influence on the circuit other than the pixel array 10, for example. Therefore, in manufacturing the semiconductor substrate 201, for example, it is possible to introduce a high temperature process as a countermeasure against white spots, and as a result, the characteristics in the imaging device 1 can be improved.

Figure 14:
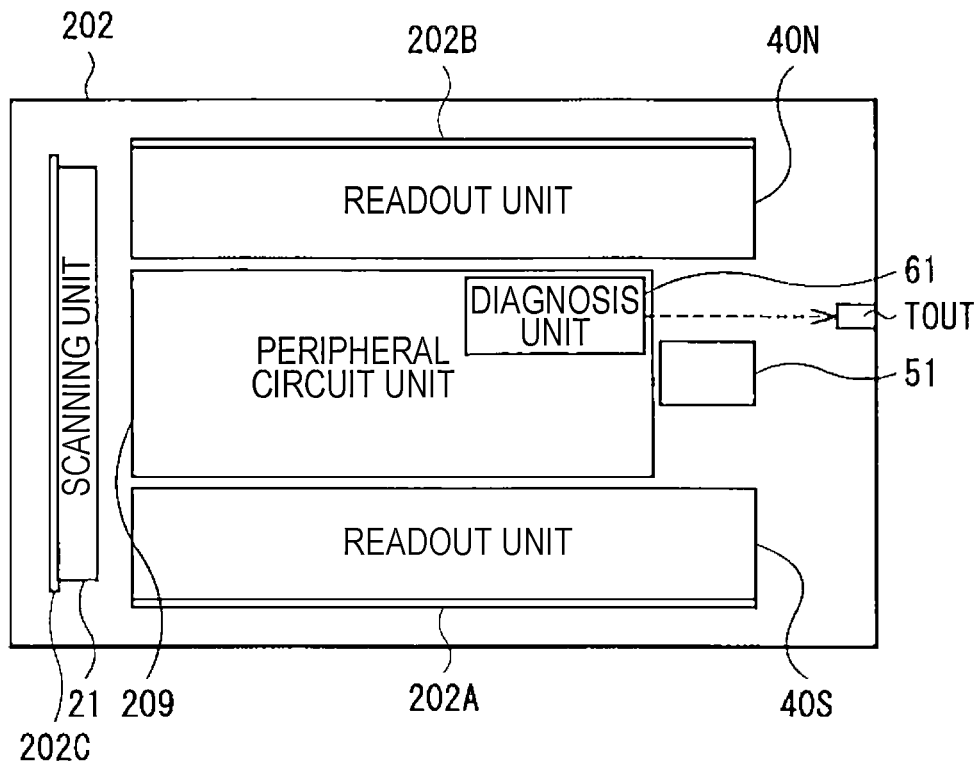
FIG. 14 is an explanatory diagram illustrating an example of another circuit arrangement of the imaging device illustrated in FIG. 1.

FIG. 14 illustrates the arrangement position of the output terminal TOUT on the semiconductor substrate 202. In this example, the diagnosis unit 61 is formed on the upper right part of the region where the peripheral circuit unit 209 is formed. The output terminal TOUT from which the error flag signal XERR is output is disposed at a position near the diagnosis unit 61. As a result, the signal path between the output terminal TOUT and the diagnosis unit 61 can be shortened.

Here, the pixel array 10, the scanning unit 21, the signal generation units 22 and 23, the readout unit 40, and the control unit 50 correspond to a specific example of the "imaging sensor" of the present disclosure. The diagnosis unit 61 corresponds to a specific example of the "diagnosis circuit" of the present disclosure. The output buffer BFOUT corresponds to a specific example of the "output circuit" of the present disclosure. The error flag signal XERR corresponds to a specific example of the "flag signal" of the present disclosure. The power supply voltage VDDM corresponds to a specific example of the "first power supply voltage" of the present disclosure. The power supply voltage VDDL corresponds to a specific example of the "second power supply voltage" of the present disclosure.

Operation and Function

Subsequently, the operation and function of the imaging device 1 of the present embodiment will be described.

(Outline of Overall Operation)

First, with reference to FIG. 1, the outline of the overall operation of the imaging device 1 will be described. The signal generation unit 22 generates the control signals VMA and VMB. The signal generation unit 23 generates the control signal SUN. The scanning unit 21 sequentially drives the plurality of imaging pixels P1 in the normal pixel region R1. Each imaging pixel P1 in the normal pixel region R1 outputs the reset voltage Vreset as the signal SIG in the P-phase period TP and the pixel voltage Vpix corresponding to the amount of received light as the signal SIG in the D-phase period TD. In addition, in the blanking period T20, the scanning unit 21 drives the plurality of light shielding pixels P2 in the light shielding pixel regions R21 and R22 and the plurality of dummy pixels P3 in the dummy pixel region R3. In the P-phase period TP, each light shielding pixel P2 in the light shielding pixel regions R21 and R22 outputs the reset voltage Vreset as the signal SIG and the pixel voltage Vpix corresponding to the dark current as the signal SIG in the D-phase period TD. The dummy pixels P3A in the dummy pixel region R3 output the signal SIG corresponding to the voltage of the control signal VMA in the P-phase period TP and the D-phase period TD. The dummy pixels P3B output the signal SIG corresponding to the voltage of the control signal VMB. Furthermore, the scanning unit 21 drives the dummy pixels P4 in the dummy pixel region R4 in a case where the imaging pixels P1 in the normal pixel region R1, the light shielding pixels P2 in the light shielding pixel regions R21 and R22, and the dummy pixels P3 in the dummy pixel region R3 are selected as reading targets.

The readout unit 40 (readout units 40S and 40N) performs AD conversion on the basis of the signal SIG to generate the image signal DATA0 (image signals DATA0S and DATA0N). The signal processing unit 60 performs predetermined signal processing on the basis of the image signal DATA0, outputs the image signal subjected to the signal processing as the image signal DATA, performs diagnosis processing on the basis of the image signal DATA0, and outputs an error flag signal XERR and the diagnosis result RES. The control unit 50 supplies control signals to the scanning unit 21, the signal generation units 22 and 23, the readout unit 40 (readout units 40S and 40N), and the signal processing unit 60 to control the operation of these circuits, thus controlling the operation of the imaging device 1.

(Detailed Operation)

In the imaging device 1, the plurality of imaging pixels P1 in the normal pixel region R1 accumulate charges according to the amount of received light and output a pixel voltage Vpix corresponding to the amount of received light as the signal SIG. This operation will be described in detail below.

Figure 15:
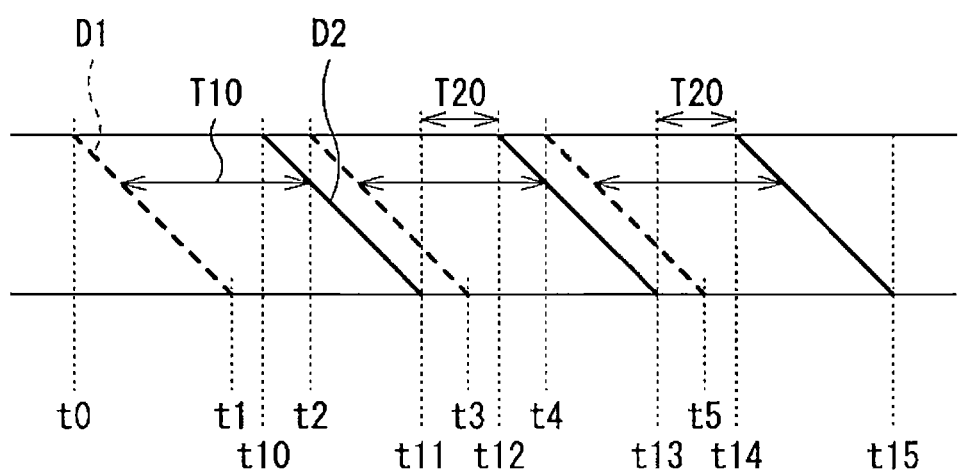
FIG. 15 is a timing chart of an operation example of the imaging device illustrated in FIG. 1.
Figure 16:
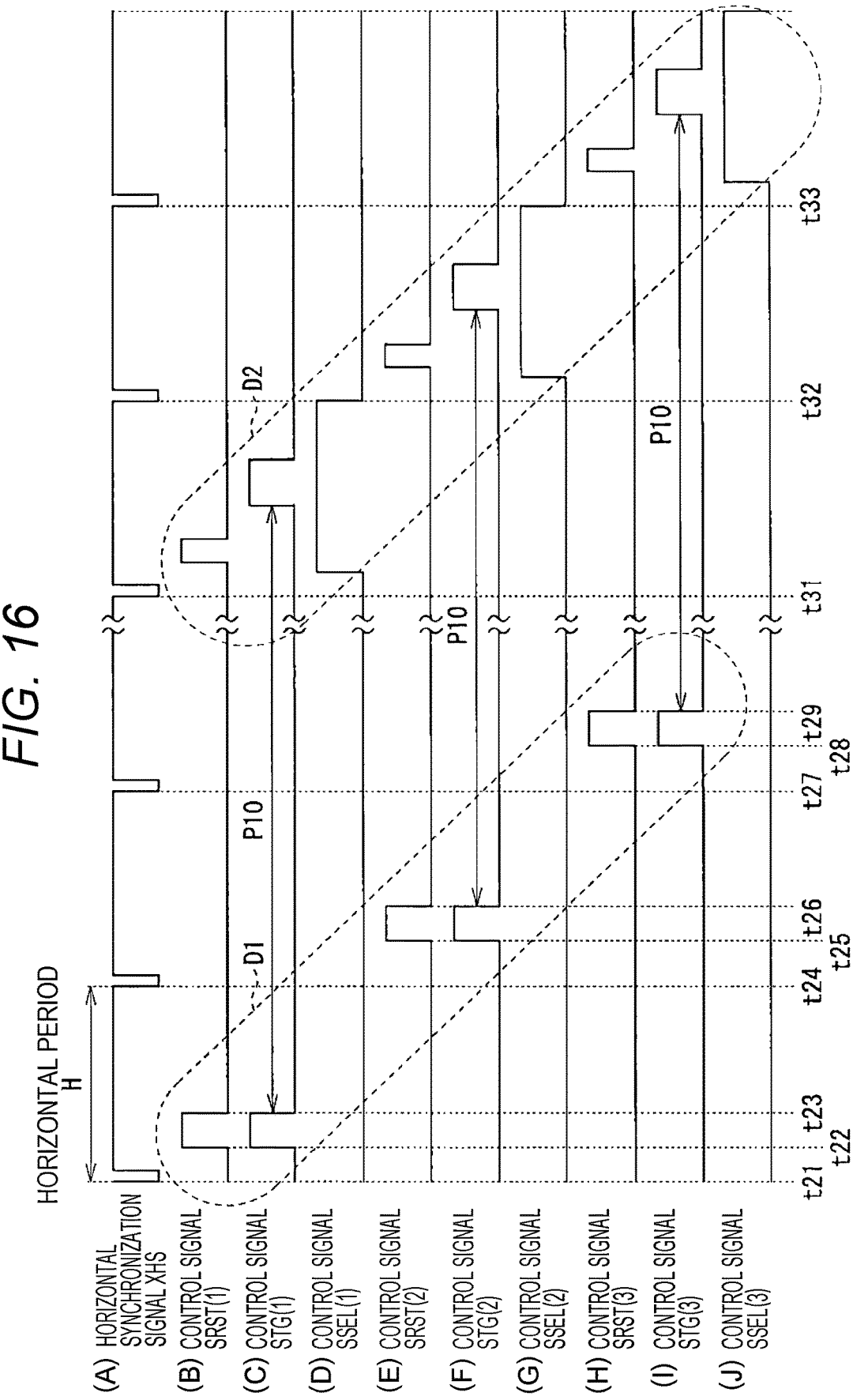
FIG. 16 is a timing waveform of an operation example of the imaging device illustrated in FIG. 1.

FIG. 15 illustrates an example of the operation of scanning the imaging pixels P1 in the normal pixel region R1. FIG. 16 illustrates an operation example of the imaging device 1, in which (A) indicates the waveform of a horizontal synchronization signal XHS, (B) indicates the waveform of a control signal SRST(1) in the first control line RSTL(1), (C) indicates the waveform of the control signal STG(1) in the first control line TGLL(1), (D) indicates the waveform of the control signal SSEL(1) in the first control line SELL(1), (E) indicates the waveform of the control signal SRST(2) in the second control line RSTL(2), (F) indicates the waveform of the control signal STG(2) in the second control line TGLL(2), (G) indicates the waveform of the control signal SSEL(2) in the second control line SELL(2), (H) indicates the waveform of the control signal SRST(3) in the third control line RSTL(3), (I) indicates the waveform of the control signal STG(3) in the third control line TGLL(3), and (J) indicates the waveform of the control signal SSEL(3) in the third control line SELL(3).

As illustrated in FIG. 15, the imaging device 1 performs accumulation start drive D1 on the imaging pixels P1 in the normal pixel region R1 sequentially from the top in the vertical direction during the period between timing t0 to t1.

Specifically, for example, as illustrated in FIG. 16, the scanning unit 21 generates the control signals SRST(1) and STG(1) having pulse waveforms in a horizontal period H starting from timing t21 ((B) and (C) in FIG. 16). Specifically, the scanning unit 21 changes the voltage of the control signal SRST(1) and the control signal STG(1) from a low level to a high level at timing t22 and changes the voltage of the control signal SRST(1) and the control signal STG(1) from the high level to the low level at timing t23. In the imaging pixels P1 to which the control signals SRST(1) and STG(1) are supplied, both transistors TG and RST are turned on at timing t22. As a result, the voltage of the floating diffusion FD and the voltage of the cathode of the photodiode PD are set to the power supply voltage VDDH. Then, at timing t23, both transistors TG and RST are turned off. As a result, the photodiode PD starts to accumulate electric charges according to the amount of received light. Thus, an accumulation period T10 starts in the imaging pixels P1.

Next, the scanning unit 21 generates control signals SRST(2) and STG(2) having pulse waveforms in the horizontal period H starting from timing t24 ((E) and (F) in FIG. 16). As a result, the imaging pixels P1 to which the control signals SRST(2) and STG(2) are supplied start to accumulate electric charges according to the amount of received light at timing t26.

Next, the scanning unit 21 generates control signals SRST(3) and STG(3) having pulse waveforms in the horizontal period H starting from timing t27((H) and (I) in FIG. 16). As a result, the imaging pixels P1 to which the control signals SRST(3) and STG(3) are supplied start to accumulate electric charges according to the amount of received light at timing t29.

Thus, the scanning unit 21 sequentially starts accumulation of the electric charges in the imaging pixels P1 by performing the accumulation start drive D1. Then, each imaging pixel P1 accumulates the electric charge in the accumulation period T10 until readout drive D2 is performed.

In addition, as illustrated in FIG. 15, the scanning unit 21 performs the reading drive D2 on the imaging pixels P1 in the normal pixel region R1 sequentially from the top in the vertical direction during the period between timing t10 to t11.

Specifically, for example, the scanning unit 21 generates the control signals SRST(1), STG(1), and SSEL(1) ((B) to (D) in FIG. 16) in the horizontal period H starting from timing t31, as illustrated in FIG. 16. As a result, the imaging pixel P1 supplied with the control signals SRST(1), STG(1) and SSEL(1) outputs the reset voltage Vreset as the signal SIG in the P-phase period TP and outputs the pixel voltage Vpix as the signal SIG in the D-phase period TD. Then, the readout unit 40 (readout units 40S and 40D) generates the digital code CODE by performing AD conversion on the basis of the signal SIG.

Next, in the horizontal period H starting from timing t32, the scanning unit 21 generates control signals SRST(2), STG(2), and SSEL(2) having pulse waveforms ((E) to (G) in FIG. 16). As a result, the imaging pixel P1 supplied with the control signals SRST(2), STG(2), and SSEL(2) outputs the signal SIG, and the readout unit 40 performs AD conversion on the basis of the signal SIG to generate the digital code CODE.

Next, in the horizontal period H starting from timing t33, the scanning unit 21 generates control signals SRST(3), STG(3) and SSEL(3) having pulse waveforms ((H) to (J) in FIG. 16). As a result, the imaging pixel P1 supplied with the control signals SRST(3), STG(3), and SSEL(3) outputs the signal SIG, and the readout unit 40 performs AD conversion on the basis of the signal SIG to generate the digital code CODE.

Thus, the imaging device 1 performs the reading drive D2 to sequentially perform AD conversion on the basis of the signal SIG (reset voltage Vreset and pixel voltage Vpix) from the imaging pixel P1.

The imaging device 1 repeats such accumulation start drive D1 and reading drive D2. Specifically, as illustrated in FIG. 15, the scanning unit 21 performs the accumulation start drive D1 during the period between timing t2 to t3 and the reading drive D2 during the period between timing t12 to t13. In addition, the scanning unit 21 performs the accumulation start drive D1 in the period from timing t4 to t5 and the reading drive D2 during the period between timing t14 to t15.

Next, the reading drive D2 will be described in detail.

FIG. 17 illustrates an operation example of the reading drive D2 in the imaging pixel P1 of interest, in which (A) indicates the waveform of the horizontal synchronization signal XHS, (B) indicates the waveform of the control signal SRST, (C) indicates the waveform of the control signal STG, (D) indicates the waveform of the control signal SSEL, (E) indicates the waveform of the reference signal REF, (F) indicates the waveform of the signal SIG, (G) indicates the waveform of the signal CMP output from the comparator 45 of the AD conversion unit ADC, (H) indicates the waveform of the clock signal CLK, and (I) indicates a count value CNT in the counter 46 of the AD conversion unit ADC. Here, (E) and (F) in FIG. 17 represent the waveform of the individual signals along the same voltage axis. The reference signal REF indicated in (E) in FIG. 17 represents the waveform at the positive input terminal of the comparator 45, and the signal SIG indicated in (F) in FIG. 17 represents the waveform at the negative input terminal of the comparator 45.

In the imaging device 1, in a certain horizontal period (H), the scanning unit 21 first performs the reset operation on the imaging pixels P1, and the AD conversion unit ADC performs AD conversion on the basis of the reset voltage Vreset output from the imaging pixels P1 in the subsequent P-phase period TP. Then, the scanning unit 21 performs a charge transfer operation on the imaging pixels P1, and the AD conversion unit ADC performs AD conversion on the basis of the pixel voltage Vpix output from the imaging pixels P1 in the D-phase period TD. This operation will be described in detail below.

First, at timing t41, when the horizontal period H starts, the scanning unit 21 changes the voltage of the control signal SSEL from the low level to the high level at timing t42 ((D) in FIG. 17). As a result, the transistor SEL is turned on in each imaging pixel P1, and the imaging pixel P1 is electrically connected to the signal line SGL.

Next, at timing t43, the scanning unit 21 changes the voltage of the control signal SRST from a low level to a high level ((B) in FIG. 17). As a result, the transistor RST is turned on in each imaging pixel P1, and the voltage of the floating diffusion FD is set to the power supply voltage VDDH (reset operation). Furthermore, the comparator 45 performs zero adjustment for electrically connecting the positive input terminal and the negative input terminal during the period between timing t43 to t45.

Next, at timing t44, the scanning unit 21 changes the voltage of the control signal SRST from a high level to a low level ((B) in FIG. 17). As a result, the transistor RST is turned off in each imaging pixel P1. Then, the imaging pixel P1 outputs the voltage (reset voltage Vreset) corresponding to this voltage of the floating diffusion FD after timing t44 ((F) in FIG. 17).

Next, at timing t45, the comparator 45 completes the zero adjustment and electrically disconnects the positive input terminal from the negative input terminal. Then, at timing t45, the reference signal generation unit 51 changes the voltage of the reference signal REF to the voltage V1 ((E) in FIG. 17).

Next, during the period between timing t46 to t48 (P-phase period TP), the readout unit 40 performs AD conversion on the basis of the reset voltage Vreset. Specifically, at timing t46, the control unit 50 first starts generating the clock signal CLK ((H) in FIG. 17). Simultaneously, the reference signal generation unit 51 of the control unit 50 starts to lower the voltage of the reference signal REF from the voltage V1 at a predetermined degree of change (variation pattern) ((E) in FIG. 17). In response to this, the counter 46 of the AD conversion unit ADC starts the counting operation and sequentially changes the count value CNT ((I) in FIG. 17).

Then, at timing t47, the voltage of the reference signal REF becomes lower than the voltage of the signal SIG (reset Vreset) ((E) and (F) in FIG. 17). In response to this, the comparator 45 of the AD conversion unit ADC changes the voltage of the signal CMP from a high level to a low level ((G) in FIG. 17). As a result, the counter 46 stops the counting operation ((I) in FIG. 17).

Next, at timing t48, the control unit 50 stops generating the clock signal CLK with the end of the P-phase period TP ((H) in FIG. 17). Simultaneously, the reference signal generation unit 51 stops changing the voltage of the reference signal REF, and changes the voltage of the reference signal REF to the voltage V2 at the subsequent timing t49 ((E) in FIG. 17). Accordingly, since the voltage of the reference signal REF exceeds the voltage of the signal SIG (reset voltage Vreset) ((E) and (F) in FIG. 17), the comparator 45 of the AD conversion unit ADC changes the voltage of the signal CMP from a low level to a high level ((G) in FIG. 17).

Next, at timing t50, the counter 46 of the AD conversion unit ADC inverts the polarity of the count value CNT on the basis of the control signal CC ((I) in FIG. 17).

Next, at timing t51, the scanning unit 21 changes the voltage of the control signal STG from a low level to a high level ((C) in FIG. 17). As a result, the transistor TG is turned on in the imaging pixel P1 and, consequently, the electric charge generated in the photodiode PD is transferred to the floating diffusion FD (charge transfer operation). In response to this, the voltage of the signal SIG decreases ((F) in FIG. 17).

Then, at timing t52, the scanning unit 21 changes the voltage of the control signal STG from the high level to the low level ((C) in FIG. 17). As a result, in the imaging pixel P1, the transistor TG is turned off. Then, after the timing t52, the imaging pixel P1 outputs a voltage (pixel voltage Vpix) corresponding to this voltage of the floating diffusion FD ((F) in FIG. 17).

Next, during the period between timing t53 to t55 (D-phase period TD), the readout unit 40 performs AD conversion on the basis of the pixel voltage Vpix. Specifically, first, at timing t53, the control unit 50 starts generating the clock signal CLK ((H) in FIG. 17). Simultaneously, the reference signal generation unit 51 of the control unit 50 starts to lower the voltage of the reference signal REF from the voltage V2 at a predetermined degree of change (variation pattern) ((E) in FIG. 17). In response to this, the counter 46 of the AD conversion unit ADC starts the counting operation and sequentially changes the count value CNT ((I) in FIG. 17).

Then, at timing t54, the voltage of the reference signal REF becomes lower than the voltage of the signal SIG (pixel voltage Vpix) ((E) and (F) in FIG. 17). In response to this, the comparator 45 of the AD conversion unit ADC changes the voltage of the signal CMP from a high level to a low level ((G) in FIG. 17). As a result, the counter 46 stops the counting operation ((I) in FIG. 17). Thus, the AD conversion unit ADC obtains the count value CNT according to the difference between the pixel voltage Vpix and the reset voltage Vreset. Then, the latch 47 of the AD conversion unit ADC holds the count value CNT and outputs the held count value CNT as a digital code CODE.

Next, at timing t55, the control unit 50 stops generating the clock signal CLK with the end of the D-phase period TD ((H) in FIG. 17). Simultaneously, the reference signal generation unit 51 stops changing the voltage of the reference signal REF, and changes the voltage of the reference signal REF to the voltage V3 at the subsequent timing t56 ((E) in FIG. 17). Accordingly, since the voltage of the reference signal REF exceeds the voltage of the signal SIG (pixel voltage Vpix) ((E) and (F) in FIG. 17), the comparator 45 of the AD conversion unit ADC changes the voltage of the signal CMP from a low level to a high level ((G) in FIG. 17).

Next, at timing t57, the scanning unit 21 changes the voltage of the control signal SSEL from the high level to the low level ((D) in FIG. 17). As a result, the transistor SEL is turned off in each imaging pixel P1, and the imaging pixel P1 is electrically disconnected from the signal line SGL.

Then, at timing t58, the counter 46 of the AD conversion unit ADC resets the count value CNT to "0" on the basis of the control signal CC ((I) in FIG. 17).

Thus, in the imaging device 1, the counting operation is performed on the basis of the reset voltage Vreset in the P-phase period TP, the polarity of the count value CNT is inverted, and then the counting operation is performed on the basis of the pixel voltage Vpix in the D-phase period TD. As a result, the imaging device 1 can acquire the digital code CODE corresponding to the voltage difference between the pixel voltage Vpix and the reset voltage Vreset. Since the imaging device 1 is configured to perform such correlated double sampling, noise components included in the pixel voltage Vpix can be eliminated and, accordingly, the image quality of the captured image can be enhanced.

The readout unit 40 (readout units 40S and 40N) converts the digital codes CODE output from the plurality of AD conversion units ADC into the image signals DATA0 (image signals DATA0S and DATA0N) and supplies the image signals DATA0 to the signal processing unit 60 via the bus line 100 (bus lines 100S and 100N). Next, the data transfer operation will be described in detail.

Figure 18A:
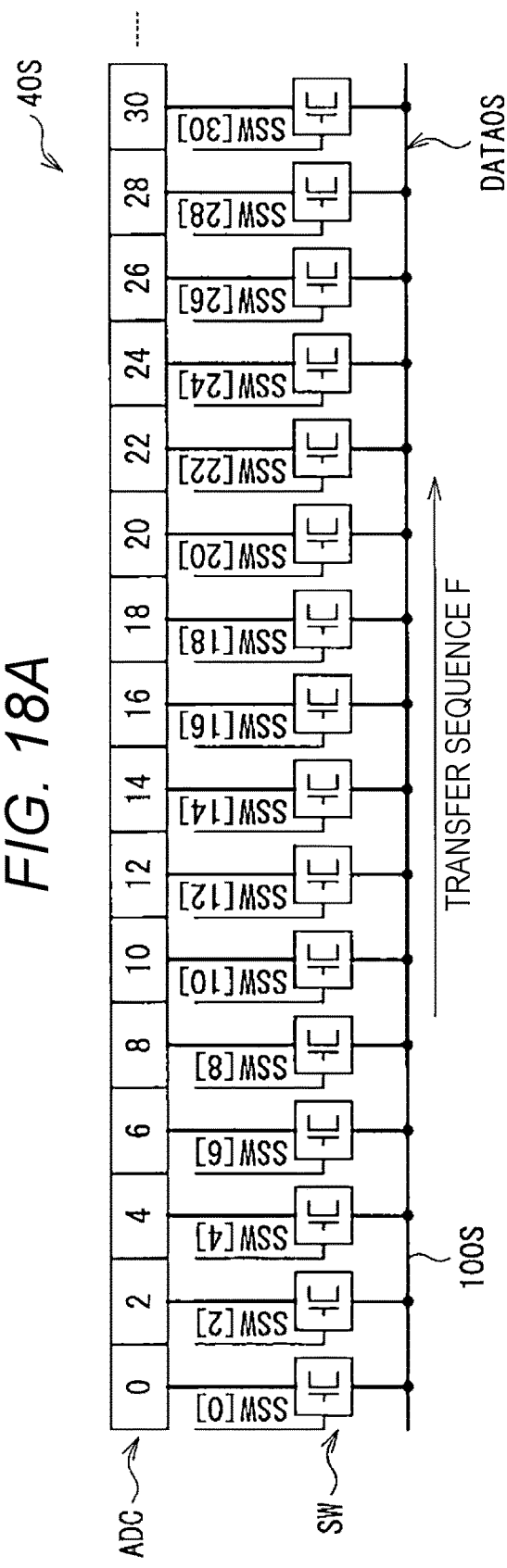
FIG. 18A is an explanatory diagram of an operation example of the readout unit illustrated in FIG. 7A.
Figure 18B:
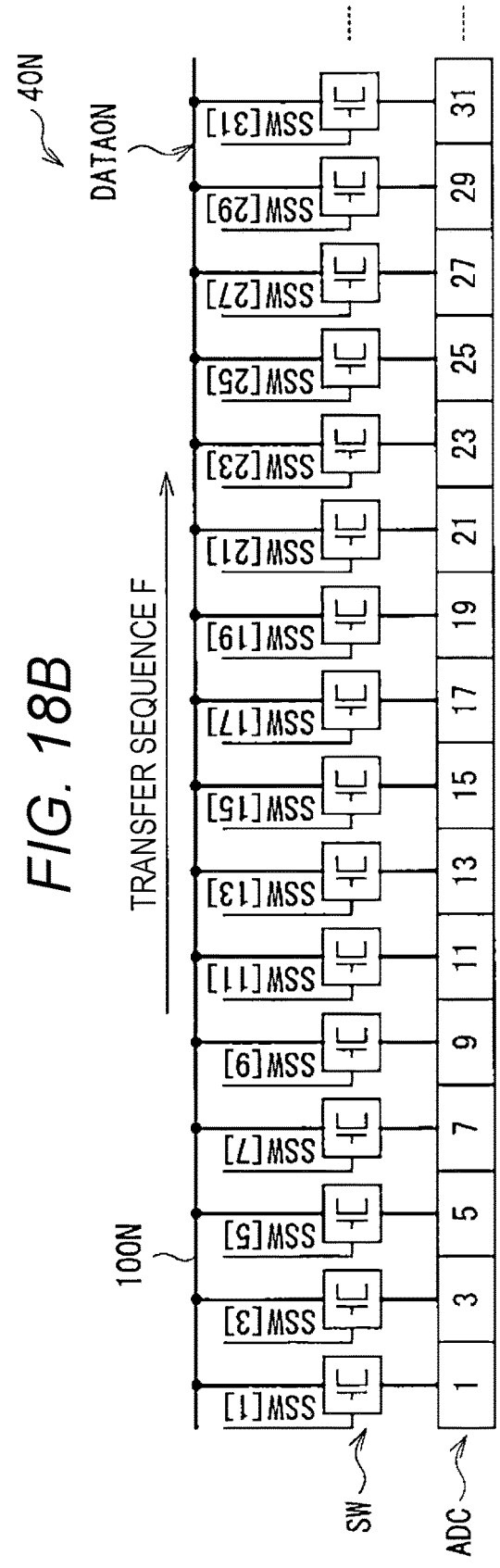
FIG. 18B is an explanatory diagram of an operation example of the readout unit illustrated in FIG. 7B.

FIG. 18A schematically illustrates an example of a data transfer operation in the readout unit 40S, and FIG. 18B schematically illustrates an example of a data transfer operation in the readout unit 40N. In FIGS. 18A and 18B, the thick lines indicate bus lines of a plurality of bits (13 bits in this example). In FIGS. 18A and 18B, for example, "0" in the AD conversion unit ADC indicates the 0th AD conversion unit ADC(0), and "1" indicates the first AD conversion unit ADC(1).

Figure 19:
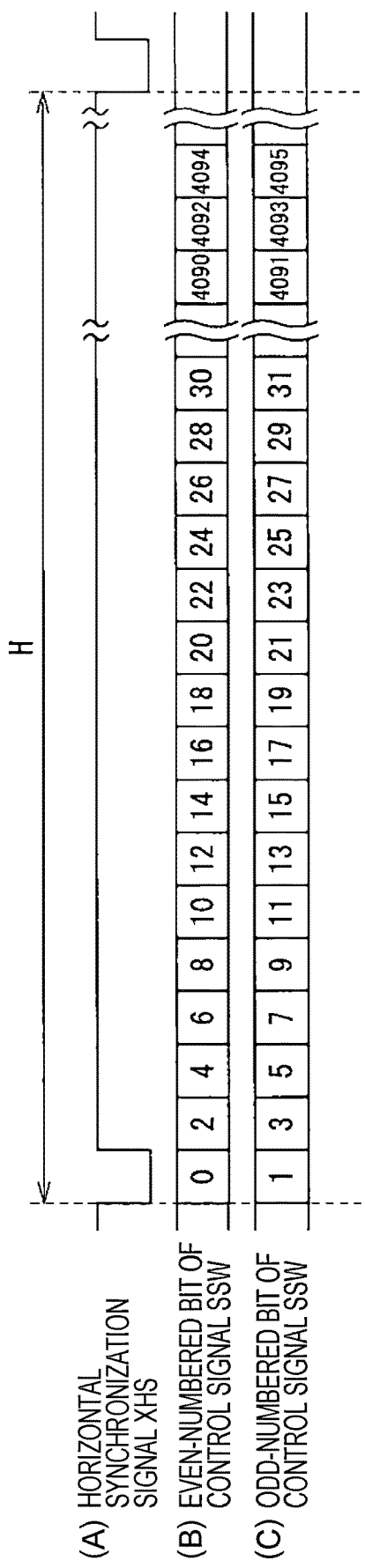
FIG. 19 is a timing chart of an operation example of the readout unit illustrated in FIGS. 18A and 18B.

FIG. 19 is a timing chart of the data transfer operation illustrated in FIGS. 18A and 18B, in which (A) indicates the waveform of the horizontal synchronization signal XHS, (B) indicates the even-numbered bits of the control signal SSW, and (C) indicates the odd-numbered bits of the control signal SSW. For example, in (B) in FIG. 19, "0" indicates that the "0"th bit of the control signal (control signal SSW[0]) among the even-numbered bits of the control signal SSW (control signals SSW[0], SSW[2], SSW[4], . . . ) is active, and other bits are inactive. Similarly, in (C) in FIG. 19, "1", for example, indicates that the "1"st bit of the control signal (control signal SSW[1]) among the odd-numbered bits of the control signal SSW (control signals SSW[1], SSW[3], SSW [5], . . . ) is active, and other bits are inactive.

The even-numbered bits of the control signal SSW become active for the control signals SSW[0], SSW[2], and SSW[4] in this order, as illustrated in (B) in FIG. 19. As a result, in the readout unit 40S (FIG. 18A), the digital code CODE of the 0th AD conversion unit ADC(0) is first supplied to the bus line 100S, then the digital code CODE of the second AD conversion unit ADC(2) is supplied to the bus line 100S, and then the digital code CODE of the fourth AD conversion unit ADC(4) is supplied to the bus line 100S. Thus, the digital codes CODE are transferred sequentially (in transfer sequence F) to the signal processing unit 60 as the image signal DATA0S from the left AD conversion unit ADC.

Similarly, the odd-numbered bits of the control signal SSW become active for the control signals SSW[1], SSW [3], and SSW[5] in this order, as illustrated in (C) in FIG. 19. As a result, in the readout unit 40N (FIG. 18B), the digital code CODE of the first AD conversion unit ADC(1) is first supplied to the bus line 100N, then the digital code CODE of the third AD conversion unit ADC(3) is supplied to the bus line 100N, and then the digital code CODE of the fifth AD conversion unit ADC(5) is supplied to the bus line 100N. Thus, the digital codes CODE are transferred sequentially (in transfer sequence F) to the signal processing unit 60 as the image signal DATA0N from the left AD conversion unit ADC.

Figure 20:
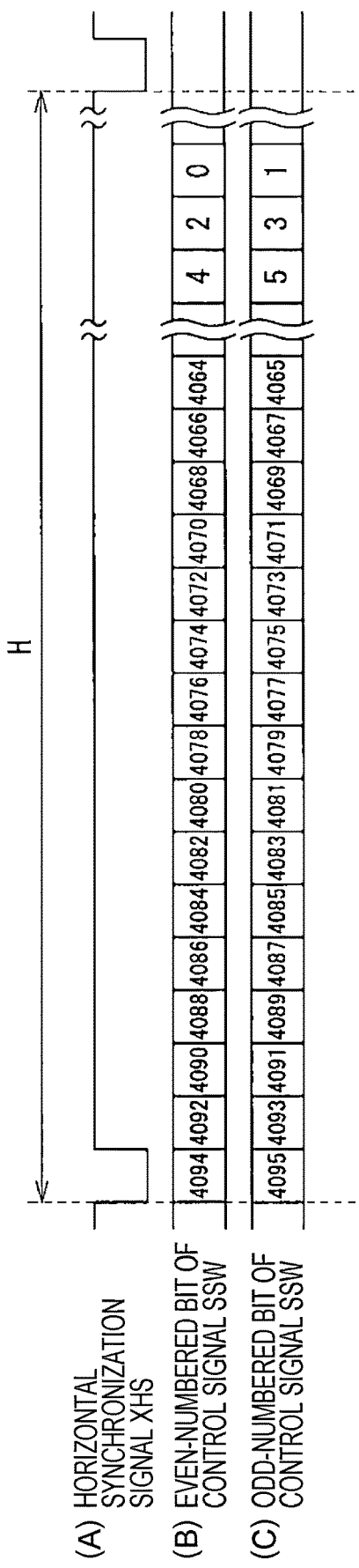
FIG. 20 is a timing chart of another operation example of the readout unit illustrated in FIGS. 18A and 18B.

FIG. 20 illustrates another operational example of the data transfer operation, in which (A) indicates the waveform of the horizontal synchronization signal XHS, (B) indicates even-numbered bits of the control signal SSW, and (C) indicates the odd-numbered bits of the control signal SSW.

As illustrated in (B) in FIG. 20, the even-numbered bits of the control signal SSW become active for the control signals SSW[4094], SSW[4092], and SSW[4090] in this order. As a result, in the readout unit 40S, the digital code CODE of the 4094th AD conversion unit ADC(4094) is first supplied to the bus line 100S, then the digital code CODE of the 4092nd AD conversion unit ADC(4092) is supplied to the bus line 100S, and then the digital code CODE of the 4090th AD conversion unit ADC(4090) is supplied to the bus line 100S. Thus, the digital codes CODE are transferred sequentially as the image signal DATA0S to the signal processing unit 60 from the right AD conversion unit ADC.

Similarly, the odd-numbered bits of the control signal SSW become active for the control signals SSW[4095], SSW[4093], and SSW[4091] in this order, as illustrated in (C) in FIG. 20. As a result, in the readout unit 40N, the digital code CODE of the 4095th AD conversion unit ADC(4095) is first supplied to the bus line 100N, the digital code CODE of the 4093rd AD conversion unit ADC(4093)

is supplied to the bus line 100N, and then the digital code CODE of the 4091st AD conversion unit ADC(4091) is supplied to the bus line 100N. Thus, the digital codes CODE are transferred sequentially as the image signal DATA0N to the signal processing unit 60 from the right AD conversion unit ADC.

Thus, the order of transferring the digital codes CODE from the plurality of AD conversion units ADC to the signal processing unit 60 can be changed in the imaging device 1. As a result, the laterally-inverted captured images can be easily obtained in the imaging device 1.

(Self-Diagnosis)

In FIG. 15, for example, the period from timing y11 to t12 is a so-called blanking period (vertical blanking period) T20 during which the imaging device 1 does not perform the reading drive D2. In other words, during this period, the signal line SGL does not transmit the reset voltage Vreset and the pixel voltage Vpix relating to the imaging pixels P1 in the normal pixel region R1. The imaging device 1 performs self-diagnosis using the blanking period T20. In the following, some self-diagnosis will be described as an example. Note that, in one blanking period T20, the imaging device 1 can perform one of self-diagnosis steps described below and perform different self-diagnosis for each blanking period T20. In addition, the imaging device 1 may perform a plurality of self-diagnosis among self-diagnosis described below in one blanking period T20.

(Self-Diagnosis A1)

The self-diagnosis A1 mainly diagnoses whether or not the signal line SGL can normally transmit the signal SIG, together with the diagnosis of the basic operation of the AD conversion unit ADC. Specifically, the voltage generation units 30A and 30B of the signal generation unit 22 apply the control signal VMA to the control line VMAL and the control signal VMB to the control line VMBL. Then, in the blanking period T20, the dummy pixel P3 outputs the signal SIG corresponding to the voltages of the control signals VMA and VMB to the signal line SGL. The readout unit 40 generates the digital code CODE by performing AD conversion on the basis of the signal SIG. Then, the diagnosis unit 61 performs the diagnosis processing on the basis of the digital code CODE. This operation will be described in detail below.

Figure 21:
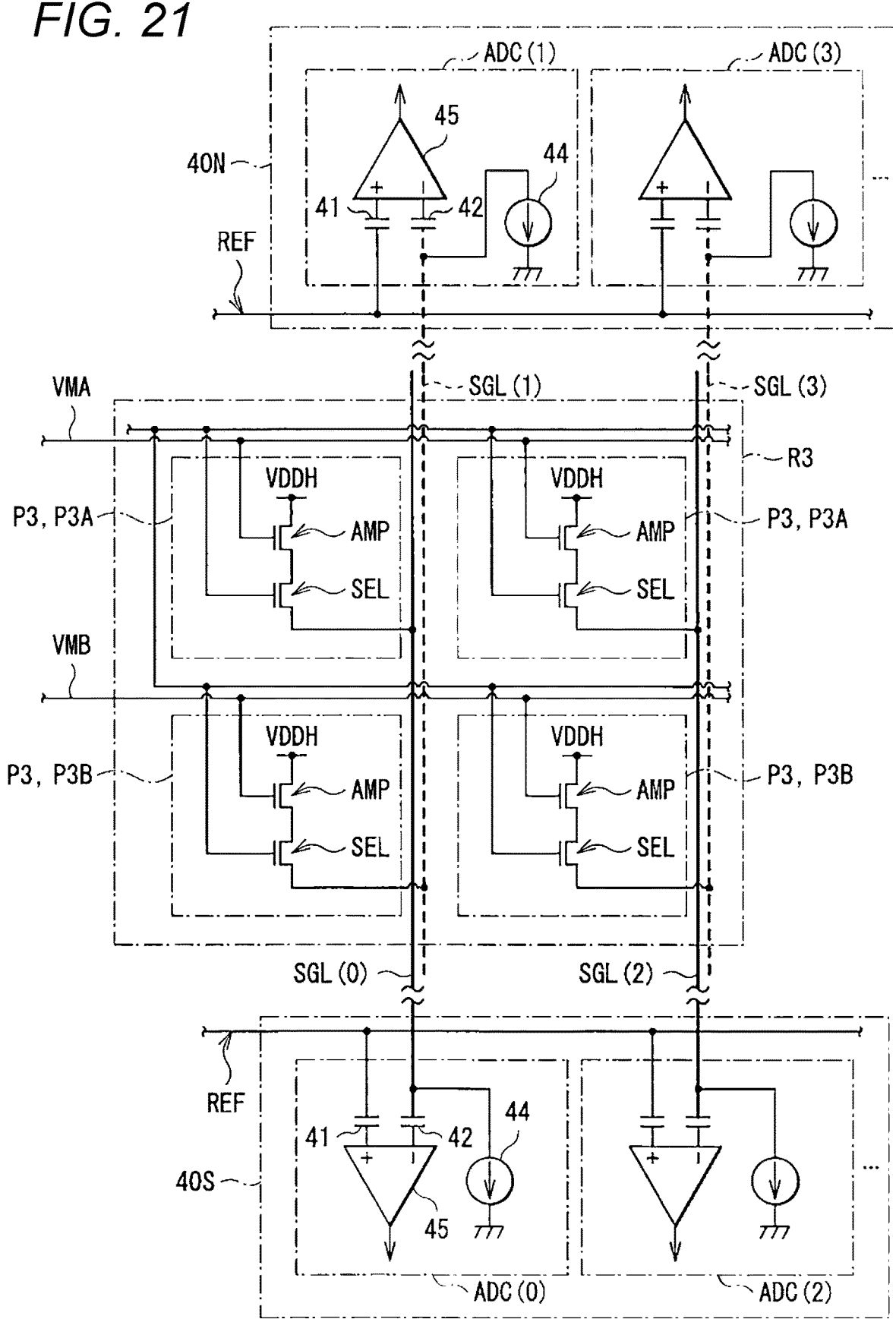
FIG. 21 is an explanatory diagram of an operation example of the imaging device illustrated in FIG. 1.

FIG. 21 illustrates an example of self-diagnosis A1. In the self-diagnosis A1, the voltage generation unit 30A of the signal generation unit 22 generates the control signal VMA by generating the voltage V10 in the P-phase period TP and the voltage V11 lower than the voltage V10 in the D-phase period TD. In addition, the voltage generation unit 30B generates the control signal VMB by generating the voltage V10 in the P-phase period TP and the voltage V12 lower than the voltage V11 in the D-phase period TD. Thus, the voltage generation units 30A and 30B generate different voltages in the D-phase period TD. The dummy pixels P3A in the dummy pixel region R3 output the signal SIG corresponding to the voltage of the control signal VMA to the even-numbered signal line SGL (e.g., the signal line SGL(0)) during the P-phase period TP and the D-phase period TD. The dummy pixels P3B output the signal SIG corresponding to the voltage of the control signal VMB to the odd-numbered signal line SGL (e.g., the signal line SGL(1)). As a result, in the D-phase period TD, the voltage of the even-numbered signal lines SGL (e.g., the signal line SGL(0)) and the voltage of the odd-numbered signal lines SGL (e.g., the signal line SGL(1)) adjacent to the signal line SGL are different from each other.

The readout unit 40 (readout units 40S and 40N) generates the image signal DATA0 (image signals DATA0S and DATA0N) by performing the AD conversion on the basis of the signal SIG. The diagnosis unit 61 of the signal processing unit 60 performs diagnosis processing on the basis of the signal DATA0 and outputs the error flag signal XERR and the diagnosis result RES.

Hereinafter, focusing on the dummy pixel P3 (dummy pixel P3A) connected to the 0th signal line SGL(0) and the dummy pixel P3 (dummy pixel P3B) connected to the first signal line SGL(1), the self-diagnosis A1 will be described.

Figure 22:
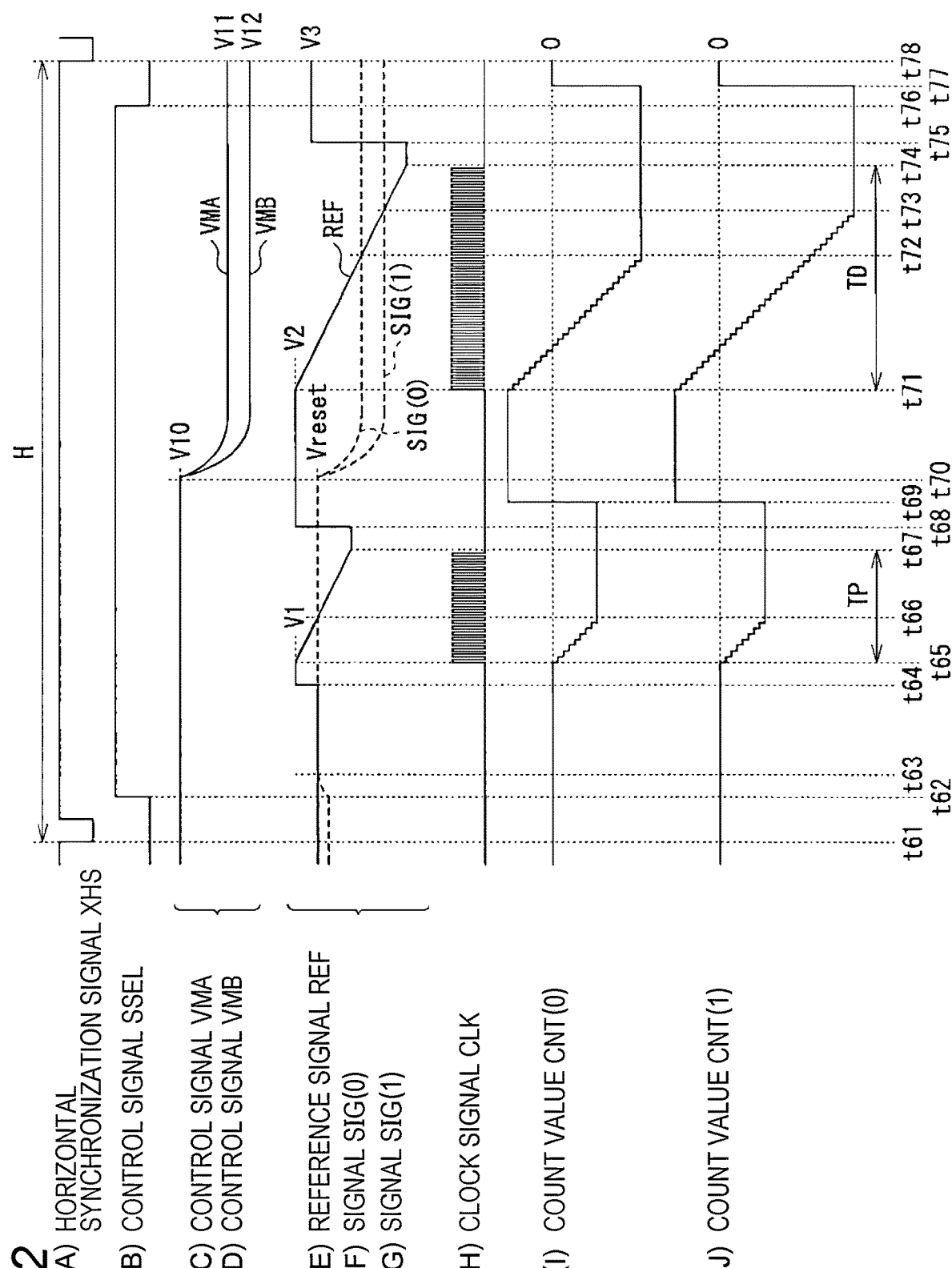
FIG. 22 is a timing waveform illustrating another operation example of the imaging device illustrated in FIG. 1.

FIG. 22 illustrates an operation example of the self-diagnosis A1, in which (A) indicates the waveform of the horizontal synchronization signal XHS, (B) indicates the waveform of the control signal SSEL, (C) indicates the waveform of the control signal VMA, (D) indicates the waveform of the control signal VMB, (E) indicates the waveform of the reference signal REF, (F) indicates the waveform of the signal SIG (signal SIG(0)) on the signal line SGL(0), (G) indicates the waveform of the signal SIG (signal SIG(1)) on the first signal line SGL(1), (H) indicates the waveform of the clock signal CLK, (I) indicates a count value CNT (count value CNT(0)) in the counter 46 of the 0th AD conversion unit ADC(0), and (J) indicates a count value CNT (count value CNT(1)) in the counter 46 of the first AD conversion unit ADC(1). Here, (C) and (D) in FIG. 22 represent the waveform of the individual signals along the same voltage axis. Similarly, (E) to (G) in FIG. 22 represent the waveform of the individual signals along the same voltage axis.

First, at timing t61, when the horizontal period H in the blanking period T20 starts, the scanning unit 21 changes the voltage of the control signal SSEL from the low level to the high level at timing t62 ((B) in FIG. 22). As a result, in the dummy pixels P3A and P3B, the transistors SEL are turned on, the dummy pixels P3A is electrically connected to the signal line SGL(0), and the dummy pixel P3B is electrically connected to the signal line SGL(1). As a result, after the timing t62, the dummy pixel P3A outputs the voltage corresponding to the voltage (voltage V10) of the control signal VMA as the signal SIG(0) ((C) and (F) in FIG. 22), and the dummy pixel P3B outputs the voltage corresponding to the voltage (voltage V10) of the control signal VMB as the signal SIG(1) ((D) and (G) in FIG. 22).

Then, the comparator 45 performs zero adjustment for electrically connecting the positive input terminal and the negative input terminal during the period between timing t63 and t64.

Next, at timing t64, the comparator 45 completes the zero adjustment and electrically disconnects the positive input terminal from the negative input terminal. Then, at the timing t64, the reference signal generation unit 51 changes the voltage of the reference signal REF to the voltage V1.

Next, during the period between timing t65 and timing t67 (the P-phase period TP), the readout unit 40 performs AD conversion. Specifically, first, at timing t65, the control unit 50 starts generating the clock signal CLK ((H) in FIG. 22). Simultaneously, the reference signal generation unit 51 of the control unit 50 starts to lower the voltage of the reference signal REF from the voltage V1 at a predetermined degree of change ((E) in FIG. 22). The counter 46 of the AD conversion unit ADC(0) starts the counting operation and sequentially changes the count value CNT(0) ((I) in FIG. 22). Similarly, the counter 46 of the AD conversion unit ADC(1) starts the counting operation and sequentially changes the count value CNT(1) ((J) in FIG. 22).

Then, at timing t66, when the voltage of the reference signal REF becomes lower than the voltage of the signal SIG(0) ((E) and (F) in FIG. 22), the counter 46 of the AD conversion unit ADC(0) stops the counting operation on the basis of the signal CMP ((I) in FIG. 22). Similarly, at the timing t66, when the voltage of the reference signal REF becomes lower than the voltage of the signal SIG(1) ((E) and (G) in FIG. 22), the counter 46 of the AD conversion unit ADC(1) stops the counting operation on the basis of the signal CMP ((J) in FIG. 22).

Next, at timing t67, the control unit 50 stops generating the clock signal CLK with the end of the P-phase period TP ((H) in FIG. 22). Simultaneously, the reference signal generation unit 51 stops changing the voltage of the reference signal REF, and changes the voltage of the reference signal REF to the voltage V2 at the subsequent timing t68 ((E) in FIG. 22).

Next, at timing t69, the counter 46 of the AD conversion unit ADC(0) inverts the polarity of the count value CNT(0) on the basis of the control signal CC ((I) in FIG. 22). Similarly, the counter 46 of the AD conversion unit ADC(1) inverts the polarity of the count value CNT(1) on the basis of the control signal CC ((J) in FIG. 22).

Next, at timing t70, the voltage generation unit 30A of the signal generation unit 22 changes the voltage of the control signal VMA to the voltage V11 ((C) in FIG. 22), and the voltage generation unit 30B changes the voltage of the control signal VMB to the voltage V12 ((D) in FIG. 22). In response to this, the voltages of the signals SIG(0) and SIG(1) decrease ((F) and (G) in FIG. 22).

Next, during the period between timing t71 and t74 (D-phase period TD), the readout unit 40 performs AD conversion. Specifically, first, at timing t71, the control unit 50 starts generating the clock signal CLK ((H) in FIG. 22). Simultaneously, the reference signal generation unit 51 of the control unit 50 starts to lower the voltage of the reference signal REF from the voltage V2 at a predetermined degree of change ((E) in FIG. 22). In response to this, the counter 46 of the AD conversion unit ADC(0) starts the counting operation to sequentially change the count value CNT(0) ((I) in FIG. 22). Similarly, the counter 46 of the AD conversion unit ADC(1) starts the counting operation to sequentially change the count value CNT(1) ((J) in FIG. 22).

Then, when the voltage of the reference signal REF becomes lower than the voltage of the signal SIG(0) at timing t72 ((E) and (F) in FIG. 22), the counter 46 of the AD conversion unit ADC(0) stops counting operation ((I) in FIG. 22). Then, the latch 47 of the AD conversion unit ADC(0) holds the count value CNT(0) and outputs the held count value CNT(0) as the digital code CODE.

In addition, when the voltage of the reference signal REF becomes lower than the voltage of the signal SIG(1) at timing t73 ((E) and (G) in FIG. 22), the counter 46 of the AD conversion unit ADC(1) stops the counting operation ((J) in FIG. 22). Then, the latch 47 of the AD conversion unit ADC(1) holds the count value CNT(1) and outputs the held count value CNT(1) as the digital code CODE.

Next, at timing t74, the control unit 50 stops generating the clock signal CLK with the end of the D-phase period TD ((H) in FIG. 22). Simultaneously, the reference signal generation unit 51 stops changing the voltage of the reference signal REF, and changes the voltage of the reference signal REF to the voltage V3 at the subsequent timing t75 ((E) in FIG. 22).

Next, at timing t76, the scanning unit 21 changes the voltage of the control signal SSEL from the high level to the low level ((B) in FIG. 22). As a result, in the dummy pixels P3A and P3B, the transistors SEL are turned off, the dummy pixel P3A is electrically disconnected from the signal line SGL(0), and the dummy pixel P3B is electrically disconnected from the signal line SGL(1).

Then, at timing t77, the counter 46 of the AD conversion unit ADC(0) resets the count value CNT(0) to "0" on the basis of the control signal CC ((I) in FIG. 22). Similarly, the counter 46 of the AD conversion unit ADC(1) resets the count value CNT(1) to "0" on the basis of the control signal CC ((J) in FIG. 22).

The readout unit 40 (readout units 40S and 40N) generates the image signal DATA0 (image signals DATA0S and DATA0N) including the digital code CODE generated by the AD conversion, and the diagnosis unit 61 of the signal processing unit 60 performs the diagnosis processing on the basis of the image signal DATA0.

On the basis of the digital code CODE, the diagnosis unit 61 can diagnose, for example, whether or not the signal line SGL in the pixel array 10 is disconnected. Specifically, for example, the diagnosis unit 61 can diagnose whether or not the signal line SGL is disconnected by checking whether or not the value of the generated digital code CODE falls within a predetermined range corresponding to the voltages V11 and V12 having different fixed voltage values. In particular, as illustrated in FIG. 12, in a case where the semiconductor substrate 201 on which the pixel array 10 is formed is connected to the semiconductor substrate 202 on which the readout unit 40 is formed with vias 203, the diagnosis unit 61 can diagnose, for example, whether or not connection failure of the vias 203 exists on the basis of the digital code CODE.

Furthermore, the diagnosis unit 61 can diagnose, for example, whether or not the adjacent signal lines SGL are short-circuited on the basis of the digital code CODE. In particular, the voltages of the control signals VMA and VMB are set to different voltages in the D-phase period TD in the signal generation unit 22, so that the voltage of the even-numbered signal line SGL (e.g., the signal line SGL(0)) and the voltage of the odd-numbered signal line SGL (e.g., the signal line SGL(1)) adjacent to the signal line SGL are different from each other. On the other hand, in a case where these signal lines SGL, for example, are short-circuited, the digital codes CODE become the same. The diagnosis unit 61 can diagnose whether or not the adjacent signal lines SGL are short-circuited on the basis of the digital code CODE.

Furthermore, the diagnosis unit 61 can diagnose whether or not the signal line SGL is short-circuited with other lines such as a power supply line, a ground line, or the like on the basis of the digital code CODE. In other words, in a case where such a short circuit occurs, the voltage of the signal line SGL is fixed to the same voltage as the voltage of the short-circuited line (power supply line or the like), and the digital code CODE changes to a value according to the voltage value. The diagnosis unit 61 can diagnose whether or not the signal line SGL is short-circuited with another line on the basis of the digital code CODE.

In addition, the diagnosis unit 61 can diagnose whether or not the current source 44 is connected to the signal line SGL or whether or not the current source 44 is short-circuited with another line on the basis of the digital code CODE.

Furthermore, the diagnosis unit 61 can diagnose the dynamic range of the imaging device 1, for example, by appropriately setting the voltages V11 and V12. Specifically, for example, the voltage V12 can be set to a voltage corresponding to highlight.

Furthermore, the diagnosis unit 61 can diagnose the characteristics of the AD conversion unit ADC on the basis of the digital code CODE. Specifically, for example, the diagnosis unit 61 can diagnose whether or not AD conversion can be performed in the P-phase period TP. In other words, the P-phase period TP is in a shorter time length than the D-phase period TD, and there is a narrow time margin. Therefore, the diagnosis unit 61 can diagnose, for example, the operation margin during the P-phase period TP by confirming the count value CNT(0) after the P-phase period TP has ended when the voltage V10 is set to various voltages.

(Self-Diagnosis A2)

The imaging device 1 changes a gain of conversion in the AD conversion unit ADC by changing the degree of change (variation pattern) of the voltage of the reference signal REF in order to shoot the image of a dark subject or a bright subject. The self-diagnosis A2 diagnoses whether or not the reference signal generation unit 51 can change the degree of change of the voltage of the reference signal REF. Specifically, the reference signal generation unit 51 changes the degree of change of the voltage of the reference signal REF during the P-phase period TP and the D-phase period TD in the blanking period T20. In this example, the signal generation unit 22 generates the same control signals VMA and VMB. Then, in the blanking period T20, the dummy pixel P3 outputs the signal SIG corresponding to the voltages of the control signals VMA and VMB to the signal line SGL. The readout unit 40 generates the digital code CODE by performing AD conversion on the basis of the signal SIG using the reference signal REF in which the degree of change has been changed. Then, the diagnosis unit 61 performs diagnosis processing on the basis of the digital code CODE and outputs the error flag signal XERR and the diagnosis result RES. This operation will be described in detail below.

Figure 23:
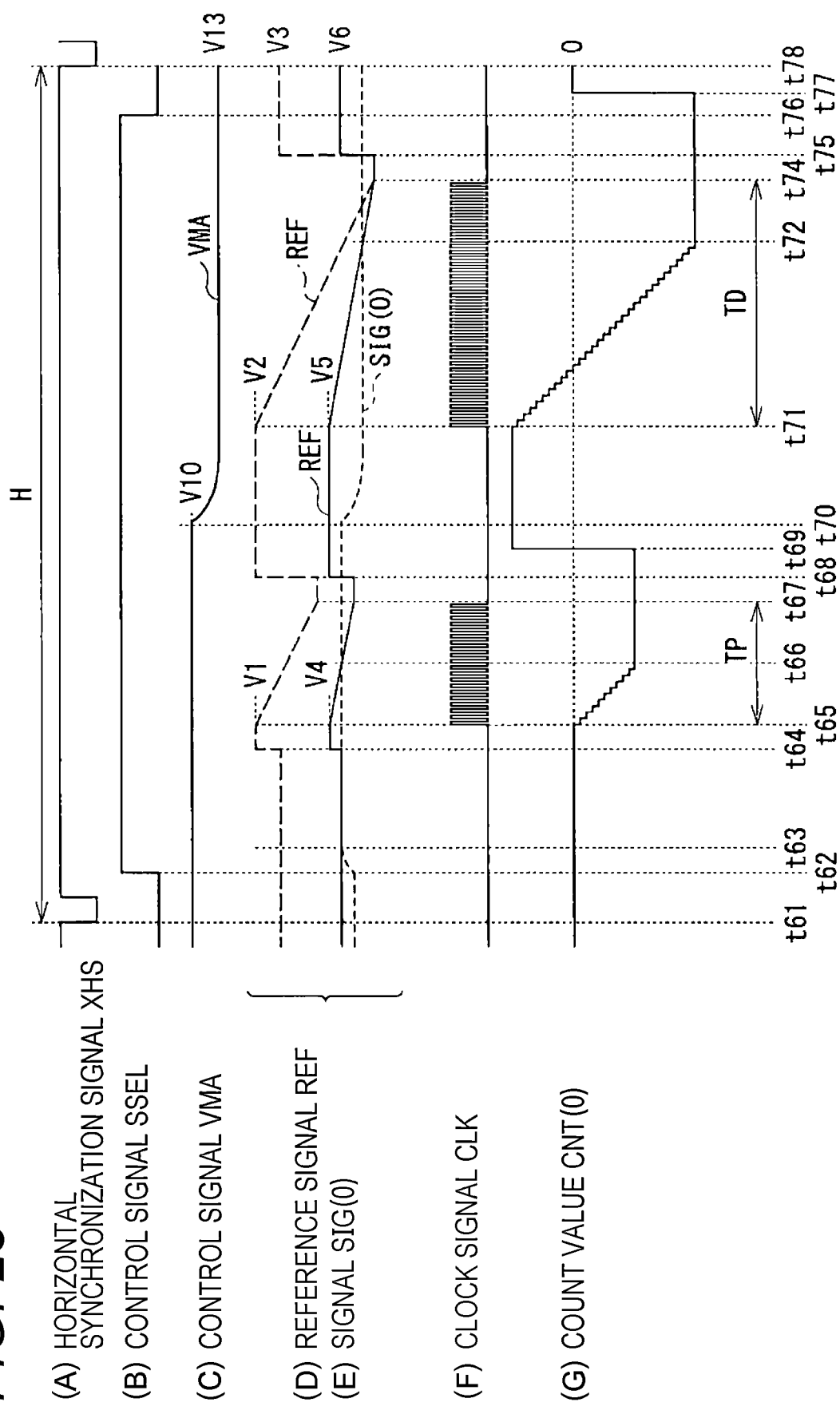
FIG. 23 is a timing waveform of an operation example of the imaging device illustrated in FIG. 1.

FIG. 23 illustrates an operation example of self-diagnosis A2, in which (A) indicates the waveform of the horizontal synchronization signal XHS, (B) indicates the waveform of the control signal SSEL, (C) indicates the waveform of the control signal VMA, (D) indicates the waveform of the reference signal REF, (E) indicates the waveform of the signal SIG (signal SIG(0)) on the signal line SGL(0), (F) indicates the waveform of the clock signal CLK, and (G) indicates a count value CNT (count value CNT(0)) in the counter 46 of the 0th AD conversion unit ADC(0).

In this example, the reference signal generation unit 51 generates the reference signal REF having a degree of change of the voltage smaller than that of the self-diagnosis A1. Note that in FIG. 23, the reference signal REF in the self-diagnosis A1 is indicated by a broken line for the convenience of explanation.

First, at timing t61, when the horizontal period H in the blanking period T20 starts, the scanning unit 21 changes the voltage of the control signal SSEL from the low level to the high level at timing t62 ((B) in FIG. 23). As a result, after the timing t62, the dummy pixel P3A outputs the voltage corresponding to the voltage (voltage V10) of the control signal VMA as the signal SIG(0) ((C) and (E) in FIG. 23).

Next, the comparator 45 performs zero adjustment for electrically connecting the positive input terminal and the negative input terminal during the period between timing t63 and t64. Then, at the timing t64, the reference signal generation unit 51 changes the voltage of the reference signal REF to the voltage V4 ((D) in FIG. 23).

Then, in the period between timing t65 and timing t67 (P-phase period TP), the readout unit 40 performs AD conversion. At timing t65, the reference signal generation unit 51 of the control unit 50 starts to lower the voltage of the reference signal REF from the voltage V4 at a predetermined degree of change ((D) in FIG. 23). The counter 46 of the AD conversion unit ADC(0) starts the counting operation at timing t65 and stops the counting operation at timing t66 ((G) in FIG. 23).

Next, at timing t67, the reference signal generation unit 51 stops changing the voltage of the reference signal REF, and changes the voltage of the reference signal REF to the voltage V5 at the subsequent timing t68 ((D) in FIG. 23). Then, at timing t69, the counter 46 of the AD conversion unit ADC(0) inverts the polarity of the count value CNT(0) on the basis of the control signal CC ((G) in FIG. 23).

Next, at timing t70, the voltage generation unit 30A of the signal generation unit 22 changes the voltage of the control signal VMA to the voltage V13 ((C) in FIG. 23). In response to this, the voltage of the signal SIG(0) decreases ((E) in FIG. 23).

Next, during the period between timing t71 and t74 (D-phase period TD), the readout unit 40 performs AD conversion. At timing t71, the reference signal generation unit 51 of the control unit 50 starts to lower the voltage of the reference signal REF from the voltage V5 at a predetermined degree of change ((D) in FIG. 23). The counter 46 of the AD conversion unit ADC(0) starts the counting operation at timing t71 and stops the counting operation at timing t72 ((G) in FIG. 23). Then, the AD conversion unit ADC(0) outputs the count value CNT(0) as the digital code CODE.

Next, at timing t74, the reference signal generation unit 51 stops changing the voltage of the reference signal REF, and changes the voltage of the reference signal REF to the voltage V6 at the subsequent timing t75 ((D) in FIG. 23).

Then, at timing t76, the scanning unit 21 changes the voltage of the control signal SSEL from the high level to the low level ((B) in FIG. 23). Then, at timing t77, the counter 46 of the AD conversion unit ADC(0) resets the count value CNT(0) to "0" on the basis of the control signal CC ((G) in FIG. 23).

The readout unit 40 (readout units 40S and 40N) generates the image signal DATA0 (image signals DATA0S and DATA0N) including the digital code CODE generated by the AD conversion, and the diagnosis unit 61 of the signal processing unit 60 performs the diagnosis processing on the basis of the image signal DATA0.

The diagnosis unit 61 can diagnose, for example, whether or not the reference signal generation unit 51 can change the degree of inclination of the reference signal REF on the basis of the digital code CODE. In other words, the imaging device 1 changes, for example, the degree of inclination of the reference signal REF in order to enable imaging of a bright subject or a dark subject. Specifically, in a case of imaging a dark subject, the imaging device 1 increases the conversion gain in the AD conversion unit ADC by decreasing the degree of inclination of the reference signal REF. For example, the conversion gain in imaging a dark subject can be increased by 30 [dB] higher than the conversion gain in imaging a bright subject. The diagnosis unit 61 diagnoses, for example, whether or not the reference signal generation unit 51 can change the degree of inclination of the reference signal REF on the basis of the digital code CODE generated when the inclination degree of the reference signal REF is changed.

Furthermore, for example, similar to the case of the self-diagnosis A1, when the various values are set for the degree of inclination of the reference signal REF, the diagnosis unit 61 can confirm the count value CNT(0) after the end of the P-phase period TP to confirm, for example, the operation margin in the P-phase period TP.

(Self-Diagnosis A3) In order to subtract the contribution of the dark current of the photodiode PD, the imaging device 1 adjusts the voltage offset amount OFS of the reference signal REF in the D-phase period TD. The self-diagnosis A3 diagnoses whether or not the reference signal generation unit 51 can change the voltage of the reference signal REF in the D-phase period TD. Specifically, in the blanking period T20, the reference signal generation unit 51 changes the voltage offset amount OFS of the reference signal REF in the D-phase period TD. In this example, the signal generation unit 22 generates the same control signals VMA and VMB. Then, in the blanking period T20, the dummy pixel P3 outputs the signal SIG corresponding to the voltages of the control signals VMA and VMB to the signal line SGL. The readout unit 40 generates the digital code CODE by performing AD conversion on the basis of the signal SIG using the reference signal REF in which the degree of change has been changed. Then, the diagnosis unit 61 performs diagnosis processing on the basis of the digital code CODE and outputs the error flag signal XERR and the diagnosis result RES. This operation will be described in detail below.

Figure 24:
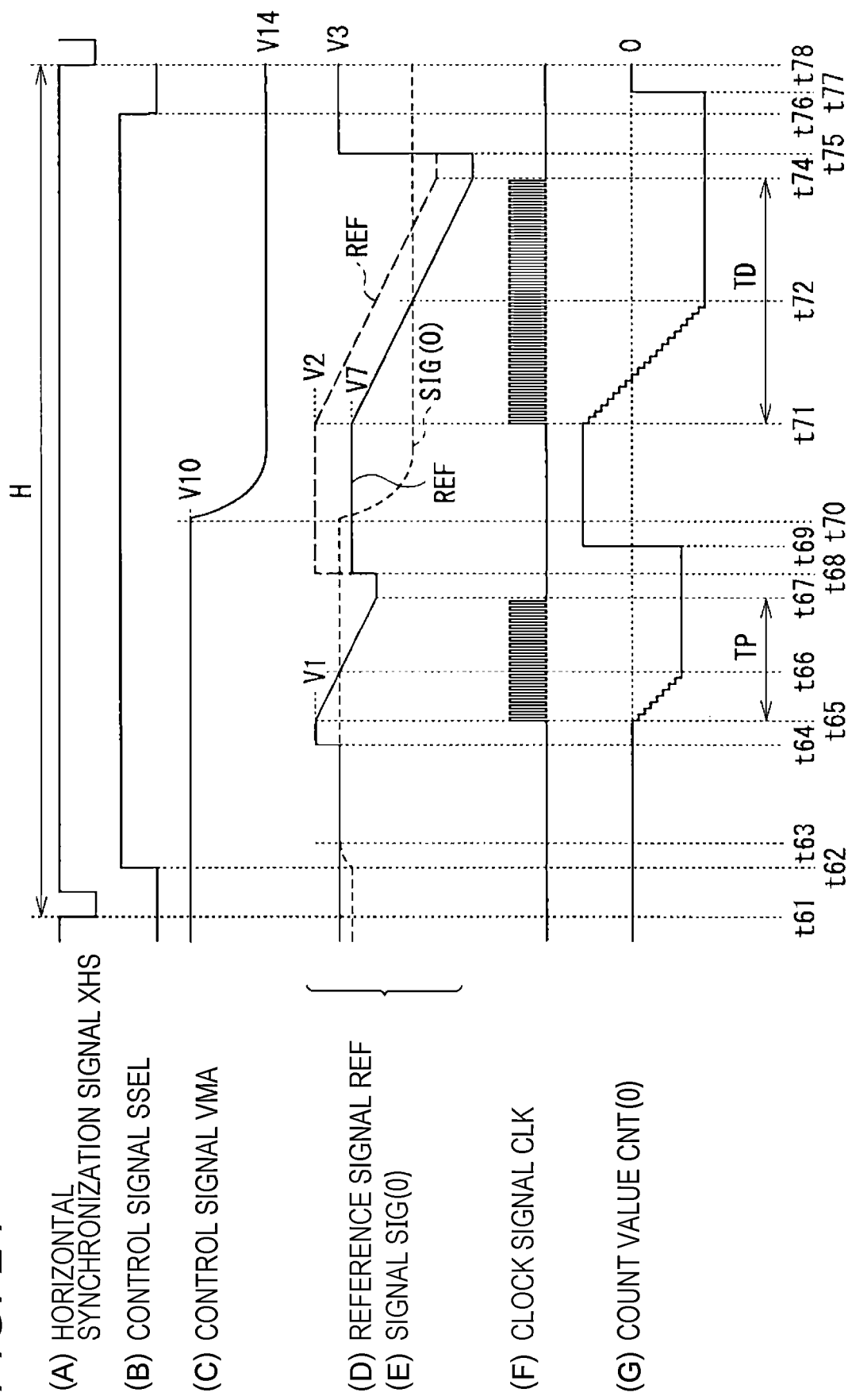
FIG. 24 is a timing waveform of another operation example of the imaging device illustrated in FIG. 1.

FIG. 24 illustrates an operation example of self-diagnosis A3, in which (A) indicates the waveform of the horizontal synchronization signal XHS, (B) indicates the waveform of the control signal SSEL, (C) indicates the waveform of the control signal VMA, (D) indicates the waveform of the reference signal REF, (E) indicates the waveform of the signal SIG (signal SIG(0)) on the signal line SGL(0), (F) indicates the waveform of the clock signal CLK, and (G) indicates the count value CNT (count value CNT(0)) in the counter 46 of the 0th AD conversion unit ADC(0).

In this example, the reference signal generation unit 51 lowers the voltage level of the reference signal REF in the D-phase period TD when compared to the self-diagnosis A1. Note that in FIG. 24, the reference signal REF in the self-diagnosis A1 is indicated by a broken line for the convenience of explanation.

First, at timing t61, when the horizontal period H in the blanking period T20 starts, the scanning unit 21 changes the voltage of the control signal SSEL from the low level to the high level at timing t62 ((B) in FIG. 24). As a result, after the timing t62, the dummy pixel P3A outputs the voltage corresponding to the voltage (voltage V10) of the control signal VMA as the signal SIG(0) ((C) and (E) in FIG. 24).

Next, the comparator 45 performs zero adjustment for electrically connecting the positive input terminal and the negative input terminal during the period between timing t63 and t64. Then, at timing t64, the reference signal generation unit 51 changes the voltage of the reference signal REF to the voltage V1 ((D) in FIG. 24).

Then, in the period between timing t65 and timing t67 (P-phase period TP), the readout unit 40 performs AD conversion. At timing t65, the reference signal generation unit 51 of the control unit 50 starts to lower the voltage of the reference signal REF from the voltage V1 at a predetermined degree of change ((D) in FIG. 24). The counter 46 of the AD conversion unit ADC(0) starts the counting operation at timing t65, and stops the counting operation at timing t66 ((G) in FIG. 24).

Next, at timing t67, the reference signal generation unit 51 stops changing the voltage of the reference signal REF, and changes the voltage of the reference signal REF to the voltage V7 at the subsequent timing t68 ((D) in FIG. 24). Then, at timing t69, the counter 46 of the AD conversion unit ADC(0) inverts the polarity of the count value CNT(0) on the basis of the control signal CC ((G) in FIG. 24).

Next, at timing t70, the voltage generation unit 30A of the signal generation unit 22 changes the voltage of the control signal VMA to the voltage V14 ((C) in FIG. 24). In response to this, the voltage of the signal SIG(0) decreases ((E) in FIG. 24).

Next, during the period between timing t71 and t74 (D-phase period TD), the readout unit 40 performs AD conversion. At timing t71, the reference signal generation unit 51 of the control unit 50 starts to lower the voltage of the reference signal REF from the voltage V7 at a predetermined degree of change ((D) in FIG. 24). The counter 46 of the AD conversion unit ADC(0) starts the counting operation at timing t71 and stops the counting operation at timing t72 ((G) in FIG. 24). Then, the latch 47 of the AD conversion unit ADC(0) holds the count value CNT(0) and outputs the held count value CNT(0) as the digital code CODE.

Next, at timing t74, the reference signal generation unit 51 stops changing the voltage of the reference signal REF, and at the subsequent timing t75, changes the voltage of the reference signal REF to the voltage V3 ((D) in FIG. 24).

Then, at timing t76, the scanning unit 21 changes the voltage of the control signal SSEL from the high level to the low level ((B) in FIG. 24). Then, at timing t77, the counter 46 of the AD conversion unit ADC(0) resets the count value CNT(0) to "0" on the basis of the control signal CC ((G) in FIG. 24).

The readout unit 40 (readout units 40S and 40N) generates the image signal DATA0 (image signals DATA0S and DATA0N) including the digital code CODE generated by the AD conversion, and the diagnosis unit 61 of the signal processing unit 60 performs the diagnosis processing on the basis of the image signal DATA0.

On the basis of the digital code CODE, the diagnosis unit 61 can diagnose, for example, whether or not the reference signal generation unit 51 can change the voltage of the reference signal REF in the D-phase period TD. In other words, the imaging device 1 adjusts the voltage offset amount OFS of the reference signal REF in the D-phase period TD in order to subtract the contribution of the dark current of the photodiode PD. Specifically, the imaging device 1 increases the voltage offset amount OFS in a case where the dark current is large. The diagnosis unit 61 diagnoses, for example, whether or not the reference signal generation unit 51 can change the voltage of the reference signal REF in the D-phase period TD on the basis of the digital code CODE acquired when the voltage of the reference signal REF is changed in the D-phase period TD.

(Self-Diagnosis A4)

In shooting an image of a very bright subject, the imaging device 1 uses the dummy pixel P4 to limit the voltage of the signal SIG so that the voltage of the signal SIG does not become excessively low in a predetermined period before the P-phase period TP. This operation will be described below.

Figure 25:
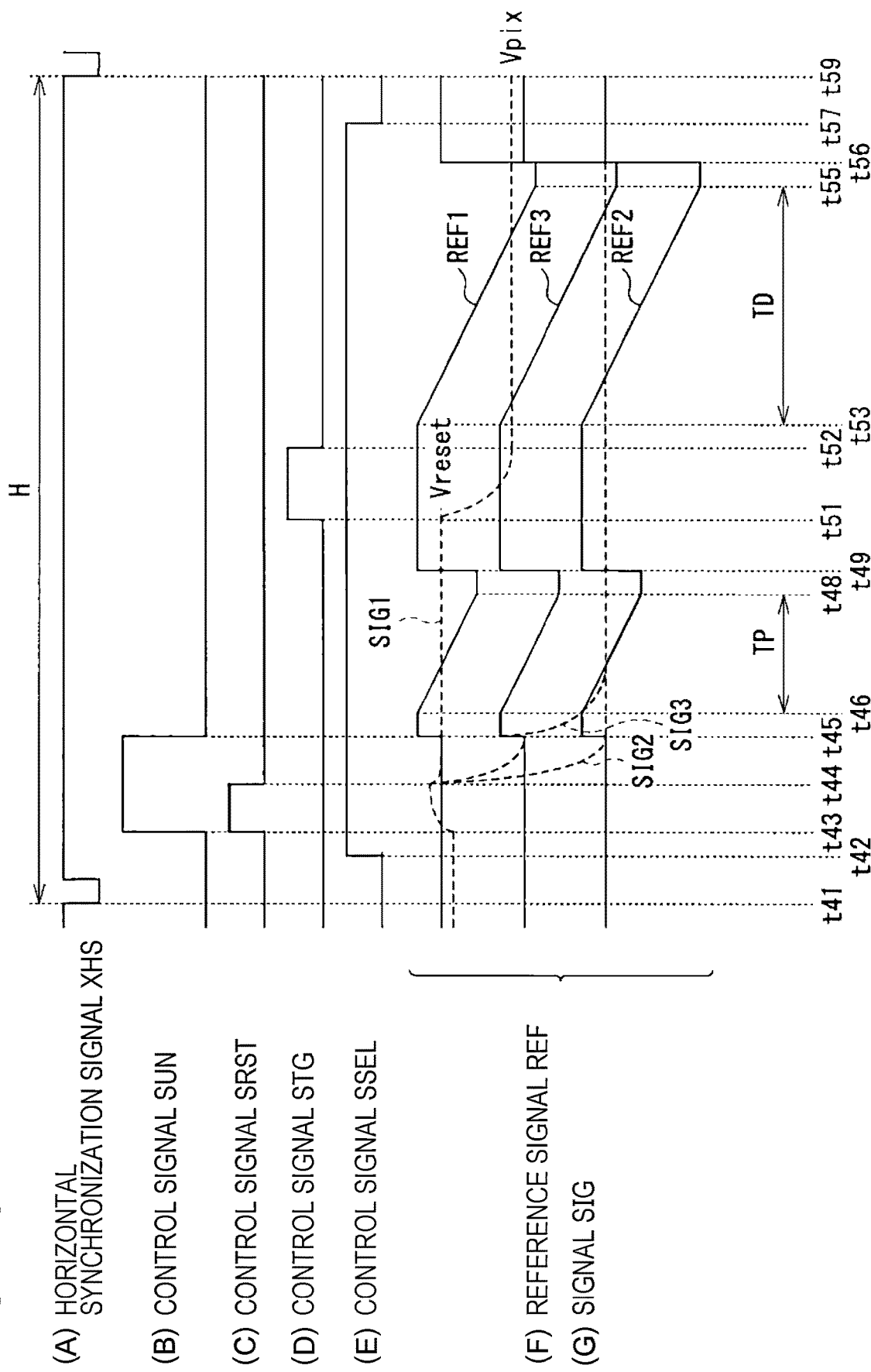
FIG. 25 is a timing waveform of another operation example of the imaging device illustrated in FIG. 1.

FIG. 25 illustrates an operation example of reading drive D2 of the imaging pixel P1 of interest, in which (A) indicates the waveform of the horizontal synchronization signal XHS, (B) indicates the waveform of the control signal SUN, (C) indicates the waveform of the control signal SRST, (D) indicates the waveform of the control signal STG, (E) indicates the waveform of the signal SSEL, (F) indicates the waveform of the reference signal REF (reference signals REF1, REF2, and REF3), and (G) indicates the waveform of the signal SIG (signals SIG1, SIG2, and SIG3). Here, (F)

and (G) in FIG. 25 represent the waveform of the individual signals along the same voltage axis. In (F) and (G) in FIG. 25, the reference signal REF1 and the signal SIG1 are the reference signal REF and the signal SIG in the case of shooting the object of normal brightness. In other words, the reference signal REF1 and the signal SIG1 are the same as those illustrated in FIG. 17. The reference signal REF2 and the signal SIG2 are the reference signal REF and the signal SIG in the case of shooting a very bright subject and are signals while the dummy pixels P4 do not work. The reference signal REF3 and the signal SIG3 are the reference signal REF and the signal SIG in the case of shooting a very bright subject and are signals while the dummy pixels P4 work.

In the case of shooting the image of the subject with normal brightness, the AD conversion unit ADC performs AD conversion in the P-phase period TP on the basis of the signal SIG1 using the reference signal REF1, while performing AD conversion in the D-phase period TD, as in the case in FIG. 17. Then, as in the case in FIG. 17, the AD conversion unit ADC outputs the count value CNT as the digital code CODE.

On the other hand, when the image of a very bright subject is shot, electrons leak from the photodiode PD of the peripheral imaging pixel P1 to the floating diffusion FD of the imaging pixel P1 of interest, so that the signal SIG2 becomes low after timing t44 ((G) in FIG. 25). Since the comparator 45 performs zero adjustment for electrically connecting the positive input terminal and the negative input terminal during the period between timing t43 and t45, the reference signal REF2 also decreases to match the signal SIG2 ((F) in FIG. 25). Thereafter, the AD conversion unit ADC performs AD conversion in the P-phase period TP and performs AD conversion in the D-phase period TD. However, in this case, the signal SIG2 becomes excessively low and is saturated, so that the signal SIG2 is not able to change after timing t51 ((G) in FIG. 25). Therefore, the AD conversion unit ADC outputs a value close to "0" as the digital code CODE. In other words, the digital code CODE has a value close to "0" although the subject is very bright.

Therefore, the imaging device 1 uses the dummy pixel P4 to limit the voltage of the signal SIG in a predetermined period before the P-phase period TP. Specifically, the signal generation unit 23 sets the control signal SUN to a high voltage during the period between timing t43 and t45 ((B) in FIG. 25). The dummy pixel P4 outputs a voltage corresponding to the control signal SUN to the signal line SGL during the period between timing t43 and t45. Therefore, during the period between timing t43 and t45, the voltage of the signal SIG3 is suppressed from being lowered. Thus, the voltage of the signal SIG3 is limited to a voltage corresponding to the voltage of the control signal SUN. Since the comparator 45 performs zero adjustment for electrically connecting the positive input terminal and the negative input terminal during the period between timing t43 and t45, the reference signal REF3 also becomes higher than the reference signal REF2. Then, at timing t45, when the voltage of the control signal SUN decreases ((B) in FIG. 25), the voltage of the signal SIG3 decreases to the same level as the voltage of the signal SIG2. The voltage of the signal SIG3 is typically lower than the reference signal REF2 in the P-phase period TP. Therefore, the counter 46 of the AD conversion unit ADC continues counting operation in the P-phase period TP, and reaches a predetermined count value (full count value) at timing t48 at which generation of the clock signal CLK is stopped. In a case where the full count value is reached in the P-phase period TP, the counter 46 continues counting regardless of the signal CMP output from the comparator 45 in the following D-phase period TD. As a result, the imaging device 1 can avoid the digital code CODE from becoming a value close to "0" despite the fact that the subject is very bright.

Thus, in shooting a very bright object, the imaging device 1 uses the dummy pixel P4 to limit the voltage of the signal SIG so that the voltage of the signal SIG does not become excessively low in the predetermined period before the P-phase period TP. In the self-diagnosis A4, whether or not the function of limiting the voltage of the signal SIG works is diagnosed. Specifically, the signal generation unit 22 sets the control signals VMA and VMB to low voltage. In this example, the signal generation unit 22 generates the same control signals VMA and VMB. Then, in the blanking period T20, the dummy pixel P3 outputs the signal SIG corresponding to the voltages of the control signals VMA and VMB to the signal line SGL. The readout unit 40 generates the digital code CODE by performing AD conversion on the basis of the signal SIG. Then, the diagnosis unit 61 performs diagnosis processing on the basis of the digital code CODE and outputs the error flag signal XERR and the diagnosis result RES. This operation will be described in detail below.

Figure 26:
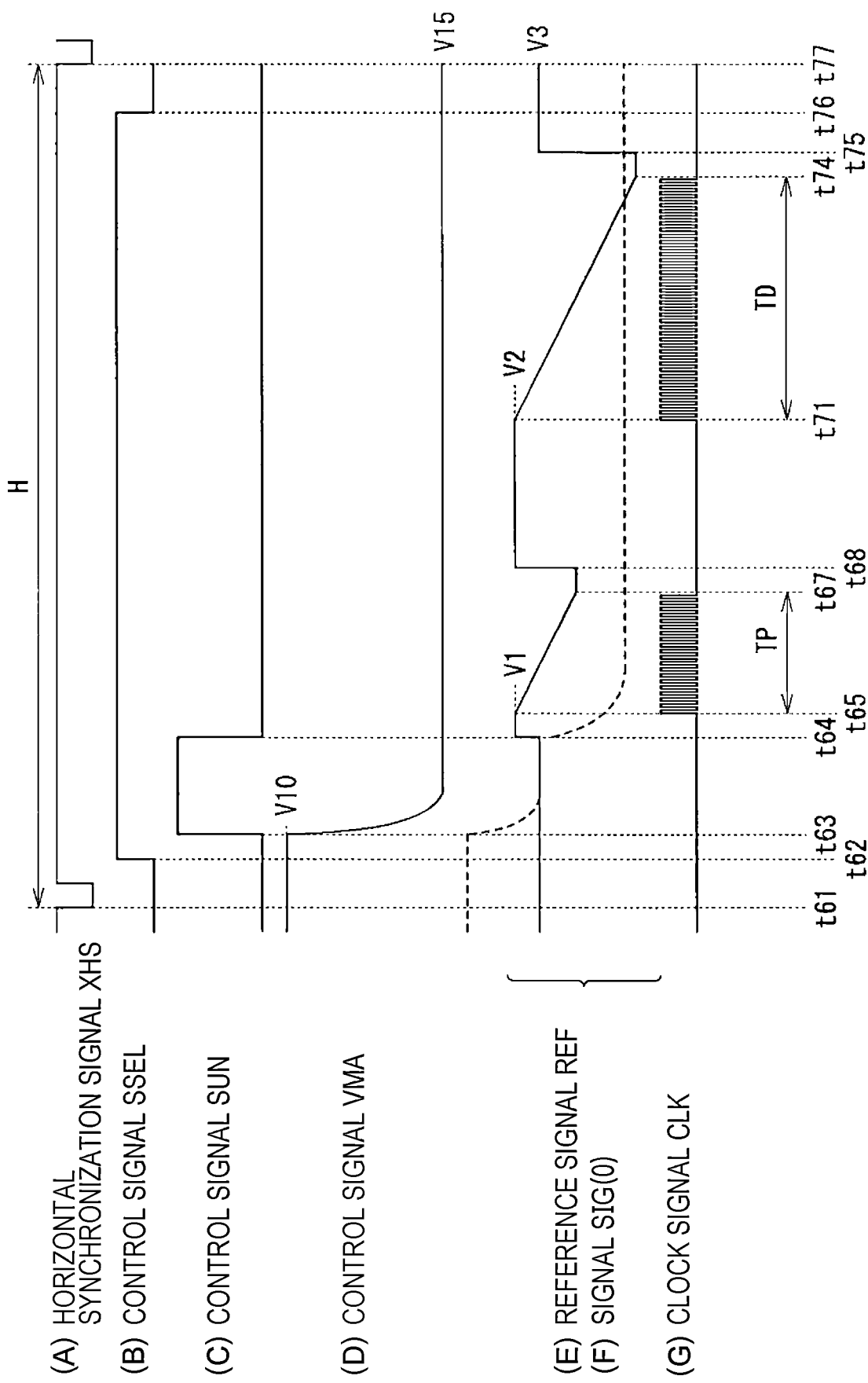
FIG. 26 is a timing waveform of another operation example of the imaging device illustrated in FIG. 1.

FIG. 26 illustrates an operation example of self-diagnosis A4, in which (A) indicates the waveform of the horizontal synchronization signal XHS, (B) indicates the waveform of the control signal SSEL, (C) indicates the waveform of the control signal SUN, (D) indicates the waveform of the control signal VMA, (E) indicates the waveform of the reference signal REF, (F) indicates the waveform of the signal SIG (signal SIG(0)) on the signal line SGL(0), and (G) indicates the waveform of the clock signal CLK.

First, at timing t61, when the horizontal period H in the blanking period T20 starts, the scanning unit 21 changes the voltage of the control signal SSEL from the low level to the high level at timing t62 ((B) in FIG. 26).

Then, at timing t63, the signal generation unit 22 changes the voltage of the control signal VMA to the low voltage V15 ((D) in FIG. 26). In response to this, the signal SIG(0) also decreases ((F) in FIG. 26). Also, at this timing t63, the signal generation unit 23 changes the voltage of the control signal SUN to a high voltage. As a result, the decrease of the signal SIG(0) is suppressed ((F) in FIG. 26). The comparator 45 performs zero adjustment for electrically connecting the positive input terminal and the negative input terminal during the period between timing t63 and t64.

Next, at timing t64, the signal generation unit 23 changes the voltage of the control signal SUN to a low voltage ((C) in FIG. 26). In response to this, the signal SIG(0) decreases ((F) in FIG. 26).

Then, in the period between timing t65 and timing t67 (P-phase period TP), the readout unit 40 performs AD conversion. At time t65, the reference signal generation unit 51 of the control unit 50 starts to lower the voltage of the reference signal REF from the voltage V1 at a predetermined degree of change ((E) in FIG. 26). The counter 46 of the AD conversion unit ADC(0) starts the counting operation at timing t65. However, the voltage of the signal SIG(0) is typically lower than the reference signal REF in the P-phase period TP, so that the counter 46 of the AD conversion unit ADC(0) continues counting in the P-phase period TP and comes to a predetermined count value (count value CNTF1) at timing t67 at which the generation of the CLK is stopped. As a result, the counter 46 determines that the counting operation should be continued regardless of the signal CMP output from the comparator 45 in the next D-phase period TD.

At timing t67, the reference signal generation unit 51 stops changing the voltage of the reference signal REF, and changes the voltage of the reference signal REF to the voltage V2 at the subsequent timing t68 ((E) in FIG. 26). Thereafter, although not illustrated, the counter 46 of the AD conversion unit ADC(0) inverts the polarity of the count value CNT(0) on the basis of the control signal CC.

Next, during the period between timing t71 and t74 (D-phase period TD), the readout unit 40 performs AD conversion. At timing t71, the reference signal generation unit 51 of the control unit 50 starts to lower the voltage of the reference signal REF from the voltage V2 at a predetermined degree of change ((E) in FIG. 26). The counter 46 of the AD conversion unit ADC(0) starts the counting operation at timing t71. Then, in the D-phase period TD, the counter 46 continues counting regardless of the signal CMP output from the comparator 45. As a result, the counter 46 becomes a predetermined count value (count value CNTF2) at timing t74 at which the generation of the clock signal CLK is stopped. Then, the AD conversion unit ADC(0) outputs the count value CNT(0) as the digital code CODE.

At timing t74, the reference signal generation unit 51 stops changing the voltage of the reference signal REF, and changes the voltage of the reference signal REF to the voltage V3 at the subsequent timing t75 ((E) in FIG. 26).

Then, at timing t76, the scanning unit 21 changes the voltage of the control signal SSEL from the high level to the low level ((B) in FIG. 26). Thereafter, although not illustrated, the counter 46 resets the count value CNT(0) to "0" on the basis of the control signal CC.

The readout unit 40 (readout units 40S and 40N) generates the image signal DATA0 (image signals DATA0S and DATA0N) including the digital code CODE generated by the AD conversion, and the diagnosis unit 61 of the signal processing unit 60 performs the diagnosis processing on the basis of the image signal DATA0.

The diagnosis unit 61 diagnoses whether or not the function of limiting the voltage of the signal SIG works on the basis of the digital code CODE. Specifically, the diagnosis unit 61 diagnoses that the function of limiting the voltage of the signal SIG works by, for example, confirming that the digital code CODE has reached a predetermined count value (count value CNTF2).

Furthermore, the diagnosis unit 61 can confirm the operation of the counter 46 on the basis of the digital code CODE. Specifically, in this operation, utilizing the fact that the counter 46 continues to perform the count operation, the diagnosis unit 61 confirms the count value CNT(0) after the end of the P-phase period TP and the count value CNT(0) after the end of the D-phase period TD to check whether or not the counting operation of the counter 46 is performed normally. Furthermore, the diagnosis unit 61 checks the count value CNT(0) after the end of the P-phase period TP and the count value CNT(0) before the start of the D-phase period TD to confirm whether or not the counter 46 inverts the polarity of the count value CNT. Furthermore, the diagnosis unit 61 can confirm whether or not the counter 46 can reset the count value CNT to "0" after the D-phase period TD on the basis of the digital code CODE.

(Self-Diagnosis A5)

In the imaging device 1, the two voltage generation units 30A and 30B each include a temperature sensor 33. Therefore, the imaging device 1 can detect temperatures. In the self-diagnosis A5, the temperature sensor 33 diagnoses whether or not the voltage Vtemp can be generated according to the temperature. Specifically, in the D-phase period TD within the blanking period T20, the signal generation unit 22 outputs the voltage Vtemp output from the temperature sensor 33 as control signals VMA and VMB. In this example, the signal generation unit 22 generates the same control signals VMA and VMB. Then, in the blanking period T20, the dummy pixel P3 outputs the signal SIG corresponding to the voltages of the control signals VMA and VMB to the signal line SGL. The readout unit 40 generates the digital code CODE by performing AD conversion on the basis of the signal SIG. Then, the diagnosis unit 61 performs diagnosis processing on the basis of the digital code CODE and outputs the error flag signal XERR and the diagnosis result RES. This operation will be described in detail below.

Figure 27:
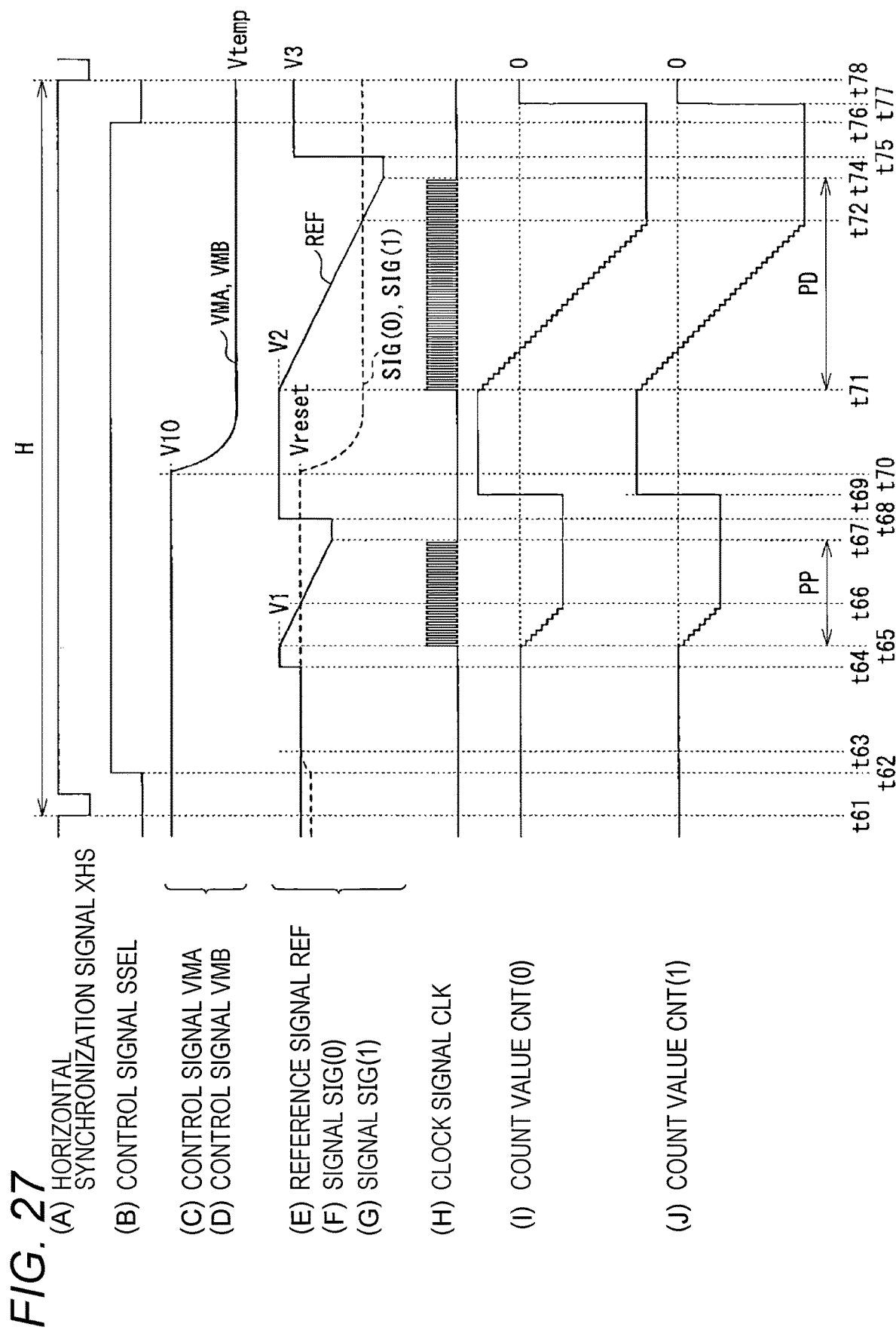
FIG. 27 is a timing waveform illustrating another operation example of the imaging device illustrated in FIG. 1.

FIG. 27 illustrates an operation example of self-diagnosis A5, in which (A) indicates the waveform of the horizontal synchronization signal XHS, (B) indicates the waveform of the control signal SSEL, (C) indicates the waveform of the control signal VMA, (D) indicates the waveform of the control signal VMB, (E) indicates the waveform of the reference signal REF, (F) indicates the waveform of the signal SIG (signal SIG(0)) on the signal line SGL(0), (G) indicates the waveform of the signal SIG (signal SIG(1)) on the signal line SGL(1), (H) indicates the waveform of the clock signal CLK, (I) indicates the count value CNT (count value CNT(0)) in the counter 46 of the 0th AD conversion unit ADC(0), and (J) indicates the count value CNT (count value CNT(1)) in the counter 46 of the first AD conversion unit ADC(1).

First, at timing t61, when the horizontal period H within the blanking period T20 starts, the scanning unit 21 changes the voltage of the control signal SSEL from the low level to the high level at timing t62 ((B) in FIG. 27). As a result, after the timing t62, the dummy pixel P3A outputs the voltage corresponding to the voltage (voltage V10) of the control signal VMA as the signal SIG(0) ((C) and (F) in FIG. 27), and the dummy pixel P3B outputs the voltage corresponding to the voltage (voltage V10) of the control signal VMB as the signal SIG(1) ((D) and (G) in FIG. 27).

Next, the comparator 45 performs zero adjustment for electrically connecting the positive input terminal and the negative input terminal during the period between timing t63 and t64. Then, at timing t64, the reference signal generation unit 51 changes the voltage of the reference signal REF to the voltage V1 ((E) in FIG. 27).

Then, in the period between timing t65 and timing t67 (P-phase period TP), the readout unit 40 performs AD conversion. At timing t65, the reference signal generation unit 51 of the control unit 50 starts to lower the voltage of the reference signal REF from the voltage V1 at a predetermined degree of change ((E) in FIG. 27). The counter 46 of the AD conversion unit ADC(0) starts the counting operation at timing t65 and stops the counting operation at timing t66 ((I) in FIG. 27). Similarly, the counter 46 of the AD conversion unit ADC(1) starts the counting operation at timing t65, and stops the counting operation at timing t66 ((J) in FIG. 27).

Next, at timing t67, the reference signal generation unit 51 stops changing the voltage of the reference signal REF, and changes the voltage of the reference signal REF to the voltage V2 at the subsequent timing t68 ((E) in FIG. 27).

Next, at timing t69, the counter 46 of the AD conversion unit ADC(0) inverts the polarity of the count value CNT(0) ((I) in FIG. 27) on the basis of the control signal CC. Similarly, the counter 46 of the AD conversion unit ADC(1) inverts the polarity of the count value CNT(1) on the basis of the control signal CC ((J) in FIG. 27).

Next, at timing t70, the voltage generation unit 30A of the signal generation unit 22 outputs the voltage Vtemp output from the temperature sensor 33 of the voltage generation unit 30A as the control signal VMA ((C) in FIG. 27). Similarly, the voltage generation unit 30B outputs the voltage Vtemp output from the temperature sensor 33 of the voltage generation unit 30B as the control signal VMB ((D) in FIG. 27). In response to this, the voltages of the signals SIG(0) and SIG(1) decrease ((F) and (G) in FIG. 27).

Next, during the period between timing t71 and t74 (D-phase period TD), the readout unit 40 performs AD conversion. At timing t71, the reference signal generation unit 51 of the control unit 50 starts to lower the voltage of the reference signal REF from the voltage V2 at a predetermined degree of change ((E) in FIG. 27). The counter 46 of the AD conversion unit ADC(0) starts the counting operation at timing t71 and stops the counting operation at timing t72 ((I) in FIG. 27). Then, the AD conversion unit ADC(0) outputs the count value CNT(0) as the digital code CODE. Similarly, the counter 46 of the AD conversion unit ADC(1) starts the counting operation at timing t71 and stops the counting operation at timing t72 ((J) in FIG. 27). Then, the AD conversion unit ADC(1) outputs the count value CNT(1) as the digital code CODE.

Next, at timing t74, the reference signal generation unit 51 stops changing the voltage of the reference signal REF, and changes the voltage of the reference signal REF to the voltage V3 at the subsequent timing t75 ((E) in FIG. 27).

Then, at timing t76, the scanning unit 21 changes the voltage of the control signal SSEL from the high level to the low level ((B) in FIG. 27). Then, at timing t77, the counter 46 of the AD conversion unit ADC(0) resets the count value CNT(0) to "0" ((I) in FIG. 27) on the basis of the control signal CC. Similarly, the counter 46 of the AD conversion unit ADC(1) resets the count value CNT(1) to "0" on the basis of the control signal CC ((J) in FIG. 27).

The readout unit 40 (readout units 40S and 40N) generates the image signal DATA0 (image signals DATA0S and DATA0N) including the digital code CODE generated by the AD conversion, and the diagnosis unit 61 of the signal processing unit 60 performs the diagnosis processing on the basis of the image signal DATA0.

On the basis of the digital code CODE, for example, the diagnosis unit 61 can diagnose whether or not the temperature sensor 33 of the voltage generation units 30A and 30B can generate the voltage Vtemp corresponding to the temperature. Specifically, the diagnosis unit 61 can diagnose whether or not the temperature sensor 33 can generate the voltage Vtemp corresponding to the temperature by confirming, for example, whether or not the value of the generated digital code CODE is within a predetermined range. Furthermore, the imaging device 1 is configured such that the voltage generation units 30A and 30B include the temperature sensors 33 having the same circuit configuration, so that the voltage Vtemp generated by the temperature sensor 33 of the voltage generation unit 30A and the voltage Vtemp generated by the temperature sensor 33 of the voltage generation unit 30B can be made substantially equal to each other. As a result, the voltage of the even-numbered signal line SGL (for example, the signal line SGL(0)) and the voltage of the odd-numbered signal line SGL (for example, the signal line SGL(1)) adjacent to the signal line SGL are substantially equal to each other. For example, in the case of failure of one of the two temperature sensors 33 that have different digital codes CODE, the diagnosis unit 61 can diagnose whether or not a malfunction has occurred in the temperature sensor 33 on the basis of the digital code CODE.

(Self-Diagnosis A6)

The self-diagnosis A6 mainly diagnoses whether or not the digital code CODE output from the plurality of AD conversion units ADC can be supplied to the signal processing unit 60 via the bus lines 100 (bus lines 100S and 100N). Specifically, the latches 47 of the plurality of AD conversion units ADC output the digital codes CODE each having a predetermined bit pattern in the blanking period T20 on the basis of the control signal CC. Then, the control unit 50 generates the control signal SSW. The plurality of switch units SW of the readout unit 40S sequentially transfer the digital codes CODE output from the AD conversion units ADC of the readout unit 40S as the image signal DATA0S to the signal processing unit 60 on the basis of the control signal SSW, and the plurality of switch units SW of the readout unit 40N sequentially transfer the digital codes CODE output from the AD conversion unit ADC of the readout unit 40N as the image signal DATA0N to the signal processing unit 60 on the basis of the control signal SSW. Then, the diagnosis unit 61 performs diagnosis processing on the basis of the digital code CODE and outputs the error flag signal XERR and the diagnosis result RES. The imaging device 1 performs this series of operations multiple times while changing the bit pattern and the transfer order. This operation will be described in detail below.

FIGS. 28A and 28B schematically illustrate examples of the data transfer operation in the first diagnosis A61 of the self-diagnosis A6, in which FIG. 28A illustrates the operation of the readout unit 40S and FIG. 28B illustrates the operation of the readout unit 40N. In FIGS. 28A and 28B, the AD conversion units ADC (e.g., the AD conversion units ADC(0), ADC(1), ADC(4), ADC(5), . . . ) which are not shaded among the plurality of AD conversion units ADC output the digital code CODE in which all bits are "0" on the basis of the control signal CC. Furthermore, the shaded AD conversion units ADC (e.g., the AD conversion units ADC (2), ADC(3), ADC(6), ADC(7), . . . ) output the digital code CODE in which all bits are "1" on the basis of the control signal CC.

Figure 29:
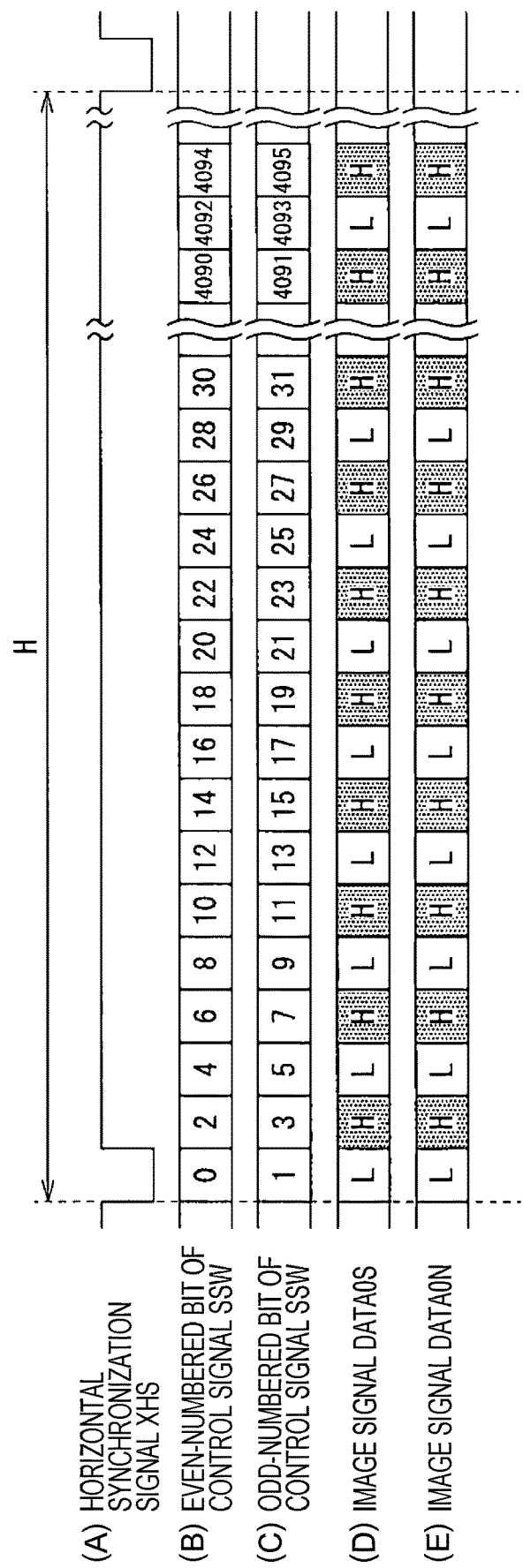
FIG. 29 is a timing chart of an operation example of the readout unit illustrated in FIGS. 28A and 28B.

FIG. 29 is a timing chart of the data transfer operation illustrated in FIGS. 28A and 28B, in which (A) indicates the waveform of the horizontal synchronization signal XHS, (B) indicates the even-numbered bits of the control signal SSW, (C) indicates the odd-numbered bits of the control signal SSW, (D) indicates the image signal DATA0S, and (E) indicates the image signal DATA0N. In (D) and (E) in FIG. 29, the portions without shading and denoted with "L" represent the digital codes CODE in which all bits are "0" (first logical value). The portions with shading and denoted with "H" represent the digital codes CODE in which all bits are "1" (second logical value).

The even-numbered bits of the control signal SSW become active from the control signal SSW[0] to the control signal SSW[2], and SSW[4] in this order, as illustrated in (B) in FIG. 29. As a result, in the readout unit 40S, the digital code CODE of the 0th AD conversion unit ADC(0) is first supplied to the bus line 100S. Since the AD conversion unit ADC(0) outputs the digital code CODE in which all bits are "0" (FIG. 28A), all bits of the image signal DATA0S at this time become "0" ((D) in FIG. 29). Next, the digital code CODE of the second AD conversion unit ADC(2) is supplied to the bus line 100S. Since the AD conversion unit ADC(2) outputs the digital code CODE in which all bits are "1" (FIG. 28A), all bits of the image signal DATA0S at this time become "1" ((D) in FIG. 29). Next, the digital code CODE of the fourth AD conversion unit ADC(4) is supplied to the bus line 100S. Since the AD conversion unit ADC(4) outputs the digital code CODE in which all bits are "0" (FIG. 28A), all bits of the image signal DATA0S at this time become "0" ((D) in FIG. 29). Thus, the digital codes CODE in which all bits are "0" and the digital codes CODE in which all bits are "1" are alternately transferred sequentially (transfer sequence F) from the left AD conversion units ADC as the image signal DATA0S to the signal processing unit 60 (FIG. 28A and (D) in FIG. 29).

The readout unit 40N operates similarly, and the digital codes CODE in which all bits are "0" and the digital codes CODE in which all bits are "1" are alternately transferred sequentially (transfer sequence F) from the left AD conversion units ADC as the image signal DATA0N to the signal processing unit 60 (FIG. 28B and (E) in FIG. 29).

The diagnosis unit 61 of the signal processing unit 60 performs the diagnosis processing by comparing each bit of the digital codes CODE included in the image signal DATA0 with an expected value on the basis of the image signal DATA0 (image signals DATA0S and DATA0N). In particular, the first diagnosis A61, in which the digital codes CODE relating to adjacent AD conversion units ADC are made different from each other, can diagnose, for example, whether or not the bus lines relating to the adjacent AD conversion units ADC are short-circuited. Specifically, in the readout unit 40S (FIG. 23A), for example, the diagnosis unit 61 can diagnose whether or not the bus line near the AD conversion unit ADC(2) of the bus lines connecting the 0th AD conversion unit ADC(0) and the bus line 100S and the bus line near the AD conversion unit ADC(0) of the bus lines connecting the second AD conversion unit ADC(2) and the bus line 100S are not short-circuited.

Figure 31:
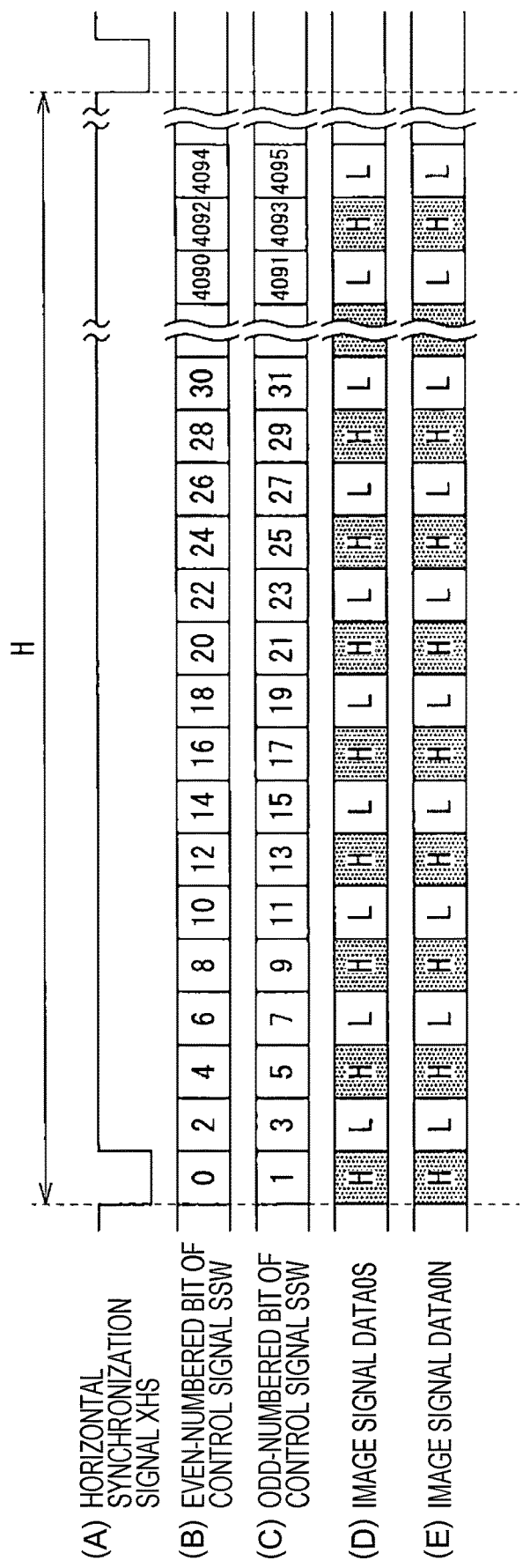
FIG. 31 is a timing chart of an operation example of the readout unit illustrated in FIGS. 30A and 30B.

FIGS. 30A and 30B schematically illustrate examples of the data transfer operation in the second diagnosis A62 of the self-diagnosis A6, in which FIG. 30A illustrates the operation of the readout unit 40S and FIG. 30B illustrates the operation of the readout unit 40N. FIG. 31 is a timing chart of the data transfer operation illustrated in FIGS. 30A and 30B. In the second diagnosis A62, as illustrated in FIGS. 30A and 30B, the bit pattern of the digital code CODE output from each AD conversion unit ADC is different from the bit pattern of the first diagnosis A61 (FIGS. 28A and 28B). Specifically, for example, the AD conversion units ADC(0), ADC(1), ADC(4), ADC(5), . . . output the digital codes CODE in which all bits are "0" in the first diagnosis A61 (FIGS. 28A and 28B), but output the digital codes CODE in which all bits are "1" in the second diagnosis A62. Similarly, for example, the AD conversion units ADC(2), ADC(3), ADC(6), ADC(7), . . . output the digital codes CODE in which all bits are "1" in the first diagnosis A61 (FIGS. 28A and 28B), but output the digital codes CODE in which all bits are "0" in the second diagnosis A62.

In the readout unit 40S, the digital code CODE of the 0th AD conversion unit ADC(0) is first supplied to the bus line 100S ((B) in FIG. 31). Since the AD conversion unit ADC(0) outputs the digital code CODE in which all bits are "1" (FIG. 30A), all the bits of the image signal DATA0S at this time become "1" ((D) in FIG. 31). Next, the digital code CODE of the second AD conversion unit ADC(2) is supplied to the bus line 100S ((B) in FIG. 31). Since the AD conversion unit ADC(2) outputs the digital code CODE in which all bits are "0" (FIG. 30A), all the bits of the image signal DATA0S at this time become "0" ((D) in FIG. 31). Next, the digital code CODE of the fourth AD conversion unit ADC(4) is supplied to the bus line 100S ((B) in FIG. 31). Since the AD conversion unit ADC(4) outputs the digital code CODE in which all bits are "1" (FIG. 30A), all the bits of the image signal DATA0S then at this time "0" ((D) in FIG. 31). Thus, the digital codes CODE in which all bits are "1" and the digital codes CODE in which all bits are "0" are alternately transferred sequentially (transfer sequence F) from the left AD conversion units ADC as the image signal DATA0S to the signal processing unit 60 (FIG. 30A and (D) in FIG. 31).

The readout unit 40N operates similarly, and the digital codes CODE in which all bits are "1" and the digital codes CODE in which all bits are "0" are alternately transferred sequentially (transfer sequence F) from the left AD conversion units ADC as the image signal DATA0N to the signal processing unit 60 (FIG. 30B and (E) in FIG. 31).

The diagnosis unit 61 of the signal processing unit 60 can diagnose whether or not the short-circuit has occurred in the bus line relating to the AD conversion units ADC with other lines such as the power supply line or the ground line by performing the second diagnosis A62 (FIGS. 30A, 30B, and 31) in addition to the first diagnosis A61 (FIGS. 28A, 28B, and 29). In other words, in a case where such a short circuit occurs, the voltage of the short-circuited line among the bus lines is fixed. The diagnosis unit 61 can detect whether or not such fixed voltage has occurred, as the bit pattern of the digital code CODE output from each AD conversion unit ADC is made different between the first and second diagnosis A61 and A62. As a result, the diagnosis unit 61 can diagnose whether or not the bus line relating to the AD conversion unit ADC is short-circuited with other lines.

Figure 33:
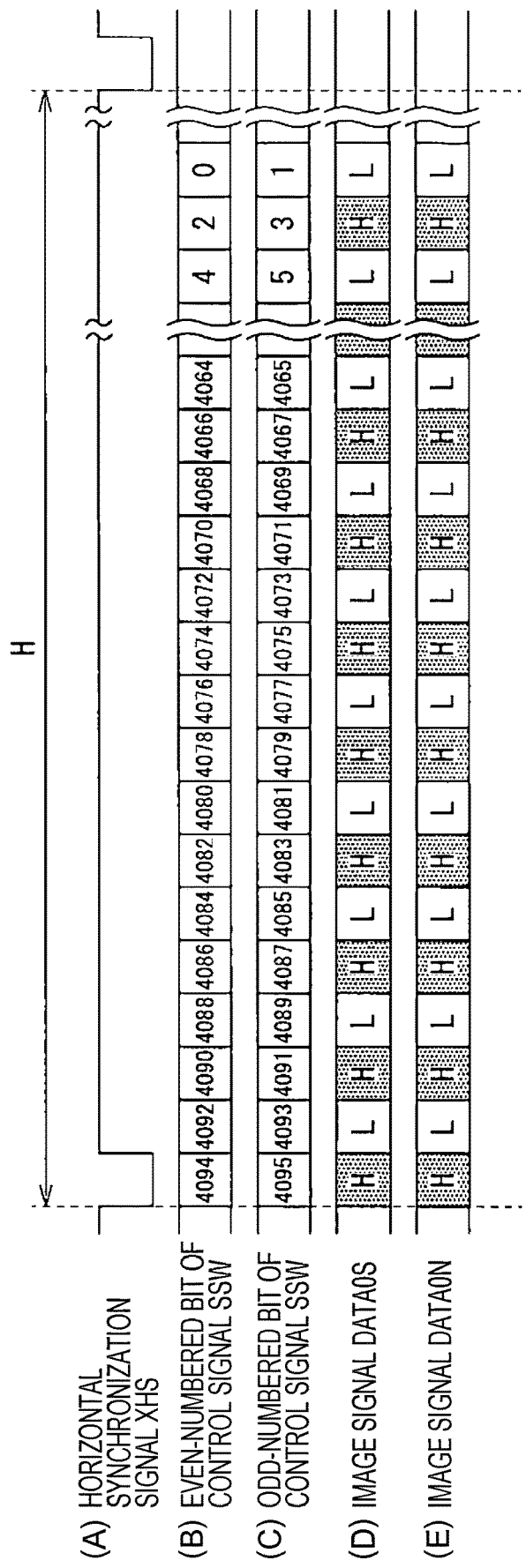
FIG. 33 is a timing chart of an operation example of the readout unit illustrated in FIGS. 32A and 32B.

FIGS. 32A and 32B schematically illustrate examples of the data transfer operation in the third diagnosis A63 of the self-diagnosis A6, in which FIG. 32A illustrates the operation of the readout unit 40S and FIG. 32B illustrates the operation of the readout unit 40N. FIG. 33 is a timing chart of the data transfer operation illustrated in FIGS. 32A and 32B. In the third diagnosis A63, the transfer sequence F is different from that of the first diagnosis A61.

The even-numbered bits of the control signal SSW become active from the control signals SSW[4094], SSW[4092], and SSW[4090] in this order, as illustrated in (B) in FIG. 33. As a result, in the readout unit 40S, the digital code CODE of the 4094th AD conversion unit ADC(4094) is first supplied to the bus line 100S. Since the AD conversion unit ADC(4094) outputs the digital code CODE in which all bits are "1", all the bits of the image signal DATA0S at this time become "1" ((D) in FIG. 33). Next, the digital code CODE of the 4092nd AD conversion unit ADC(4092) is supplied to the bus line 100S ((B) in FIG. 33). Since the AD conversion unit ADC(4092) outputs the digital code CODE in which all bits are "0", all bits of the image signal DATA0S at this time become "0" ((D) in FIG. 33). Next, the digital code CODE of the 4090th AD conversion unit ADC(4090) is supplied to the bus line 100S ((B) in FIG. 33). Since the AD conversion unit ADC(4090) outputs the digital code CODE in which all bits are "1", all the bits of the image signal DATA0S at this time become "1" ((D) in FIG. 33). Thus, the digital codes CODE in which all bits are "1" and the digital codes CODE in which all bits are "0" are alternately transferred sequentially (transfer sequence F) from the right AD conversion units ADC as the image signal DATA0S to the signal processing unit 60 (FIG. 32A and (D) in FIG. 33).

The readout unit 40N operates similarly, and the digital codes CODE in which all bits are "1" and the digital codes CODE in which all bits are "0" are alternately transferred sequentially (transfer sequence F) from the right AD conversion units ADC as the image signal DATA0N to the signal processing unit 60 (FIG. 32B and (E) in FIG. 33).

The diagnosis unit 61 of the signal processing unit 60 can diagnose whether or not the transfer order of transferring the digital codes CODE from the plurality of AD conversion units ADC to the signal processing unit 60 can be changed by performing the third diagnosis A63.

As described above, the imaging device 1 is configured to perform the self-diagnosis in the blanking period T20. This enables diagnosis of the trouble of the imaging device 1 without affecting the imaging operation of shooting the subject, while performing the imaging operation.

The imaging device 1 is configured such that, in the blanking period T20, the signal generation unit 22 generates the control signals VMA and VMB, the plurality of dummy pixels P3 in the dummy pixel region R3 generate the signal SIG corresponding to the control signals VMA and VMB to the signal lines SGL. This enables diagnosis of the problem occurring in the pixel array 10, such as disconnection of the signal lines SGL or the like. Furthermore, the imaging device 1 is configured such that the voltage of the control signals VMA and VMB can be set to various voltage values. This enables diagnosis of various operations of the imaging device 1 and enhances the performance of diagnosis.

Furthermore, the imaging device 1 is configured such that, in the blanking period T20, the plurality of AD conversion units ADC output the digital codes CODE having the predetermined bit pattern on the basis of the control signal CC. This enables diagnosis of the data transfer operation from the plurality of AD conversion units ADC to the signal processing units 60. In particular, the imaging device 1 is configured to change the bit pattern or the transfer sequence of the digital codes CODE output from the AD conversion units ADC. This enhances the performance of diagnosis.

In addition, as illustrated in FIGS. 9 and 10, the imaging device 1 is configured such that the error flag signal XERR is a so-called negative logic signal in which the error flag signal XERR comes to the high level (power supply voltage VDDM) when no trouble is confirmed by the diagnosis processing in the diagnosis unit 61, while coming to the low level (ground voltage VSSM) when the trouble is confirmed. Thus, the occurrence of the trouble can be reported more reliably. In other words, in a case where the error flag signal is a so-called a positive logic signal, for example, in which the error flag signal comes to the low level when no trouble is confirmed and comes to the high level when the trouble is confirmed in the diagnosis processing of the diagnosis unit 61, the error flag signal comes to the low level when the power supply voltage VDDM is not supplied to the imaging device due to the occurrence of trouble in the circuit for generating the power supply voltage VDDM or the disconnection of the supply path of the power supply voltage VDDM to the imaging device, for example. Therefore, the monitoring device that monitors the error flag signal determines that no trouble has occurred because the error flag signal is at the low level.

On the other hand, in the imaging device 1 according to the present embodiment, the error flag signal XERR is a so-called negative logic signal. As a result, if the error flag signal XERR comes to the low level in a case where, for example, no power supply voltage VDDM is supplied to the imaging device, the monitoring device that monitors the error flag signal XERR determines that the trouble has occurred. In other words, the imaging device 1 can also report the trouble, such as no supply of the power supply voltage VDDM, in addition to the trouble detected by the diagnosis unit 61. Thus, the imaging device 1 can report the occurrence of the trouble more reliably, because the error flag signal XERR is configured as the so-called negative logic signal.

Furthermore, the error flag signal XERR is configured to change between the power supply voltage VDDM and the ground voltage VSSM. As a result, in a case where the diagnosis unit 61 has not detected trouble, the output buffer BFOUT sets the voltage of the error flag signal XERR to the power supply voltage VDDM. That is, the voltage value of the error flag signal XERR in the case where the diagnosis unit 61 has detected no trouble is equal to the voltage value of the power supply voltage VDDM supplied to the imaging device 1. Therefore, the monitoring device that monitors the error flag signal XERR can confirm whether or not the desired power supply voltage VDDM is supplied to the imaging device 1 by monitoring the voltage value of the error flag signal XERR then. In other words, for example, in a case where the trouble occurs in the circuit that generates the power supply voltage VDDM and the power supply voltage VDDM deviates from a desired voltage, the error flag signal XERR comes to have a voltage corresponding to the shifted voltage. Thus, the monitoring circuit can confirm that the desired power supply voltage VDDM is not supplied to the imaging device 1. Thus, the power supply voltage VDDM supplied to the imaging device 1 can be output as the error flag signal XERR in a case where the diagnosis unit 61 has not detected the trouble, so that the imaging device 1 can more reliably report the occurrence of the trouble including the fact as to whether or not the desired power supply voltage VDDM is supplied.

Effect

As described above, in the present embodiment, the error flag signal XERR is set to the so-called negative logic signal in which the error flag signal XERR comes to the high level in a case where no trouble is confirmed and comes to the low level in a case where the trouble is confirmed by the diagnosis processing in the diagnosis unit 61. Therefore, the trouble such as no supply of the power supply voltage can be reported, and the occurrence of the trouble can be more reliably reported.

In the present embodiment, the error flag signal is made to change between the power supply voltage VDDM and the ground voltage VSSM, so that, in a case where the diagnosis unit detects no trouble, the power supply voltage VDDM supplied to the imaging device is output as the error flag signal. Thus, the occurrence of the trouble can be reported more reliably.

Modification 1

In the above embodiment, two imaging pixels P1 (imaging pixels P1A and P1B), for example, which are located adjacent to each other vertically (vertical direction in FIG. 1) in the normal pixel region R1 of the pixel array 10 are connected to the same control lines TGLL, SELL, and RSTL but the connection is not limited to this. Hereinafter, the modification will be described by giving some examples.

Figure 34:
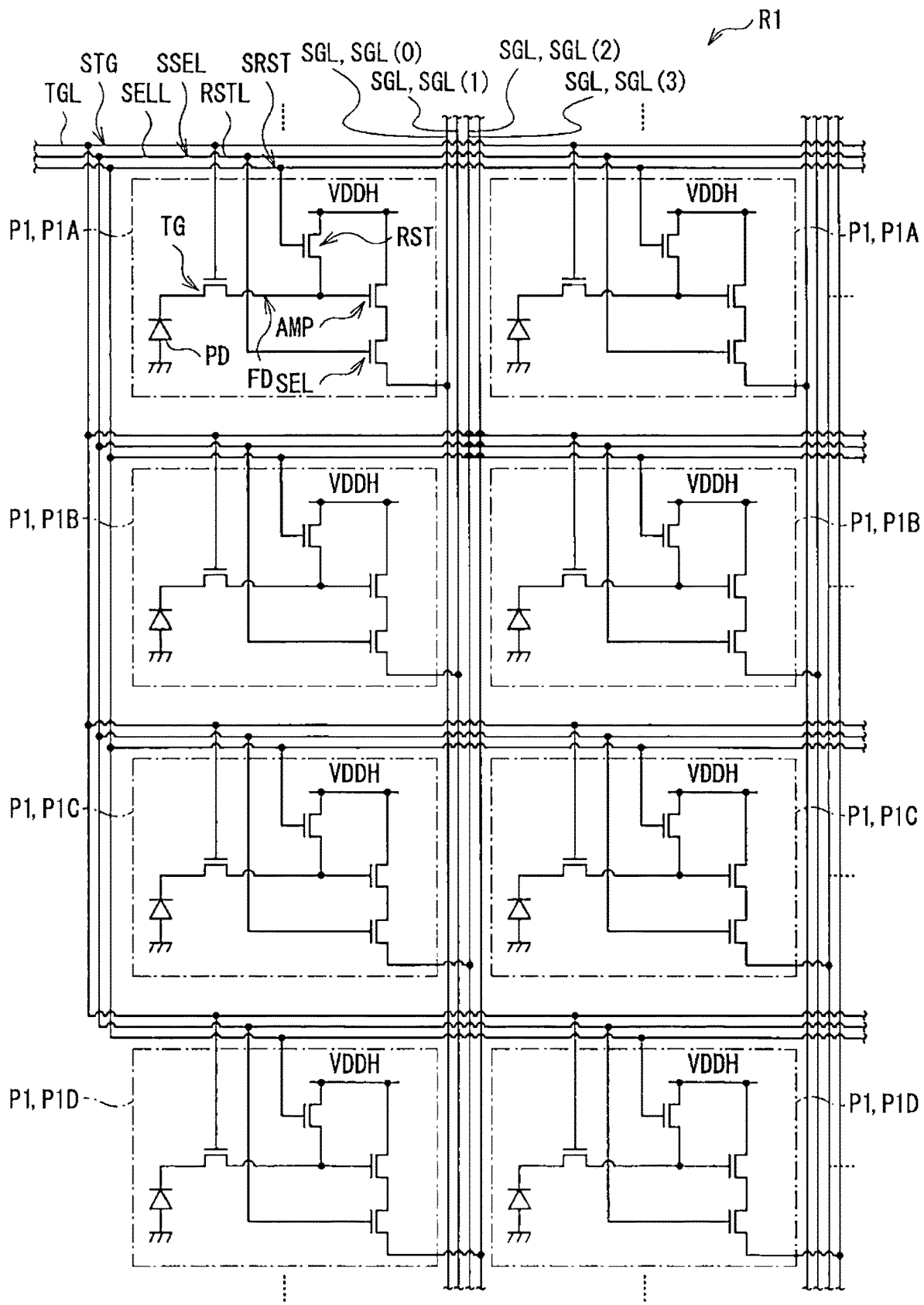
FIG. 34 is a circuit diagram of a configuration example of a pixel array according to a modified example.

FIG. 34 illustrates an example of the normal pixel region R1 in a pixel array 10A of an imaging device 1A according to the present modification. In this example, one column of imaging pixels P1 and four signal lines SGL are alternately arranged in the horizontal direction (horizontal direction in FIG. 34) Even-numbered signal lines SGL (SGL(0), SGL (2), . . . ) are connected to the readout unit 40S, while odd-numbered signal lines SGL (SGL(1), SGL(3), . . . ) are connected to the readout unit 40N. The plurality of imaging pixels P1 include a plurality of imaging pixels P1A, a plurality of imaging pixels P1B, a plurality of imaging pixels P1C, and a plurality of imaging pixels P1D. The imaging pixels P1A to P1D have the same circuit configuration. The imaging pixels P1A to P1D are disposed repeatedly in this order vertically (vertical direction in FIG. 34). The imaging pixels P1A to P1D are connected to the same control lines TGLL, SELL and RSTL. For example, the imaging pixel P1A is connected to the signal line SGL(0), for example, the imaging pixel P1B is connected to the signal line SGL(1), for example, the imaging pixel P1C is connected to the signal line SGL(2), and for example, the imaging pixel P1D is connected to the signal line SGL(3). Note that although the normal pixel region R1 is described above as an example, the same applies to the light shielding pixel regions R21 and R22 and the dummy pixel regions R3 and R4.

Figure 35:
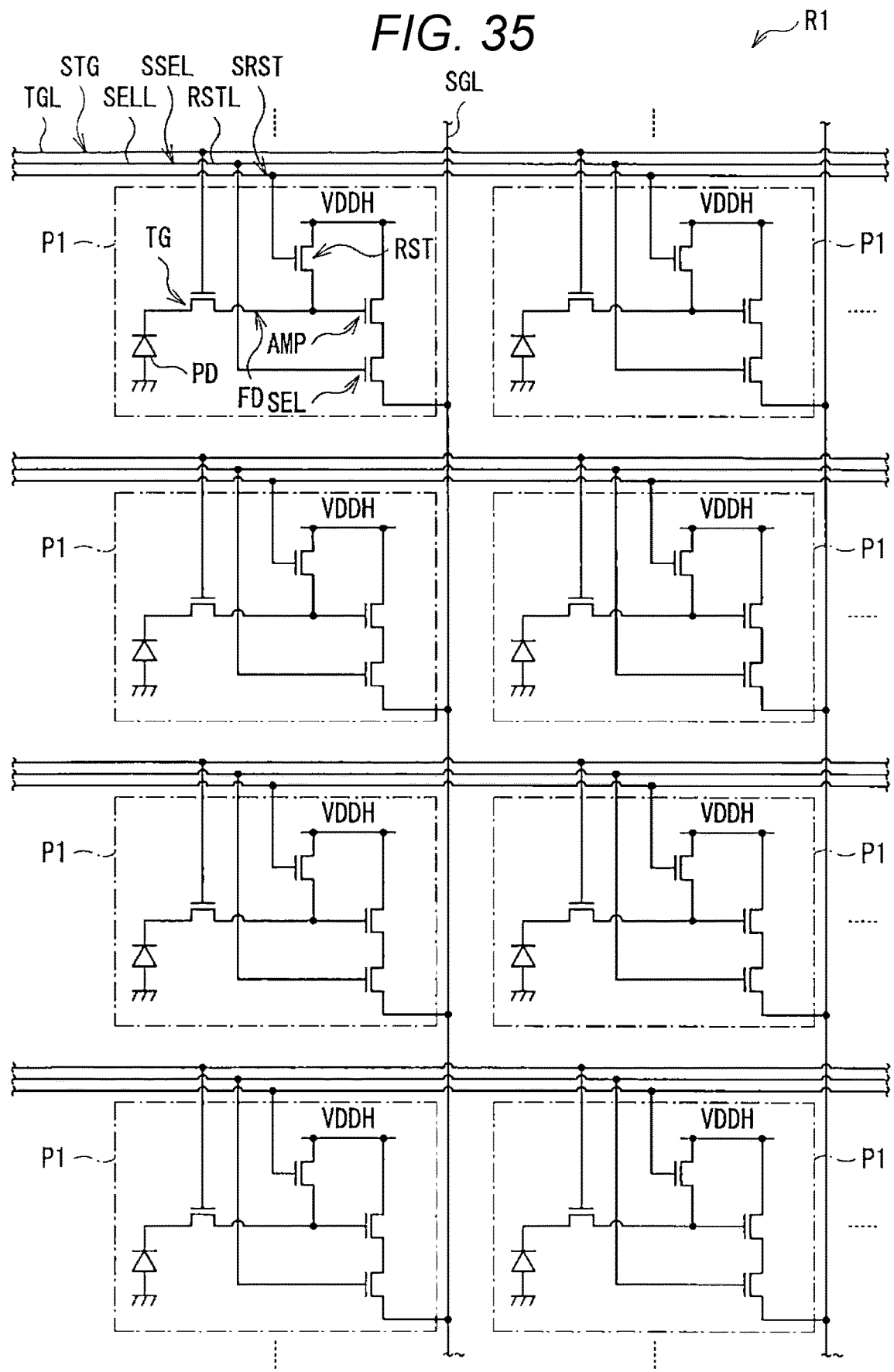
FIG. 35 is a circuit diagram of a configuration example of a pixel array according to another modified example.

FIG. 35 illustrates an example of a normal pixel region in a pixel array 10B of another imaging device 1B according to the present modification. In this example, in the horizontal direction (horizontal direction in FIG. 35), one column of the imaging pixels P1 and one signal line SGL are disposed alternately. Even-numbered signal lines SGL (SGL(0), SGL(2), . . . ) are connected to the readout unit 40S, while odd-numbered signal lines SGL (SGL(1), SGL(3), . . . ) are connected to the readout unit 40N. The imaging pixels P1 arranged side by side vertically (vertical direction in FIG. 35) are connected to different control lines TGLL, SELL, RSTL. Note that although the normal pixel region R1 is described above as an example, the same applies to the light shielding pixel regions R21 and R22 and the dummy pixel regions R3 and R4.

Modification 2

In the above embodiment, one bus line 100S is provided in the readout unit 40S and one bus line 100N is provided in the readout unit 40N, but the present disclosure is not limited thereto. Alternatively, a plurality of bus lines, for example, may be provided for each of the readout units 40S and 40N. The present modification will be described in detail below.

Figure 36A:
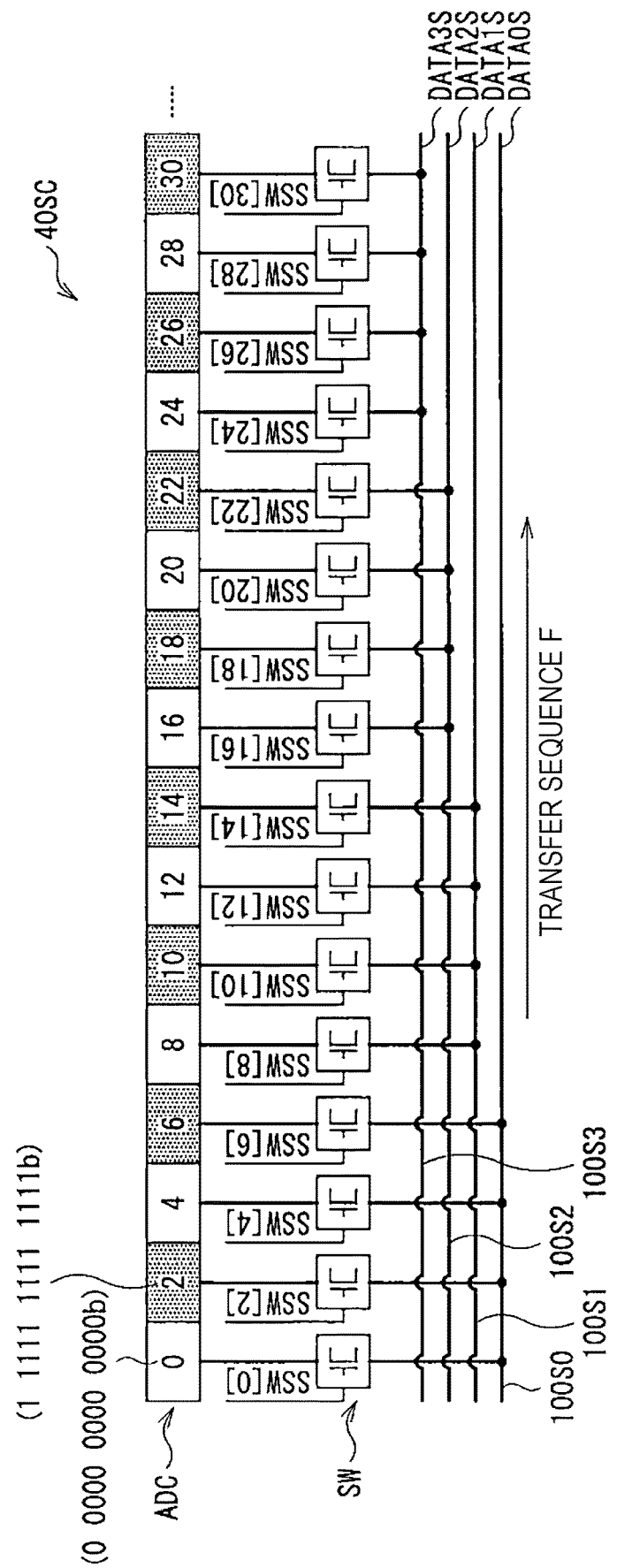
FIG. 36A is an explanatory diagram of an operation example of a readout unit according to another modified example.
Figure 36B:
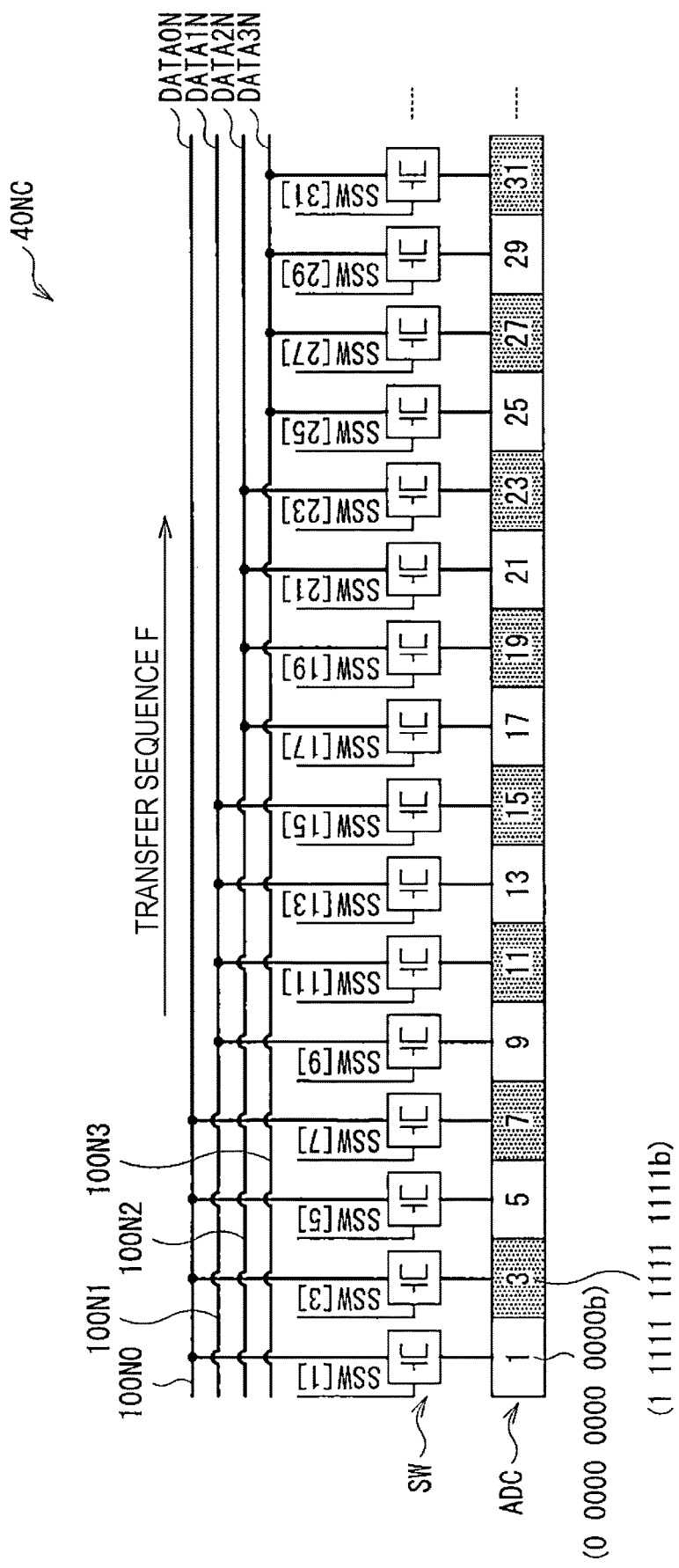
FIG. 36B is an explanatory diagram illustrating an operation example of the readout unit according to another modified example.

FIGS. 36A and 36B schematically illustrate a configuration example of the readout unit 40C (readout units 40SC and 40NC) of the imaging device 1C according to the present modification. FIG. 36A illustrates an example of the readout unit 40SC, and FIG. 36B illustrates an example of the readout unit 40NC.

As illustrated in FIG. 36A, the readout unit 40SC has four bus lines 100S0, 100S1, 100S2, and 100S3. The bus line 100S0 supplies a plurality of digital codes CODE as the image signal DATA0S to the signal processing unit 60. The bus line 100S1 supplies a plurality of digital codes CODE as the image signal DATA1S to the signal processing unit 60. The bus line 100S2 supplies a plurality of digital codes CODE as the image signal DATA2S to the signal processing unit 60. The bus line 100S3 supplies a plurality of digital codes CODE as the image signal DATA3S to the signal processing unit 60.

In the readout unit 40SC (FIG. 36A), the AD conversion units ADC(0), ADC(2), ADC(4), and ADC(6) are associated with the bus line 100S0. Specifically, in a case where the corresponding switch unit SW is in the on-state, the AD conversion units ADC(0), ADC(2), ADC(4), and ADC(6) individually transmit the digital code CODE to the bus line 100S0. Similarly, the AD conversion units ADC(8), ADC(10), ADC(12), and ADC(14) are associated with the bus line 100S1, the AD conversion units ADC(16), ADC(18), ADC(20), and the ADC(22) are associated with the bus line 100S2, and the AD conversion units ADC(24), ADC(26), ADC(28), and ADC(30) are associated with the bus line 100S3. In addition, the AD conversion units ADC(32), ADC(34), ADC(36), and ADC(38) are associated with the bus line 100S0, the AD conversion units ADC(40), ADC(42), ADC(44), and ADC(46) are associated with the bus line 100S1, the AD conversion units ADC(48), ADC (50), ADC (52), and ADC (54) are associated with the bus line 100S2, and the AD conversion units ADC(56), ADC(58), ADC(60), and ADC(62) are associated with the bus line 100S3. The same applies to the even-numbered AD conversion units ADC after the AD conversion unit ADC(64).

As illustrated in FIG. 36B, the readout unit 40NC has four bus lines 100N0, 100N1, 100N2, and 100N3. The bus line 100N0 supplies a plurality of digital codes CODE as the image signal DATA0N to the signal processing unit 60. The bus line 100N1 supplies a plurality of digital codes CODE as the image signal DATA1N to the signal processing unit 60. The bus line 100N2 supplies a plurality of digital codes CODE as the image signal DATA2N to the signal processing unit 60. The bus line 100N3 supplies the plurality of digital codes CODE as the image signal DATA3N to the signal processing unit 60.

In the readout unit 40NC (FIG. 36B), the AD conversion units ADC(1), ADC(3), ADC(5), and ADC(7) are associated with the bus line 100N0. Specifically, in a case where the corresponding switch unit SW is in the on-state, the AD conversion units ADC(1), ADC(3), ADC(5), and ADC(7) individually transmit the digital code CODE to the bus line 100N0. Similarly, the AD conversion units ADC(9), ADC(11), ADC(13), and ADC(15) are associated with the bus line 100N1, the AD conversion units ADC(17), ADC(19), ADC(21), and the ADC(23) are associated with the bus line 100N2, and the AD conversion units ADC(25), ADC(27), ADC(29), and ADC(31) are associated with the bus line 100N3. Furthermore, the AD conversion units ADC(33), ADC(35), ADC(37),and ADC(39) are associated with the bus line 100N0, the AD conversion units ADC(41), ADC (43), ADC(45), and ADC(47) are associated with the bus line 100N1, and the AD conversion units ADC(49), ADC (51), ADC(53), and ADC(55) are associated with the bus line 100N2, and the AD conversion units ADC(57), ADC (59), ADC(61), and ADC(63) are associated with the bus line 100N3. The same applies to the odd-numbered AD conversion units ADC after the AD conversion unit ADC (65).

Thus, the plurality of bus lines are provided for each of the readout units 40SC and 40NC in the imaging device 1C, so that the data transfer time from the plurality of AD conversion units ADC to the signal processing unit 60 can be shortened.

To perform self-diagnosis, the AD conversion units ADC (e.g., the AD conversion units ADC(0), ADC(1), ADC(4), ADC(5), . . . ) which are not shaded among the plurality of AD conversion units ADC output the digital codes CODE in which all bits are "0" on the basis of the control signal CC in the blanking period T20. In addition, the shaded AD conversion units ADC (e.g., the AD conversion units ADC (2), ADC(3), ADC(6), ADC(7), . . . ) output the digital code CODE in which all bits are "1" on the basis of the control signal CC in the blanking period T20.

Figure 37:
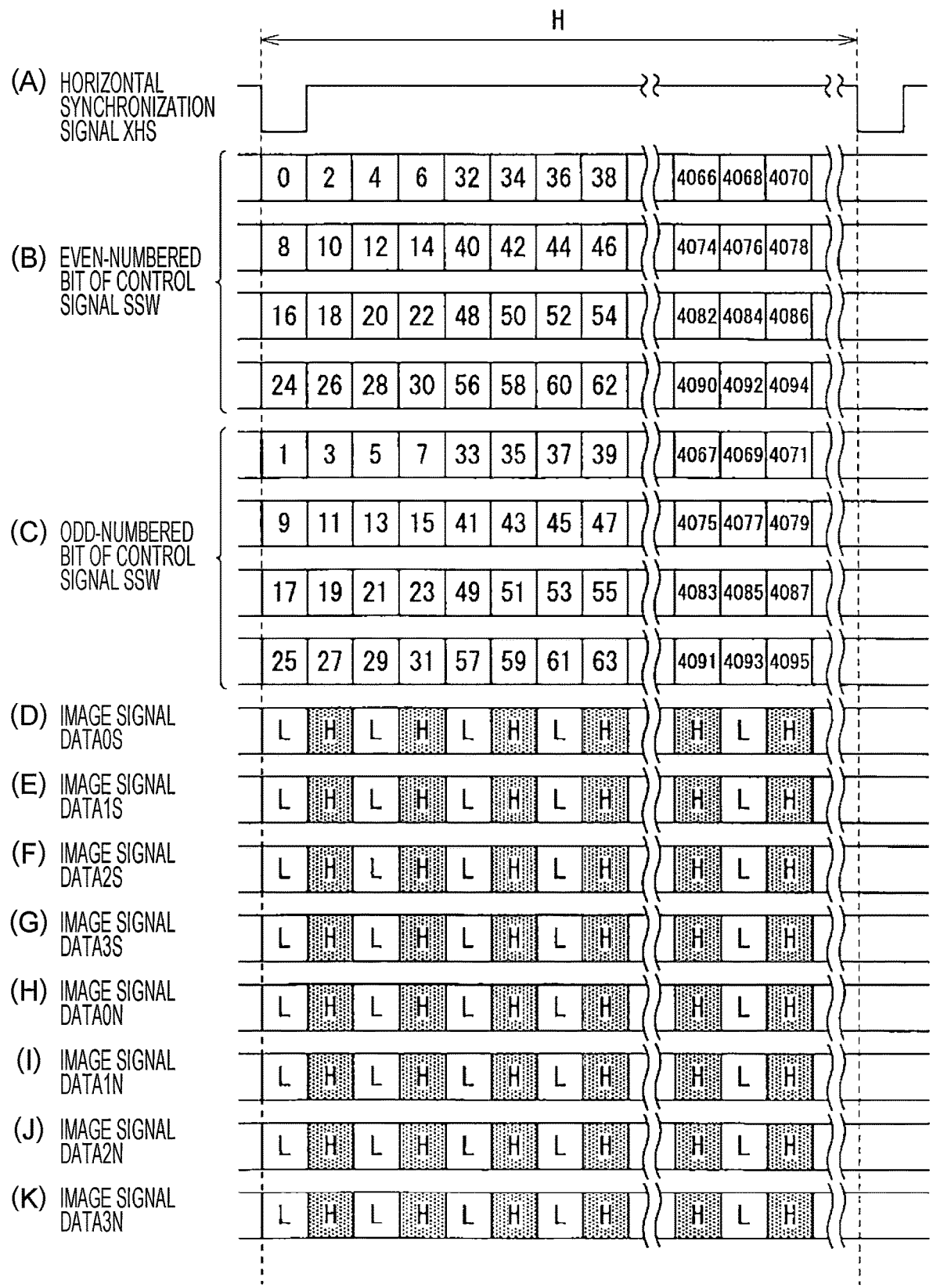
FIG. 37 is a timing chart of an operation example of the readout unit illustrated in FIGS. 36A and 36B.

FIG. 37 is a timing chart of the data transfer operation according to the present modification, in which (A) indicates the waveform of the horizontal synchronization signal XHS, (B) indicates the even-numbered bits of the control signal SSW, (C) indicates the odd-numbered bits of the control signal SSW, (D) to (G) individually indicate the image signals DATA0S, DATA1S, DATA2S, and DATA3S, and (H) to (K) individually indicate the image signals DATA0N, DATA1N, DATA2N, and DATA3N.

In the even-numbered bits of the control signal SSW, the control signals SSW[0], SSW[8], SSW[16], and SSW[24] become active first, as illustrated in (B) in FIG. 37. As a result, in the readout unit 40SC, the digital code CODE of the AD conversion unit ADC(0) is supplied to the bus line 100S0, the digital code CODE of the AD conversion unit ADC(8) is supplied to the bus line 100S1, the digital code CODE of the AD conversion unit ADC(16) is supplied to the bus line 100S2, and the digital code CODE of the AD conversion unit ADC(24) is supplied to the bus line 100S3. Since the AD conversion units ADC(0), ADC(8), ADC(16), and ADC(24) individually output the digital codes CODE in which all bits are "0" (FIG. 36A), all the bits of the image signals DATA0S, DATA1S, DATA2S, and DATA3S at this time become "0" ((D) to (G) in FIG. 37).

Next, in the even-numbered bits of the control signal SSW, the control signals SSW[2], SSW[10], SSW[18], and SSW[26] become active ((B) in FIG. 37). As a result, in the readout unit 40SC, the digital code CODE of the AD conversion unit ADC(2) is supplied to the bus line 100S0, the digital code CODE of the AD conversion unit ADC(10) is supplied to the bus line 100S1, the digital code CODE of the AD conversion unit ADC(18) is supplied to the bus line 100S2, and the digital code CODE of the AD conversion unit ADC(26) is supplied to the bus line 100S3. Since the AD conversion units ADC(2), ADC(10), ADC(18), and ADC(26) individually output the digital codes CODE in which all bits are "1" (FIG. 36A), all the bits of the image signals DATA0S, DATA1S, DATA2S, and DATA3S become "1" ((D) to (G) in FIG. 37).

In this manner, the digital code CODE in which all bits are "0" and the digital code CODE in which all bits are "1" are alternately transferred to the signal processing unit 60 as the image signal DATA0S ((D) in FIG. 37). The same applies to the image signals DATA1S, DATA2S, and DATA3S ((E) to (G) in FIG. 37), and the same applies to the image signals DATA0N, DATA1N, DATA2N, and DATA3N ((I) to (K) in FIG. 37).

Modification 3

In the above embodiment, all bits of the digital codes CODE are set to "0" or "1", but the present disclosure is not limited thereto. The present modification will be described in detail below.

Figure 38A:
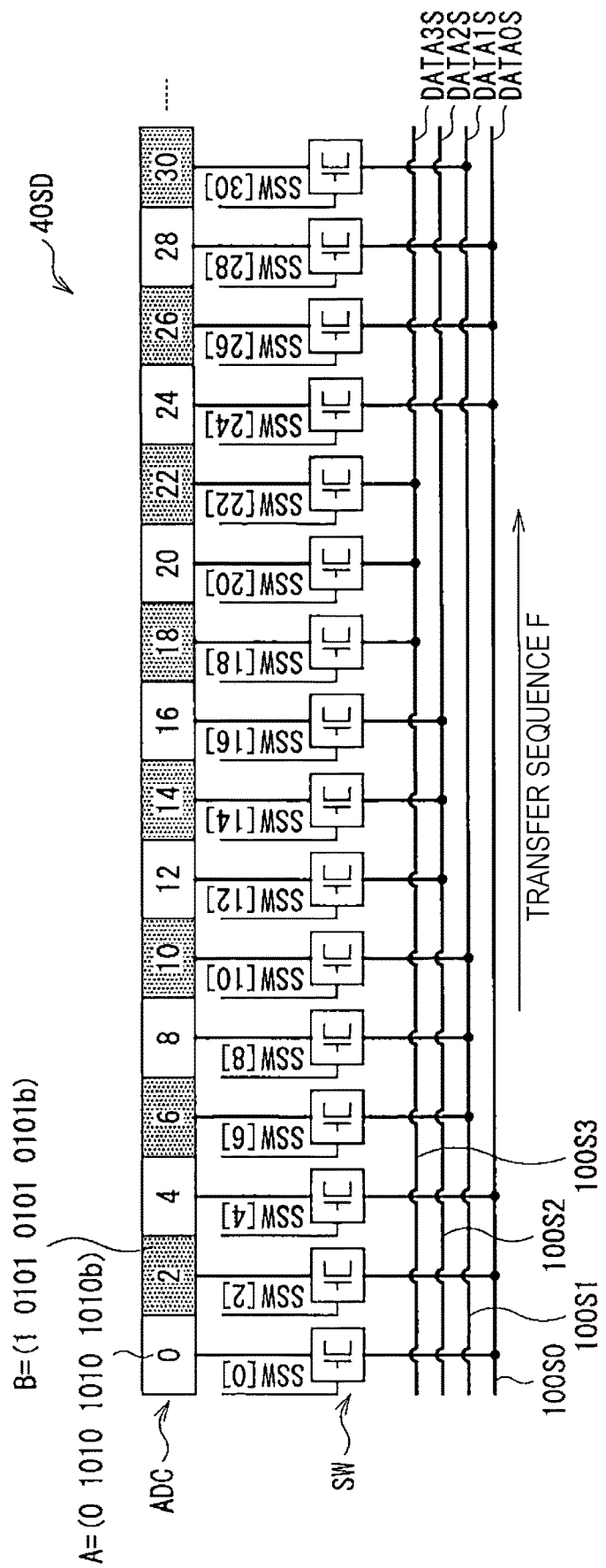
FIG. 38A is an explanatory diagram of an operation example of a readout unit according to another modified example.
Figure 38B:
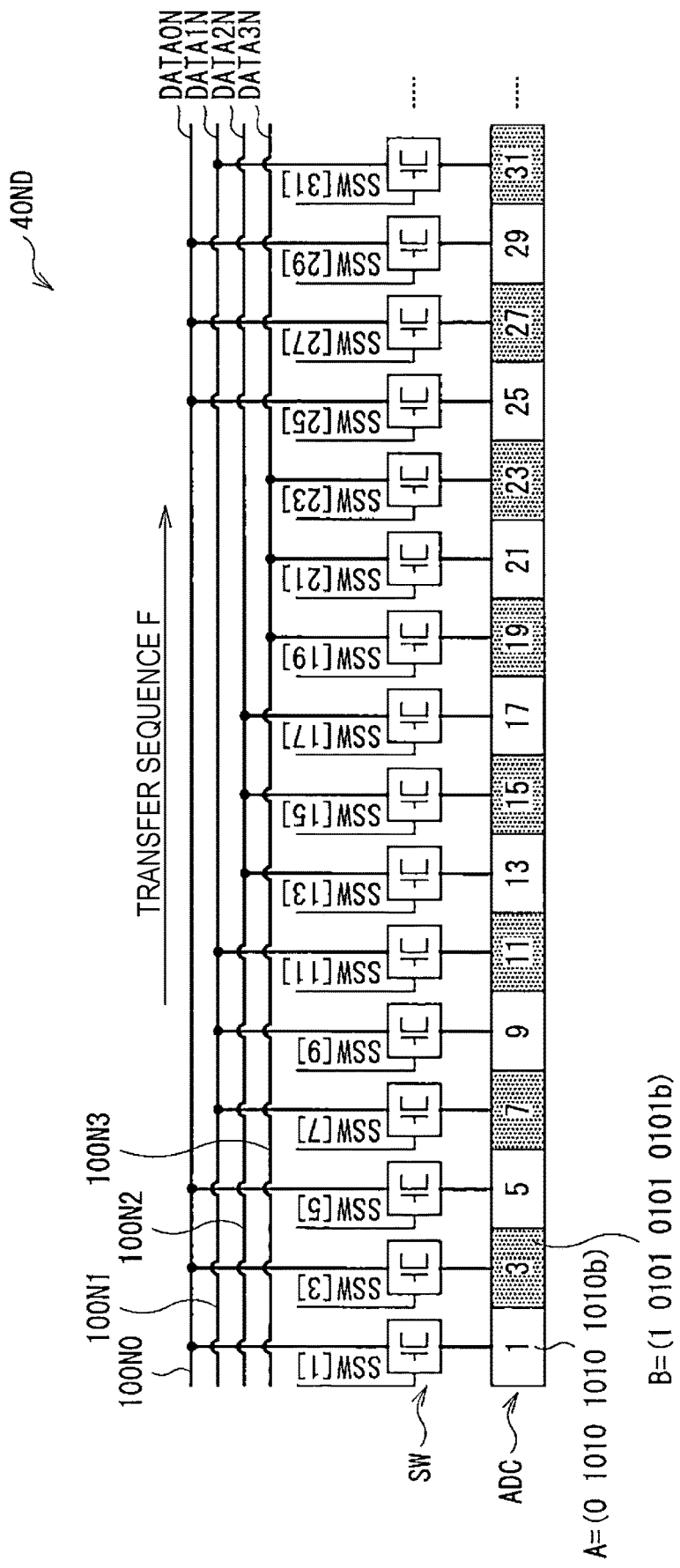
FIG. 38B is another explanatory diagram of an operation example of a readout unit according to another modified example.

FIGS. 38A and 38B schematically illustrate one configuration example of the readout unit 40D (readout units 40SD and 40ND) of the imaging device 1D according to the present modification. FIG. 38A illustrates an example of the readout unit 40SD and FIG. 38B illustrates an example of the readout unit 40ND.

As illustrated in FIG. 38A, the readout unit 40SD has four bus lines 100S0, 100S1, 100S2, and 100S3. In this example, the AD conversion units ADC(0), ADC(2), and ADC(4) are associated with the bus line 100S0, the AD conversion units ADC(6), ADC(8), and ADC(10) are associated with the bus line 100S1, the AD conversion units ADC(12), ADC(14), and ADC(16) are associated with the bus line 100S2, and the AD conversion units ADC(18), ADC(20), ADC(22) are associated with the bus line 100S3. In addition, the AD conversion units ADC(24), ADC(26), and ADC(28) are associated with the bus line 100S0, the AD conversion units ADC(30), ADC(32), and ADC(34) are associated with the bus line 100S1, the AD conversion units ADC(36), ADC(38), and ADC(40) are associated with the bus line 100S2, and the AD conversion sections ADC(42), ADC(44), and ADC(46) are associated with the bus line 100S3. The same applies to the even-numbered AD conversion units ADC after the AD conversion unit ADC(48).

As illustrated in FIG. 38B, the readout unit 40ND has four bus lines 100N0, 100N1, 100N2, and 100N3. In this example, the AD conversion units ADC(1), ADC(3), and ADC(5) are associated with the bus line 100N0, the AD conversion units ADC(7), ADC(9) and ADC(11) are associated with the bus line 100N1, the AD conversion units ADC(13), ADC(15), and ADC(17) are associated with the bus line 100N2, and the AD conversion units ADC(19), ADC(21), ADC(23) are associated with the bus line 100N3. In addition, the AD conversion units ADC(25), ADC(27), and ADC(29) are associated with the bus line 100N0, the AD conversion units ADC(31), ADC(33), and ADC(35) are associated with the bus line 100N1, the AD conversion units ADC(37), ADC(39), and ADC(41) are associated with the bus line 100N2, and the AD conversion units ADC(43), ADC(45), and ADC(47) are associated with the bus line 100N3. The same applies to the odd-numbered AD conversion units ADC after the AD conversion unit ADC(49).

To perform self-diagnosis, the AD conversion units ADC (e.g., the AD conversion unit ADC(0), ADC(1), ADC(4), ADC(5), . . . ) which are not shaded among the plurality of AD conversion units ADC output the digital codes CODE having the bit pattern A (=0101010101010b) on the basis of the control signal CC in the blanking period T20. Furthermore, the shaded AD conversion units ADC (e.g., the AD conversion units ADC(2), ADC(3), ADC(6), ADC(7), . . . ) output the digital codes CODE having the bit pattern B (=1010101010101b) on the basis of the control signal CC in the blanking period T20. The bit patterns A and B are 1/0 alternating patterns and mutually inverted patterns.

Figure 39:
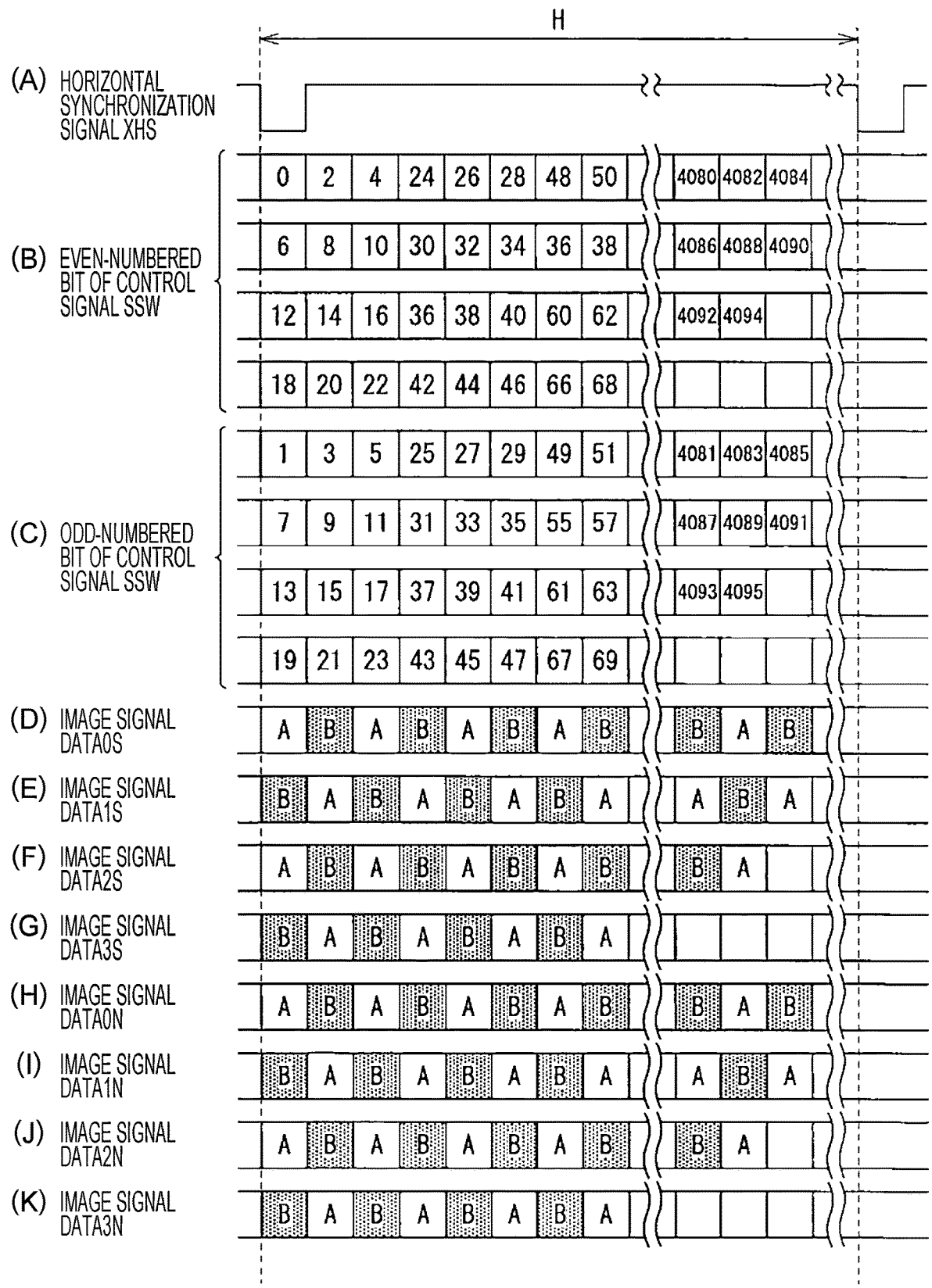
FIG. 39 is a timing chart illustrating an operation example of the readout unit illustrated in FIGS. 38A and 38B.

FIG. 39 is a timing chart of the data transfer operation according to the present modification, in which (A) indicates the waveform of the horizontal synchronization signal XHS, (B) indicates the even-numbered bits of the control signal SSW, (C) indicates the odd-numbered bits of the control signal SSW, (D) to (G) individually indicate the image signals DATA0S, DATA1S, DATA2S, and DATA3S, and (H) to (K) individually indicate the image signals DATA0N, DATA1N, DATA2N, and DATA3N. In (D) to (K) in FIG. 39, the portions not shaded and denoted with "A" are the digital codes CODE having the bit pattern A (=0101010101010b), and the portions shaded and marked with "B" are the digital codes CODE having the bit pattern B (=1010101010101b).

In the even-numbered bits of the control signal SSW, the control signals SSW[0], SSW[6], SSW[12], and SSW[18] become active first, as illustrated in (B) in FIG. 39. As a result, in the readout unit 40SD, the digital code CODE of the AD conversion unit ADC(0) is supplied to the bus line 100S0, the digital code CODE of the AD conversion unit ADC(6) is supplied to the bus line 100S1, and the digital code CODE of the AD conversion unit ADC(12) is supplied to the bus line 100S2, and the digital code CODE of the AD conversion unit ADC(18) is supplied to the bus line 100S3. Since the AD conversion sections ADC(0) and ADC(12) output the digital code CODE having the bit pattern A (FIG. 38A), the digital codes CODE of the image signals DATA0S and DATA2S at this time have the bit pattern A ((D) and (F) in FIG. 39). Furthermore, since the AD conversion units ADC(6) and ADC(18) individually output the digital codes CODE having the bit pattern B (FIG. 38A), the digital codes CODE of the image signals DATA1S and DATA3S at this time have the bit pattern B ((E) and (G) in FIG. 39).

Next, in even-numbered bits of the control signal SSW, the control signals SSW[2], SSW[8], SSW[14], and SSW [20] become active ((B) in FIG. 39). As a result, in the readout unit 40SD, the digital code CODE of the AD conversion unit ADC(2) is supplied to the bus line 100S0, the digital code CODE of the AD conversion unit ADC(8) is supplied to the bus line 100S1, the digital code CODE of the AD conversion unit ADC(14) is supplied to the bus line 100S2, and the digital code CODE of the AD conversion unit ADC(20) is supplied to the bus line 100S3. Since the AD conversion units ADC(2) and ADC(14) individually output the digital code CODE having the bit pattern B (FIG.

38A), the digital code CODE of the image signals DATA0S and DATA2S at this time have the bit pattern B ((D) and (F) in FIG. 39). Furthermore, since the AD conversion units ADC(8) and ADC(20) individually output the digital codes CODE having the bit pattern A (FIG. 38A), the digital codes CODE of the image signals DATA1S and DATA3S at this time have the bit pattern A ((E) and (G) in FIG. 39).

Thus, the digital codes CODE having the bit pattern A and the digital codes CODE having the bit pattern B are alternately transferred to the signal processing unit 60 as the image signal DATA0S ((D) in FIG. 39). The same applies to the image signals DATA2S, DATA0N, and DATA2N ((F), (H), and (J) in FIG. 39). Furthermore, the digital code CODE having the bit pattern B and the digital code CODE having the bit pattern A are alternately transferred to the signal processing unit 60 as the image signal DATA01S ((E) in FIG. 39). The same applies to the image signals DATA3S, DATA1N, and DATA3N ((G), (I), and (K) in FIG. 39).

Thus, in the imaging device 1D, the bit pattern of the digital codes CODE has the 1/0 alternating pattern, so that it is possible to diagnose, for example, whether or not the adjacent lines among the bus lines relating to the individual AD conversion units ADC are not short-circuited. Specifically, in the readout unit 40SD (FIG. 38A), for example, the diagnosis unit 61 can diagnose whether or not the short-circuit has occurred in the adjacent bus lines connecting the 0th AD conversion unit ADC(0) and the bus line 100S0.

Modification 4

Figure 40:
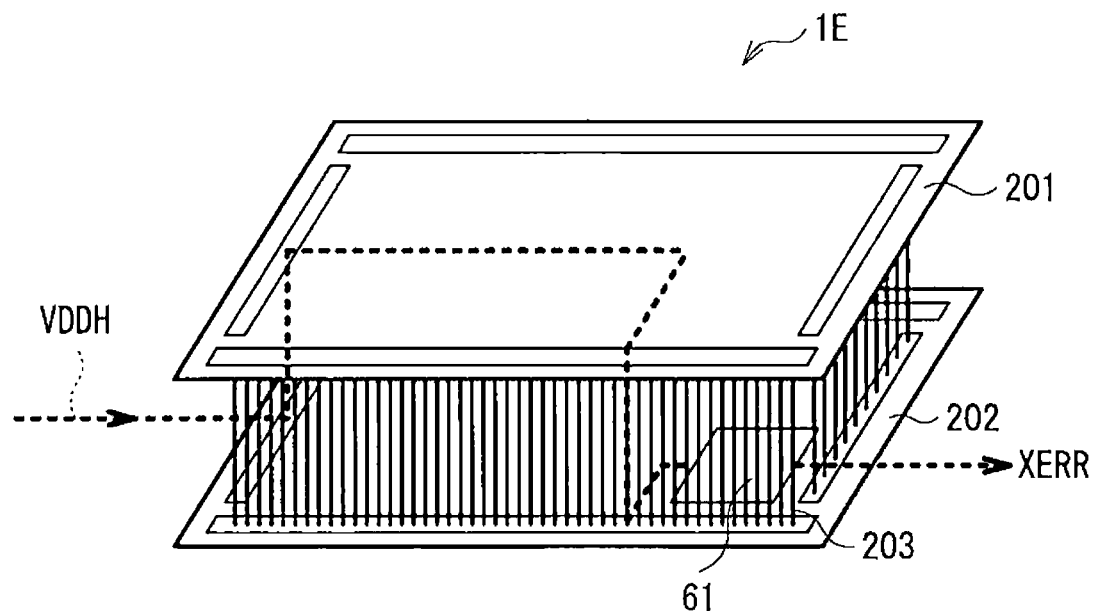
FIG. 40 is an explanatory view of a configuration example of an imaging device according to another modified example.

In the above embodiment, the diagnosis unit 61 may detect the voltage value of the power supply voltage VDDH, in addition to the various self-diagnosis steps described above, and determine whether or not the voltage value is a desired voltage value. An imaging device 1E according to the present modification is configured such that the imaging device 1E is formed, for example, on two semiconductor substrates 201 and 202, as illustrated in FIG. 40. In this example, the power supply voltage VDDH is first supplied to the semiconductor substrate 202. Then, the power supply voltage VDDH supplied to the semiconductor substrate 202 is supplied to the semiconductor substrate 201 through a via 203 such as through chip via (TCV). The power supply voltage VDDH supplied to the semiconductor substrate 201 is supplied to each pixel P in the pixel array 10. Furthermore, the power supply voltage VDDH supplied to the semiconductor substrate 201 is also supplied to the semiconductor substrate 202 through another via 203. Then, the diagnosis unit 61 diagnoses whether or not the voltage value of the power supply voltage VDDH supplied to the semiconductor substrate 202 in this way is a desired voltage value. Note that, although the present modification is applied to the power supply voltage VDDH in this example, it is not limited to this, and may be applied to the power supply voltages VDDM and VDDL. As a result, the diagnosis unit 61 can also diagnose the electrical connection through the via 203 between the semiconductor substrates 201 and 202.

Modification 5

In the above embodiment, one photodiode is provided for each imaging pixel P1 and each light shielding pixel P2, but the embodiment is not limited to this. Hereinafter, an imaging device 2 according to the present modification will be described in detail.

As illustrated in FIG. 1, the imaging device 2 includes a pixel array 90, a scanning unit 91, a control unit 98, and a signal processing unit 99.

Figure 41:
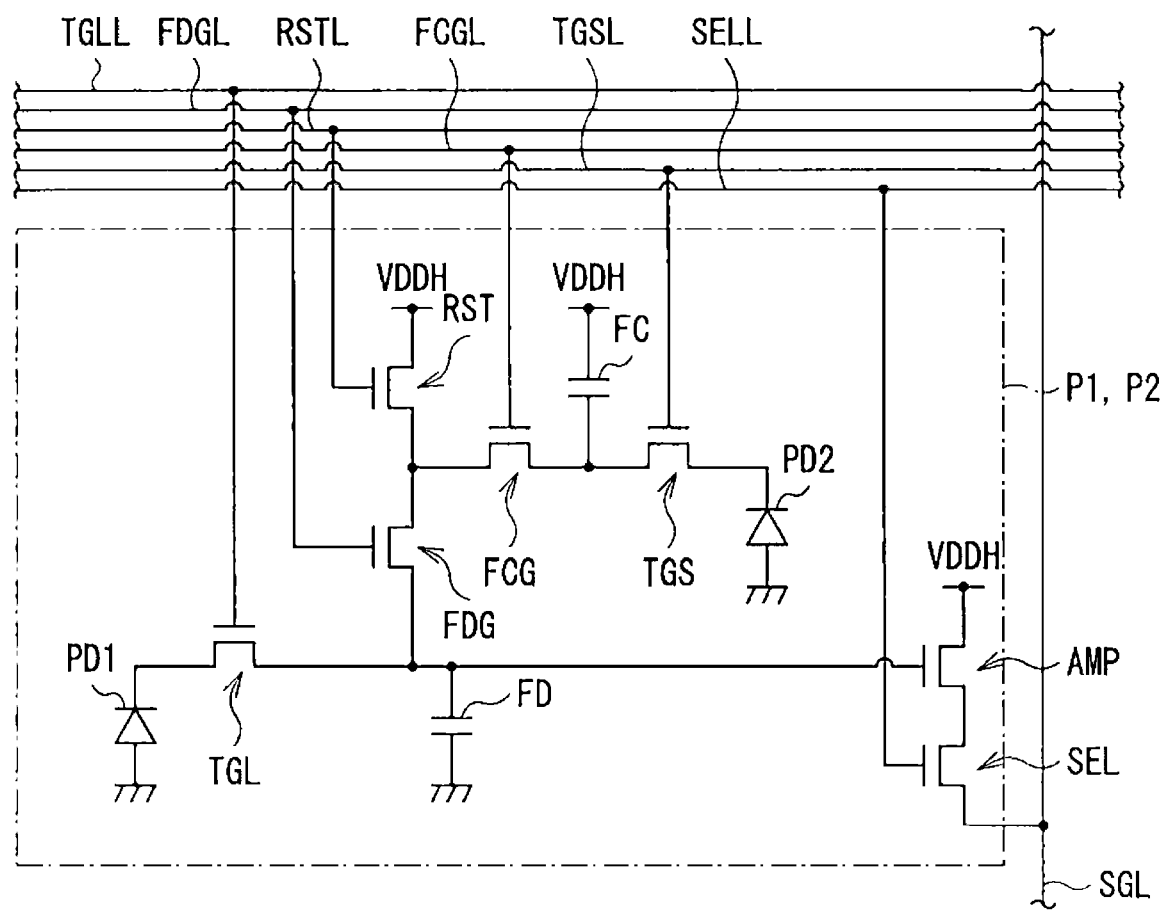
FIG. 41 is a circuit diagram of a configuration example of a pixel array according to another modified example.

FIG. 41 illustrates one configuration example of the imaging pixels P1 in the pixel array 90. Note that the same applies to the light shielding pixels P2. The pixel array 90 according to the present modification includes a plurality of control lines TGLL, a plurality of control lines FDGL, a plurality of control lines RSTL, a plurality of control lines FCGL, a plurality of control lines TGSL, a plurality of control lines SELL, and a plurality of signal lines SGL. The control lines TGLL extend horizontally, and a control signal STGL is applied to the control lines TGLL from the scanning unit 91. The control lines FDGL extend horizontally (horizontal direction in FIG. 41), and a control signal SFDG is applied to the control lines FDGL from the scanning unit 91. The control line RSTL extend horizontally, and the control signal SRST is applied to the control lines RSTL from the scanning unit 91. The control lines FCGL extend horizontally, and a control signal SFCG is applied to the control lines FCGL from the scanning unit 91. The control lines TGSL extend horizontally, and a control signal STGS is applied to the control lines TGSL from the scanning unit 91. The control lines SELL extend horizontally, and a control signal SSEL is applied to the control lines SELL from the scanning unit 91. The signal lines SGL extend vertically (vertical direction in FIG. 41) and are connected to the readout unit 40.

The imaging pixel P1 includes a photodiode PD1, a transistor TGL, a photodiode PD2, a transistor TGS, a capacitance element FC, transistors FCG, RST, and FDG, a floating diffusion FD, and transistors AMP and SEL. In this example, the transistors TGL, TGS, FCG, RST, FDG, AMP and SEL are N-type MOS transistors.

The photodiode PD1 is a photoelectric conversion element that generates electric charges in an amount corresponding to the amount of received light and accumulates the electric charges therein. The light receiving area where the photodiode PD1 can receive light is wider than the light receiving area where the photodiode PD2 can receive light. The photodiode PD1 has its anode grounded and its cathode connected to the source of the transistor TGL.

The transistor TGL has its gate connected to the control line TGLL, its source connected to the cathode of the photodiode PD1, and its drain connected to the floating diffusion FD.

The photodiode PD2 is a photoelectric conversion element that generates electric charges in an amount corresponding to the amount of received light and accumulates the electric charges therein. The light receiving area where the photodiode PD2 can receive light is narrower than the light receiving area where the photodiode PD1 can receive light. The photodiode PD2 has its anode grounded and its cathode connected to the source of the transistor TGS.

The transistor TGS has its gate connected to the control line TGSL, its source connected to the cathode of the photodiode PD2, and its drain connected to one end of the capacitance element FC and the source of the transistor FCG.

One end of the capacitance element FC is connected to the drain of the transistor TGS and the source of the transistor FCG, and the power supply voltage VDD is supplied to the other end of the capacitance element FC.

The transistor FCG has its gate connected to the control line FCGL, its source connected to one end of the capacitance element FC and the drain of the transistor TGS, and its drain connected to the source of the transistor RST and the drain of the transistor FDG.

The transistor RST has its gate connected to the control line RSTL, its drain supplied with the power supply voltage VDD, and its source connected to the drains of the transistors FCG and FDG.

The transistor FDG has its gate connected to the control line FDGL, its drain connected to the source of the transistor RST and the drain of the transistor FCG, and its source connected to the floating diffusion FD.

The floating diffusion FD accumulates electric charges supplied from the photodiodes PD1 and PD2, and is configured using, for example, a diffusion layer formed on the surface of the semiconductor substrate. In FIG. 41, the floating diffusion FD is illustrated using the symbols of capacitance elements.

With this configuration, in the imaging pixel P1, the transistor SEL is turned on, on the basis of the control signal SSEL applied to the control line SELL, so that the imaging pixel P1 is electrically connected to the signal line SGL. As a result, the transistor AMP is connected to the current source 44 of the readout unit 40 and operates as a so-called source follower. Then, the imaging pixel P1 outputs the pixel voltage VP corresponding to the voltage at the floating diffusion FD as the signal SIG to the signal line SGL. Specifically, as will be described later, the imaging pixel P1 successively outputs eight pixel voltages VP (VP1 to VP8) in eight periods (conversion periods T1 to T8) in a so-called horizontal period H.

Figure 42:
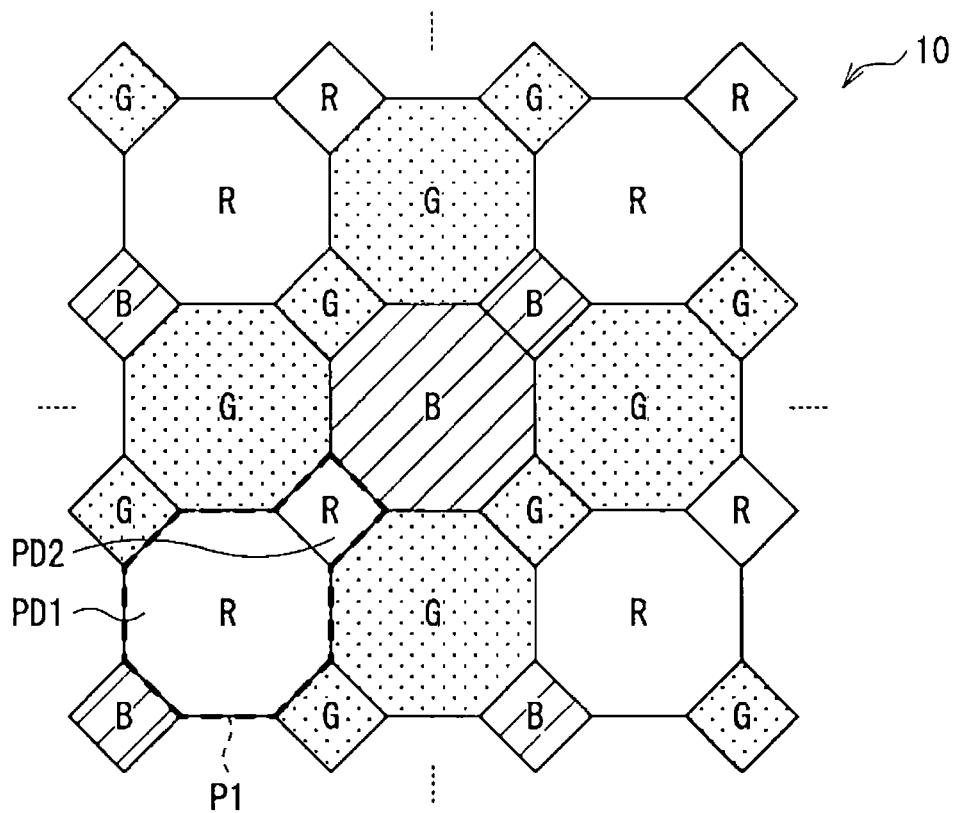
FIG. 42 is an explanatory diagram of a configuration example of the pixel array illustrated in FIG. 41.

FIG. 42 illustrates an example arrangement of the photodiodes PD1 and PD2 in the pixel array 10. In FIG. 42, "R" indicates a red color filter, "G" indicates a green color filter, and "B" indicates a blue color filter. In each imaging pixel P1, the photodiode PD2 is formed on the upper right of the photodiode PD1. Color filters of the same color are formed on the two photodiodes PD1 and PD2 in each imaging pixel P1. In this example, the photodiode PD1 has an octagonal shape, and the photodiode PD2 has a quadrangular shape. As illustrated in this drawing, the light receiving area where the photodiode PD1 can receive light is wider than the light receiving area where the photodiode PD2 can receive light.

The scanning unit 91 (FIG. 1) generates the control signals STGL, SFDG, SRST, SFCG, STGS, and SSEL, respectively.

The control unit 98 supplies control signals to the scanning unit 91, the signal generation units 22 and 23, the readout unit 40 (readout units 40S and 40N), and the signal processing unit 99, and controls the operation of these circuits to further control the operation of the imaging device 2.

The signal processing unit 99 has a function of performing image synthesis processing on the basis of the signal DATA0 (image signals DATA0S and DATA0N) supplied from the readout unit 40. In this image synthesizing process, the signal processing unit 99 generates four images PIC (images PIC1, PIC2, PIC3, and PIC4) on the basis of the eight digital codes CODE (digital codes CODE1 to CODE5) obtained in the eight periods (conversion periods T1 to T8) for performing AD conversion supplied from the readout unit 40. Then, the signal processing unit 99 combines the four images PIC to generate one captured image PICA.

Next, the reading drive D2 will be described in detail. Hereinafter, focusing on the imaging pixel P1A of the plurality of imaging pixels P1, the operation of the imaging pixel P1A will be described in detail.

Figure 43:
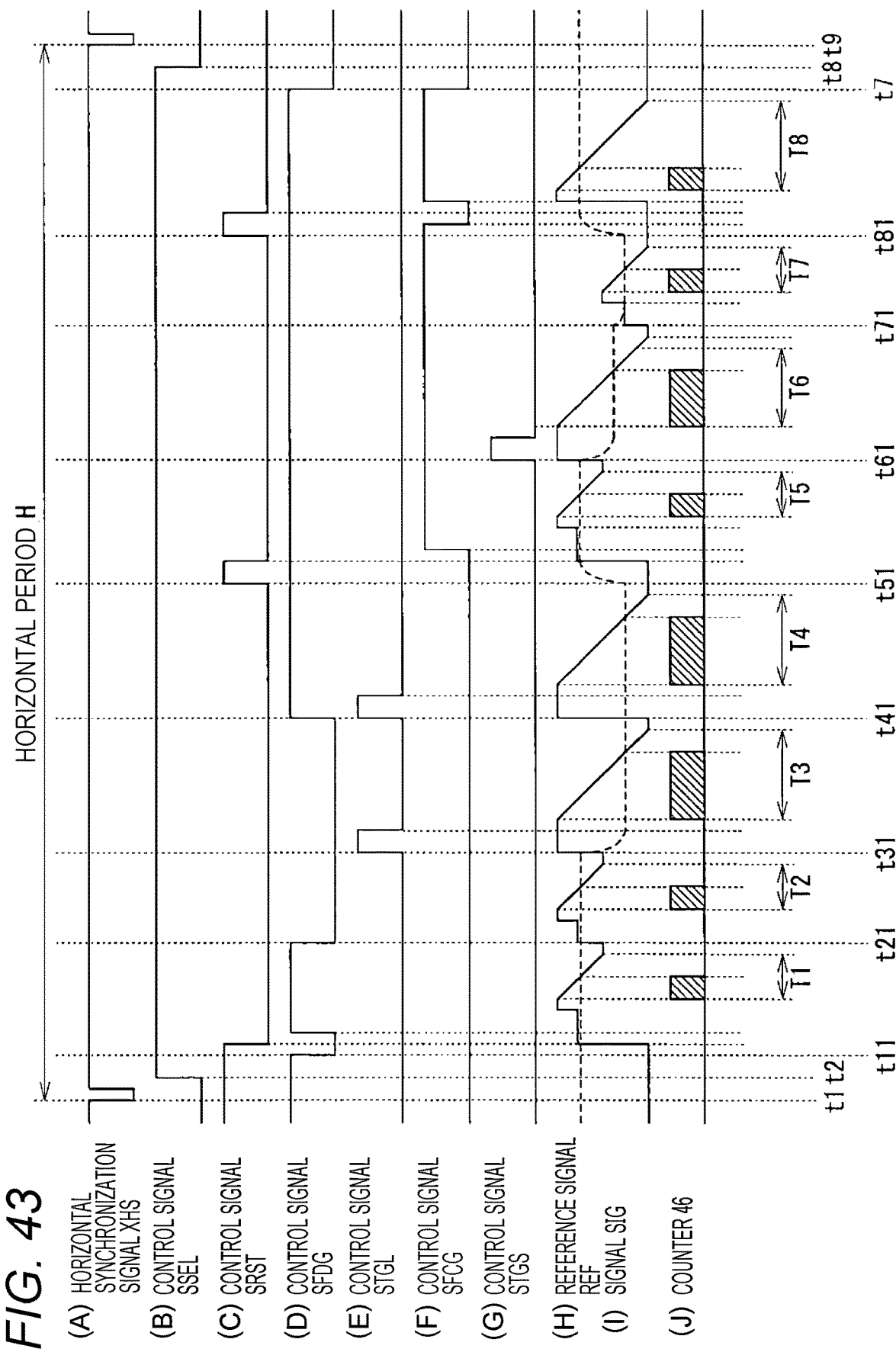
FIG. 43 is a timing waveform of an operation example of the imaging device according to another modified example.

FIGS. 43, 44A, and 44B illustrate an operation example of the imaging device 2. In FIG. 43, (A) indicates the waveform of the horizontal synchronization signal XHS, (B) indicates the waveform of the control signal SSEL supplied to the imaging pixels P1A, (C) indicates the waveform of the control signal SRST supplied to the imaging pixels P1A, (D) indicates the waveform of the control signal SFDG supplied to the imaging pixel P1A, (E) indicates the waveform of the control signal STGL supplied to the imaging pixels P1A, (F) indicates the waveform of the control signal SFCG supplied to the imaging pixels P1A, (G) indicates the waveform of the control signal STGS supplied to the imaging pixels P1A, (H) indicates the waveform of the reference signal REF, (I) indicates the waveform of the signal SIG output from the imaging pixels P1A, and (J) indicates the operation of the counter 46 in the AD conversion unit ADC connected to the imaging pixels P1A. FIG. 44A illustrates the first half of the operation illustrated in FIG. 43, and FIG. 44B illustrates the second half of the operation illustrated in FIG. 43. In FIGS. 43, 44A, and 44B, (H) indicates the waveform of the reference signal REF at the positive input terminal of the comparator 45, and (I) indicates the waveform of the signal SIG at the negative input terminal of the comparator 45. Furthermore, in FIGS. 43, 44A, and 44B, the shaded portions of (J) indicate that the counter 46 is performing counting operation.

Figure 45A:
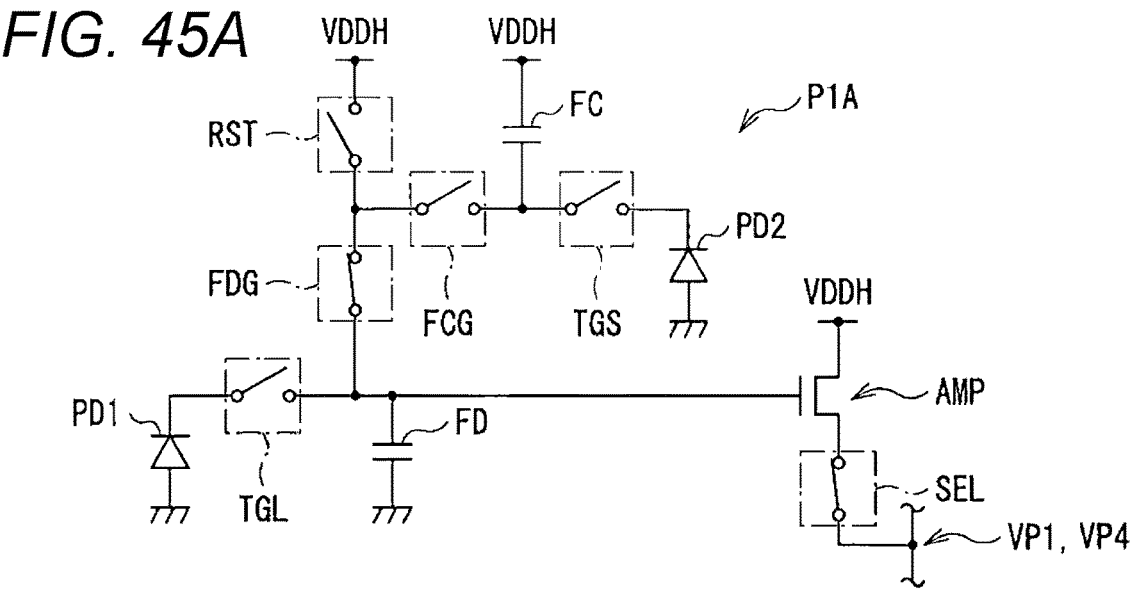
FIG. 45A is an explanatory diagram illustrating an operation state of an imaging device according to another modified example.
Figure 45B:
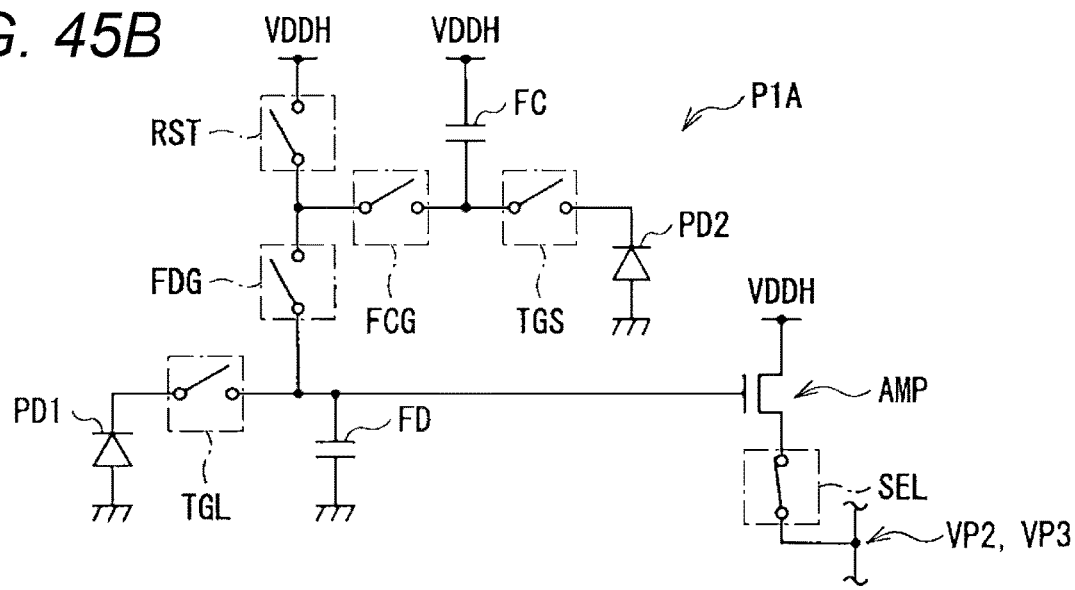
FIG. 45B is an explanatory diagram illustrating another operation state of the imaging device according to another modified example.
Figure 45C:
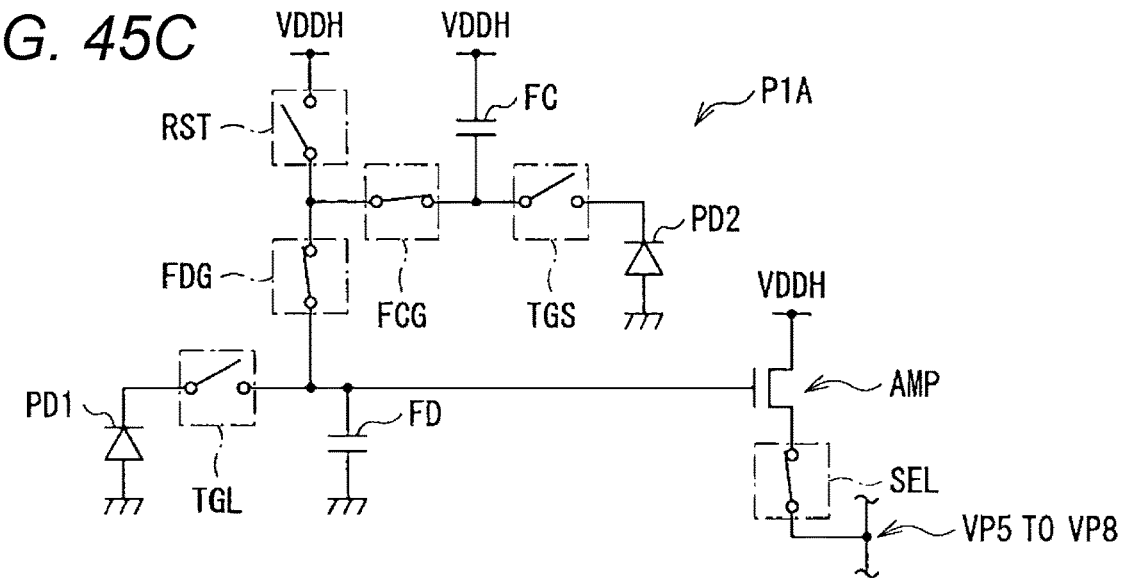
FIG. 45C is an explanatory diagram illustrating another operation state of the imaging device according to another modified example.

FIGS. 45A to 45C illustrate the state of the imaging pixels P1A. In FIGS. 45A to 45C, the transistors TGL, RST, FDG, TGS, FCG, and SEL are illustrated using switches corresponding to the operation states of the transistors.

In the imaging device 2, in a certain horizontal period H, the scanning unit 91 first selects the pixel line L including the imaging pixel P1A using the control signal SSEL and electrically connects the imaging pixel HA to the signal line SGL corresponding to the imaging pixel P1A. Then, the scanning unit 91 controls the operation of the imaging pixel P1A using the control signals SRST, SFDG, STGL, SFCG, and STGS, and the imaging pixel P1A sequentially outputs eight pixel voltages VP1 to VP8 in eight conversion periods T1 to T8. Then, the AD conversion units ADC of the readout unit 40 individually perform AD conversion on the basis of these eight pixel voltages VP1 to VP8, and output eight digital codes CODE1 to CODE5. This operation will be described in detail below.

First, at timing y1, when the horizontal period H starts, the scanning unit 91 changes the voltage of the control signal SSEL from the low level to the high level at timing t2 ((B) in FIG. 44A). As a result, in the imaging pixel P1A, the transistor SEL is turned on, and the imaging pixel P1A is electrically connected to the signal line SGL.

In the period up to timing t11, the scanning unit 91 brings the control signals SRST and SFDG to the high level ((C) and (D) in FIG. 44A). As a result, in the imaging pixel P1A, both the transistors RST and FDG are turned on, the voltage of the floating diffusion FD is set to the power supply voltage VDDH, and the floating diffusion FD is reset.

(Operation Between Timing t11 to t21)

Next, at timing t11, the scanning unit 91 changes the voltage of the control signal SFDG from the high level to the low level ((D) in FIG. 44A). As a result, the transistor FDG is turned off in the imaging pixel P1A. Next, at timing t12, the scanning unit 91 changes the voltage of the control signal SRST from the high level to the low level ((C) in FIG. 44A). As a result, the transistor RST is turned off in the imaging pixel P1A. Next, at timing t13, the scanning unit 91 changes the voltage of the control signal SFDG from low level to high level (FIG. 44A (D)). As a result, the transistor FDG is turned on in the imaging pixel P1A. Furthermore, the comparator 45 performs zero adjustment for electrically connecting the positive input terminal and the negative input terminal during the period between timing t13 and t14.

Next, at timing t14, the comparator 45 completes the zero adjustment and electrically disconnects the positive input terminal from the negative input terminal. Then, at this timing t14, the reference signal generation unit 51 changes the voltage of the reference signal REF to the voltage V1 ((H) in FIG. 44A).

As a result, in the imaging pixel P1A, as illustrated in FIG. 45A, the transistors FDG and SEL are turned on, and all the other transistors are turned off. Since the transistor FDG is in the on-state, the floating diffusion FD and the transistor FDG constitute a combined capacitance. This combined capacitance functions as a conversion capacitance for converting electric charges to voltage in the imaging pixel P1A. In the imaging pixel P1A, since the transistor FDG is in the on-state, the conversion value of the conversion capacitor in the imaging pixel P1A is large, so the conversion efficiency from the electric charge to the voltage is low. This conversion capacitance holds the electric charge at the time when the floating diffusion FD is reset in the period up to timing t12. The imaging pixel P1A outputs a pixel voltage VP (pixel voltage VP1) corresponding to the voltage at the floating diffusion FD at this time.

Next, during the period between timing t15 and t17 (the conversion period T1), the AD conversion unit ADC performs the AD conversion on the basis of the pixel voltage VP1. Specifically, at timing t15, the control unit 98 starts generating the clock signal CLK, and simultaneously, the reference signal generation unit 51 lowers the voltage of the reference signal REF from the voltage V1 at a predetermined degree of change ((H) in FIG. 44A). In response to this, the counter 46 of the AD conversion unit ADC starts the count operation ((J) in FIG. 44A).

Then, at timing t16, the voltage of the reference signal REF becomes lower than the voltage of the signal SIG (pixel voltage VP1) ((H) and (I) in FIG. 44A). In responding to this, the comparator 45 of the AD conversion unit ADC changes the voltage of the signal CMP and, as a result, the counter 46 stops the counting operation ((J) in FIG. 44A). The count value CNT of the counter 46 at the time when the counting operation is stopped corresponds to the pixel voltage VP1. The AD conversion unit ADC thus performs AD conversion on the basis of the pixel voltage VP1, and the latch 47 of the AD conversion unit ADC holds the count value CNT of the counter 46 and outputs the held count value CNT as a digital CODE1 ((J) in FIG. 44A).

Then, at timing t17, the control unit 98 stops generating the clock signal CLK with the end of the conversion period T1, the reference signal generation unit 51 stops changing the voltage of the reference signal REF ((H) in FIG. 44A), and the counter 46 resets the count value CNT.

(Operation Between Timing t21 to t31)

Next, at timing t21, the scanning unit 91 changes the voltage of the control signal SFDG from the high level to the low level ((D) in FIG. 44A). As a result, the transistor FDG is turned off in the imaging pixel HA. Furthermore, the comparator 45 performs zero adjustment for electrically connecting the positive input terminal and the negative input terminal during the period between timing t21 to t22.

Next, at timing t22, the comparator 45 completes the zero adjustment and electrically disconnects the positive input terminal from the negative input terminal. Then, at timing t22, the reference signal generation unit 51 changes the voltage of the reference signal REF to the voltage V1 ((H) in FIG. 44A).

As a result, in the imaging pixel HA, as illustrated in FIG. 45B, the transistor SEL is turned on and all the other transistors are turned off. In the imaging pixel P1A, since the transistor FDG is in the off-state, the capacitance value of the conversion capacitor in the imaging pixel P1A is small, so the conversion efficiency from electric charge to voltage is high. This conversion capacitance holds the electric charge at the time when the floating diffusion FD is reset in the period up to timing t12. The imaging pixel P1A outputs the pixel voltage VP (pixel voltage VP2) corresponding to the voltage at the floating diffusion FD at this time.

Next, during the period between timing t23 and t25 (the conversion period T2), the AD conversion unit ADC performs the AD conversion on the basis of the pixel voltage VP2. This operation is the same as the operation in the conversion period T1. The AD conversion unit ADC performs AD conversion on the basis of the pixel voltage VP2, and the latch 47 of the AD conversion unit ADC holds the count value CNT of the counter 46 and outputs the held count value CNT as the digital code CODE2 ((J) in FIG. 44A).

(Operation from Timing t31 to t41)Next, at timing t31, the scanning unit 91 changes the voltage of the control signal STGL from the low level to the high level ((E) in FIG. 44A). As a result, the transistor TGL is turned on in the imaging pixel P1A. As a result, the electric charge generated in the photodiode PD1 is transferred to the floating diffusion FD. Furthermore, at the timing t31, the reference signal generation unit 51 changes the voltage of the reference signal REF to the voltage V1 ((H) in FIG. 44A).

Next, at timing t32, the scanning unit 91 changes the voltage of the control signal STGL from the high level to the low level ((E) in FIG. 44A). As a result, the transistor TGL is turned off in the imaging pixel P1A.

As a result, in the imaging pixel P1A, since the transistor FDG is in the off-state, as illustrated in FIG. 45B, the capacitance value of the conversion capacitance in the imaging pixel P1A is small, so that the conversion efficiency from the electric charge to voltage is high. The conversion capacitance holds the electric charges transferred from the photodiode PD1 at timing between t31 and t32. The imaging pixel P1A outputs the pixel voltage VP (pixel voltage VP3) corresponding to the voltage at the floating diffusion FD at this time.

Next, during the period between timing t33 and t35 (the conversion period T3), the AD conversion unit ADC performs the AD conversion on the basis of the pixel voltage VP3. This operation is the same as the operation in the conversion period T1. The AD conversion unit ADC performs AD conversion on the basis of the pixel voltage VP3, and the latch 47 of the AD conversion unit ADC holds the count value CNT of the counter 46 and outputs the held count value CNT as a digital code CODE3 ((J) in FIG. 44A). This digital code CODE3 corresponds to the digital code CODE2 obtained when the conversion efficiency is high as well (conversion period T2).

(Operation Between Timing t41 to t51)Next, at timing t41, the scanning unit 91 changes the voltage of the control signal SFDG from the low level to the high level and changes the voltage of the control signal STGL from the low level to the high level ((D) and (E) in FIG. 44A). As a result, in the imaging pixel HA, both the transistors FDG and TGL are turned on. Also, at this timing t41, the reference signal generation unit 51 changes the voltage of the reference signal REF to the voltage V1 ((H) in FIG. 44A). Next, at timing t42, the scanning unit 91 changes the voltage of the control signal STGL from the high level to the low level ((E) in FIG. 44A). As a result, the transistor TGL is turned off in the imaging pixel P1A.

As a result, in the imaging pixel HA, as illustrated in FIG. 45A, since the transistor FDG is in the on-state, the floating diffusion FD and the transistor FDG constitute a composite capacitance (conversion capacitance). Therefore, since the capacitance value of the conversion capacitance in the imaging pixel P1A is large, the conversion efficiency from electric charge to voltage is low. This conversion capacitance holds the electric charges transferred from the photodiode PD1 at timing t31 to t32 and t41 to t42. The imaging pixel HA outputs a pixel voltage VP (pixel voltage VP4) corresponding to the voltage at the floating diffusion FD at this time.

Next, during the period between timing t43 and timing t45 (conversion period T4), the AD conversion unit ADC performs the AD conversion on the basis of the pixel voltage VP4. This operation is the same as the operation in the conversion period T1. The AD conversion unit ADC performs AD conversion on the basis of the pixel voltage VP4, and the latch 47 of the AD conversion unit ADC holds the count value CNT of the counter 46 and outputs the held count value CNT as a digital code CODE4 ((J) in FIG. 44A). This digital code CODE4 corresponds to the digital code CODE1 obtained when the conversion efficiency is low as well (conversion period T1).

(Operation of Timing Between t51 to t61)Next, at timing t51, the scanning unit 91 changes the voltage of the control signal SRST from a low level to a high level ((C) in FIG. 44B). As a result, in the imaging pixel HA, the transistor RST is turned on. Since the transistor FDG is in the on-state, the voltage of the floating diffusion FD is set to the power supply voltage VDDH, and the floating diffusion FD is reset. Next, at timing t52, the scanning unit 91 changes the voltage of the control signal SRST from the high level to the low level ((C) in FIG. 44B). As a result, the transistor RST is turned off in the imaging pixel P1A. Furthermore, at this timing t52, the reference signal generation unit 51 changes the voltage of the reference signal REF to the voltage V1 ((H) in FIG. 44B).

Next, at timing t53, the scanning unit 91 changes the voltage of the control signal SFCG from the low level to the high level ((F) in FIG. 44B). As a result, the transistor FCG is turned on in the imaging pixel HA. Furthermore, the comparator 45 performs zero adjustment for electrically connecting the positive input terminal and the negative input terminal during the period between timing t53 and t54.

Next, at timing t54, the comparator 45 completes the zero adjustment and electrically disconnects the positive input terminal from the negative input terminal. Furthermore, at the timing t54, the reference signal generation unit 51 changes the voltage of the reference signal REF to the voltage V1 ((H) in FIG. 44A).

As a result, in the imaging pixel HA, as illustrated in FIG. 45C, the transistors FDG, FCG, and SEL are turned on and all the other transistors are turned off. Since both the transistors FDG and FCG are in the on-state, the floating diffusion FD, the transistors FDG and FCG, and the capacitance element FC constitute a composite capacitance (conversion capacitance). This conversion capacitance is generated in the photodiode PD2 before timing t53 and holds the electric charge having been supplied to and accumulated in the capacitance element FC via the transistor TGS. The imaging pixel HA outputs the pixel voltage VP (pixel voltage VP5) corresponding to the voltage at the floating diffusion FD at this time.

Next, during the period between timing t55 and timing t57 (the conversion period T5), the AD conversion unit ADC performs the AD conversion on the basis of the pixel voltage VP5. This operation is the same as the operation in the conversion period T1. The AD conversion unit ADC performs AD conversion on the basis of the pixel voltage VP5, and the latch 47 of the AD conversion unit ADC holds the count value CNT of the counter 46 and outputs the held count value CNT as a digital code CODE5 ((J) in FIG. 44B).

(Operation Between Timing t61 to t71)Next, at timing t61, the scanning unit 91 changes the voltage of the control signal STGS from the low level to the high level ((G) in FIG. 44B). As a result, the transistor TGS is turned on in the imaging pixel P1A. As a result, the electric charge generated in the photodiode PD2 is transferred to the floating diffusion FD and the capacitance element FC. Furthermore, at this timing t61, the reference signal generation unit 51 changes the voltage of the reference signal REF to the voltage V1 ((H) in FIG. 44B).

Next, at timing t62, the scanning unit 91 changes the voltage of the control signal STGS from the high level to the low level ((G) in FIG. 44B). As a result, the transistor TGS is turned off in the imaging pixel P1A.

As a result, in the imaging pixel HA, since both the transistors FDG and FCG are in the on-state as illustrated in FIG. 45C, the floating diffusion FD, the transistors FDG and FCG, and the capacitance element FC constitute a composite capacitance (conversion capacitance). The conversion capacitance holds the electric charge transferred from the photodiode PD2 in the period between timing t61 and t62, in addition to the electric charge generated in the photodiode PD2 before timing t53 and supplied to and accumulated in the capacitance element FC via the transistor TGS. The imaging pixel HA outputs the pixel voltage VP (pixel voltage VP6) corresponding to the voltage at the floating diffusion FD at this time.

Next, during the period between timing t63 and t65 (the conversion period T6), the AD conversion unit ADC performs AD conversion on the basis of the pixel voltage VP6. This operation is the same as the operation in the conversion period T1. The AD conversion unit ADC performs AD conversion on the basis of the pixel voltage VP6, and the latch 47 of the AD conversion unit ADC holds the count value CNT of the counter 46 and outputs the held count value CNT as the digital code CODE6 ((J) in FIG. 44B). This digital code CODE6 corresponds to the digital code CODE5 obtained when the floating diffusion FD, the transistors FDG and FCG, and the capacitance element FC constitute a composite capacitance.

(Operation Between Timing t71 to t81)Next, the comparator 45 performs zero adjustment for electrically connecting the positive input terminal and the negative input terminal during the period between timing t71 to timing t72.

Next, at timing t72, the comparator 45 completes the zero adjustment and electrically disconnects the positive input terminal from the negative input terminal. Furthermore, at the timing t72, the reference signal generation unit 51 changes the voltage of the reference signal REF to the voltage V1 ((H) in FIG. 44B).

As a result, in the imaging pixel P1A, since both the transistors FDG and FCG are in the on-state as illustrated in FIG. 45C, the floating diffusion FD, the transistors FDG and FCG, and the capacitance element FC constitute a composite capacitance (conversion capacitance). The conversion capacitance holds the electric charge transferred from the photodiode PD2 in the period between timing t61 and t62, in addition to the electric charge generated in the photodiode PD2 before timing t53 and supplied to and accumulated in the capacitance element FC via the transistor TGS. The imaging pixel P1A outputs the pixel voltage VP (pixel voltage VP7) corresponding to the voltage at the floating diffusion FD at this time.

Next, during the period between timing t73 and t75 (the conversion period T7), the AD conversion unit ADC performs the AD conversion on the basis of the pixel voltage VP7. This operation is the same as the operation in the conversion period T1. The AD conversion unit ADC performs AD conversion on the basis of the pixel voltage VP7, and the latch 47 of the AD conversion unit ADC holds the count value CNT of the counter 46 and outputs the held count value CNT as the digital code CODE? ((J) in FIG. 44B).

(Operation Between Timing t81 to t7)Next, at timing t81, the scanning unit 91 changes the voltage of the control signal SRST from the low level to the high level ((C) in FIG. 44B). As a result, in the imaging pixel P1A, the transistor RST is turned on. Since the transistors FDG and FCG are in the on-state, the voltage of the floating diffusion FD and the voltage of the capacitance element FC are set to the power supply voltage VDDH, and the floating diffusion FD and the capacitance element FC are reset.

Next, at timing t82, the scanning unit 91 changes the voltage of the control signal SFCG from the high level to the low level ((F) in FIG. 44B). As a result, the transistor FCG is turned off in the imaging pixel P1A.

Next, at timing t83, the scanning unit 91 changes the voltage of the control signal SRST from the high level to the low level ((C) in FIG. 44B). As a result, the transistor RST is turned off in the imaging pixel P1A.

Next, at timing t84, the scanning unit 91 changes the voltage of the control signal SFCG from the low level to the high level ((F) in FIG. 44B). As a result, the transistor FCG is turned on in the imaging pixel P1A. Furthermore, at the timing t84, the reference signal generation unit 51 changes the voltage of the reference signal REF to the voltage V1 ((H) in FIG. 44B).

As a result, in the imaging pixel HA, since both the transistors FDG and FCG are in the on-state as illustrated in FIG. 45C, the floating diffusion FD, the transistors FDG and FCG, and the capacitance element FC constitute a composite capacitance (conversion capacitance). This conversion capacitance holds the electric charge at the time when the floating diffusion FD and the capacitance element FC are reset at timing between t81 and t82. The imaging pixel P1A outputs the pixel voltage VP (pixel voltage VP8) corresponding to the voltage at the floating diffusion FD at this time.

Next, during the period between timing t85 and t87 (conversion period T8), the AD conversion unit ADC performs the AD conversion on the basis of the pixel voltage VP8. This operation is the same as the operation in the conversion period T1. The AD conversion unit ADC performs AD conversion on the basis of the pixel voltage VP8, and the latch 47 of the AD conversion unit ADC holds the count value CNT of the counter 46 and outputs the held count value CNT as the digital code CODE8 ((J) in FIG. 44B). This digital code CODE8 corresponds to the digital code CODE7 obtained when the floating diffusion FD, the transistors FDG and FCG, and the capacitance element FC constitute a composite capacitance.

Next, at timing t7, the scanning unit 91 changes the voltage of the control signal SFDG from the high level to the low level and changes the voltage of the control signal SFCG from the high level to the low level ((D) and (F) FIG. 44B). As a result, in the imaging pixel P1A, the transistors FDG and FCG are turned off.

Then, at timing t8, the scanning unit 91 changes the voltage of the control signal SSEL from the high level to the low level ((B) in FIG. 44B). As a result, in the imaging pixel P1A, the transistor SEL is turned off, and the imaging pixel P1A is electrically disconnected from the signal line SGL.

Next, image synthesis processing in the signal processing unit 99 will be described. The signal processing unit 99 generates four images PIC (images PIC1 to PIC4) on the basis of the digital code CODE supplied from the readout unit 40. Then, the signal processing unit 99 combines the four images PIC to generate one captured image PICA.

FIG. 46 schematically illustrates synthesis processing. The waveforms illustrated in (A) to (G) in FIG. 46 are similar to the waveforms illustrated in (A) to (G) in FIG. 44. As described with reference to FIGS. 44, and 44A to 44C, the readout unit 40 generates the digital code CODE1 on the basis of the operation during the period between timing yl 1 to t21, the digital code CODE2 on the basis of the operation during the period between timing t21 to t31, the digital code CODE3 on the basis of the operation during the period between timing t31 to t41, the digital code CODE4 on the basis of the operation during the period between timing t41 to t51, the digital code CODE5 on the basis of the operation during the period between timing t51 to t61, the digital code CODE6 on the basis of the operation during the period between timing t61 to t71, the digital code CODE7 on the basis of the operation during the period between timing t71 to t81, and the digital code CODE8 on the basis of the operation during the period between timing t81 to t7.

The signal processing unit 99 generates a pixel value VAL1 on the basis of the digital code CODE2 and the digital code CODE3. Specifically, the signal processing unit 99 calculates the pixel value VAL1 by subtracting the digital code CODE2 from the digital code CODE3 (CODE3-CODE2). In other words, the imaging device 2 calculates the pixel value VAL1 according to the principle of so-called correlated double sampling (CDS) by using the digital code CODE2 corresponding to the P-phase (Pre-Charge phase) data and the digital code CODE3 corresponding to the D-phase (Data phase) data.

Similarly, the signal processing unit 99 generates the pixel value VAL2 on the basis of the digital code CODE1 and the digital code CODE4. Specifically, the signal processing unit 99 calculates the pixel value VAL2 by subtracting the digital code CODE1 from the digital code CODE4 (CODE4-CODE1). In other words, the imaging device 2 calculates the pixel value VAL2 according to the principle of correlated double sampling by using the digital code CODE1 corresponding to the P-phase data and the digital code CODE4 corresponding to the D-phase data.

Similarly, the signal processing unit 99 generates the pixel value VAL3 on the basis of the digital code CODE5 and the digital code CODE6. Specifically, the signal processing unit 99 calculates the pixel value VAL3 by subtracting the digital code CODE5 from the digital code CODE6 (CODE6-CODE5). In other words, the imaging device 2 calculates the pixel value VAL3 according to the principle of correlated double sampling by using the digital code CODE5 corresponding to the P-phase data and the digital code CODE6 corresponding to the D-phase data.

Then, the signal processing unit 99 generates the pixel value VAL4 on the basis of the digital code CODE7 and the digital code CODE8. Specifically, the signal processing unit 99 calculates the pixel value VAL4 by subtracting the digital code CODE8 from the digital code CODE7 (CODE7-CODE8). In other words, the imaging device 2 calculates the pixel value VAL4 according to the principle of so-called double data sampling (DDS) by using the digital code CODE7 before resetting the floating diffusion FD and the capacitance element FC and the digital code CODE8 after resetting the floating diffusion FD and the capacitance element FC.

Then, the signal processing unit 99 generates an image PIC1 on the basis of the pixel value VAL1 at all the imaging pixels P1 in the pixel array 90, an image PIC2 on the basis of the pixel value VAL2 at all the imaging pixels P1 in the pixel array 90, an image PIC3 on the basis of the pixel value VAL3 at all the imaging pixels P1 in the pixel array 90, and an image PIC4 on the basis of the pixel value VAL4 at all the imaging pixels P1 in the pixel array 90. Then, the signal processing unit 99 combines these images PIC1 to PIC4 to generate a captured image PICA.

In the imaging device 2, as illustrated in FIG. 46, the readout unit 40 outputs the digital codes CODE2 and CODE3, and the signal processing unit 99 subtracts the digital code CODE2 from the digital code CODE3 (CODE3-CODE2) to calculate the pixel value VAL1, but it not limited to this. Alternatively, similarly to the case of the imaging device 1 according to the above embodiment (FIG. 17), the readout unit 40 may invert the polarity of the count value CNT after the conversion period T2 to output the digital code CODE corresponding to the difference between the digital codes CODE2 and CODE3. The same applies to the digital codes CODE5 and CODE6, and CODE7 and CODE5.

Furthermore, in the imaging device 2, the readout unit 40 calculates the pixel value VAL2 by, for example, the readout unit 40 outputting the digital codes CODE1 and CODE4, and the signal processing unit 99 subtracting the digital code CODE1 from the digital code CODE4 (CODE4-CODE1), as illustrated in FIG. 46, but the calculation is not limited to this. Alternatively, the AD conversion unit ADC of the readout unit 40 may temporarily store the count value CNT then after the conversion period T1, and set the count value CNT in the counter 46 before the conversion period T4, while inverting the polarity of the count value CNT. In this case, the signal processing unit 99 can also obtain the digital code CODE corresponding to the difference between the digital codes CODE1 and CODE4.

[Modification 6] In the above embodiment, each AD conversion unit ADC is connected to the one column of the plurality of pixels P in the pixel array 10, but the present disclosure is not limited thereto. Alternatively, for example, like the imaging device 1F illustrated in FIG. 47, each AD conversion unit ADC may be connected to a plurality of pixels P that belongs to a predetermined area. The imaging device 1F is formed on two semiconductor substrates 401 and 402. The pixel array 10 is formed on the semiconductor substrate 401. The pixel array 10 is divided into a plurality of (21 in this example) areas AR, and a plurality of (160 in this example) pixels P are formed in each area AR. On the semiconductor substrate 402, a readout unit 40 is formed. Specifically, on the semiconductor substrate 402, the AD conversion units ADC connected to the plurality of pixels P belonging to individual areas AR of the semiconductor substrate 401 are formed in each of a plurality of regions corresponding to the plurality of areas AR. The semiconductor substrates 401 and 402 are overlapped and electrically connected to each other at connecting portions 403 using, for example, Cu-Cu connection. Note that in this example, the pixel array 10 is divided into 21 areas AR, but the present disclosure is not limited thereto. Alternatively, the pixel array 10 may be divided into, for example, not more than 20 areas AR or not less than 22 areas AR. Furthermore, in this example, 160 imaging pixels P1 are provided in each area AR, but it is no limited to this and not more than 159 pixels P or not less than 161 pixels P may be provided, for example.

[Other Modifications] Furthermore, Two or More of These Modifications may be Combined.

Figure 48:
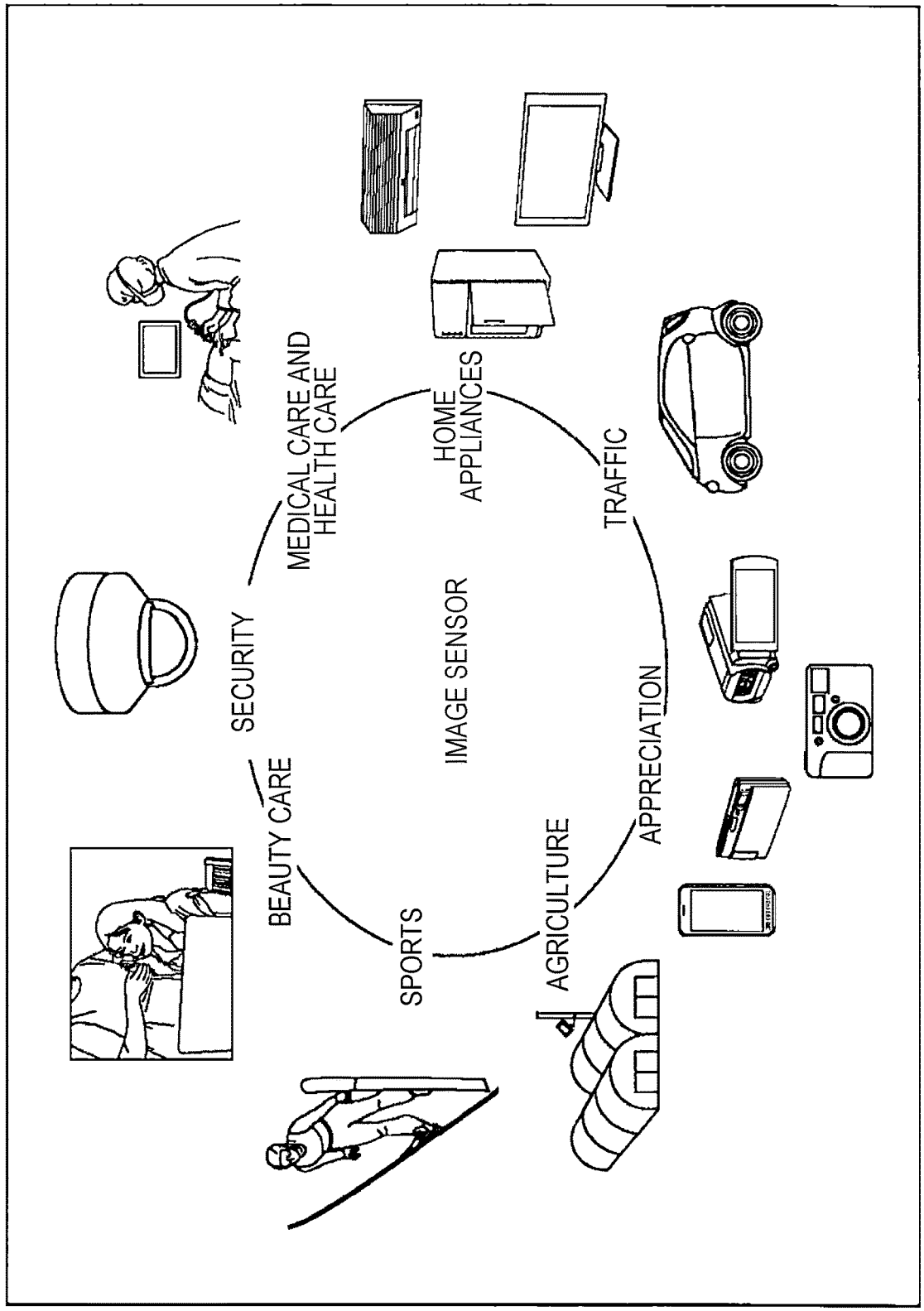
FIG. 48 is an explanatory diagram illustrating an example of use of the imaging device.

<2. Usage Example of Imaging Device> FIG. 48 illustrates a usage example of the imaging device 1 or the like according to the above embodiment. The imaging device 1 described above or the like can be used, for example, in various occasions below for sensing light, such as visible light, infrared light, ultraviolet light, or X-rays.

A device for shooting images for appreciation use, such as a digital camera and a portable device with camera function.

A device used for traffic to achieve safety driving such as automatic stopping, recognizing conditions of a driver, and so on, including an on-board sensor for shooting the front and rear, surroundings, interior, or the like of a vehicle, a monitoring camera for monitoring running vehicles and road conditions, a distance measuring sensor measuring the distance between vehicles or the like, and the like.

A device used for home appliances, such as a TV, a refrigerator, or an air-conditioner, to shoot gestures of a user and operate the device on the basis of the gestures.

A device used for medical care or health care, such as an endoscope or an angiography device which operates by receiving infrared light.

A device used for security, such as a monitoring camera for crime prevention or a camera for personal authentication.

A device for beauty care, such as a skin analyzer for shooting the skin or a microscope for shooting scalp.

A device used for sports, such as an action camera or a wearable camera used in sports or the like.

A device used for agriculture, such as a camera for monitoring fields and conditions of crops.

<3. Application Example to Mobile Body>

The technology (the present technology) according to the present disclosure can be applied to various products. For example, the technology according to the present disclosure may be implemented as an apparatus mounted on any type of moving body, such as a car, electric vehicle, hybrid electric vehicle, motorcycle, bicycle, personal mobility, airplane, drone, boat, and robot.

Figure 49:
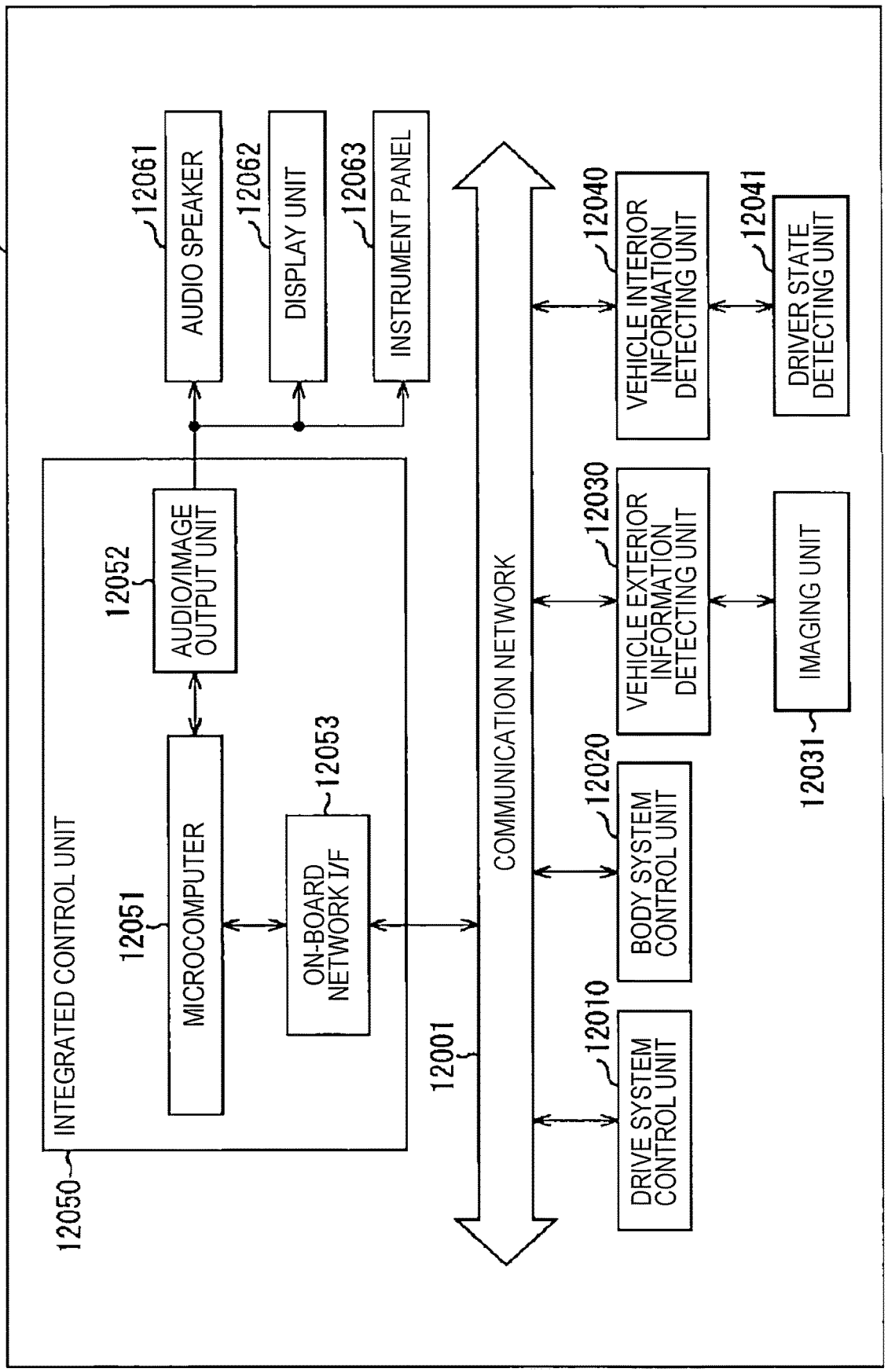
FIG. 49 is a block diagram illustrating an example of a schematic configuration of a vehicle control system.

FIG. 49 is a block diagram illustrating a schematic configuration example of a vehicle control system which is an example of a mobile unit control system to which the technology according to the present disclosure can be applied.

A vehicle control system 12000 includes a plurality of electronic control units connected via a communication network 12001. In the example illustrated in FIG. 49, the vehicle control system 12000 includes a drive system control unit 12010, a body system control unit 12020, a vehicle exterior information detecting unit 12030, a vehicle interior information detecting unit 12040, and an integrated control unit 12050. Furthermore, as a functional configuration of the integrated control unit 12050, a microcomputer 12051, an audio/image output unit 12052, and an in-vehicle network I/F (interface) 12053 are illustrated.

The drive system control unit 12010 controls the operation of the apparatus relating to the drive system of the vehicle according to the various programs. For example, the drive system control unit 12010 functions as a control device such as a driving force generating device for generating a driving force of a vehicle such as an internal combustion engine or a driving motor, a driving force transmitting mechanism for transmitting a driving force to the wheels, a steering mechanism for adjusting a steering angle of the vehicle, and a braking device for generating a braking force of the vehicle.

The body system control unit 12020 controls the operation of various devices equipped on the vehicle body according to various programs. For example, the body system control unit 12020 functions as a keyless entry system, a smart key system, a power window device, or a control device for various lamps such as a head lamp, a back lamp, a brake lamp, a turn indicator, or a fog lamp. In this case, the body system control unit 12020 can receive a radio wave transmitted from a portable device that substitutes for a key or a signal of various switches. The body system control unit 12020 receives input of these radio waves or signals and controls the door lock device, power window device, lamp, etc. of the vehicle.

The vehicle exterior information detecting unit 12030 detects information outside the vehicle on which the vehicle control system 12000 is mounted. For example, to the vehicle exterior information detecting unit 12030, an imaging unit 12031 is connected. The vehicle exterior information detecting unit 12030 causes the imaging unit 12031 to capture an image of the exterior of the vehicle and receives the captured image. The vehicle exterior information detecting unit 12030 may perform object detection processing or distance detection processing such as a person, a car, an obstacle, a sign, or a character on a road surface, on the basis of the received image.

The imaging unit 12031 is an optical sensor that receives light and outputs an electric signal corresponding to the amount of received light. The imaging unit 12031 can output an electric signal as an image or output it as distance measurement information. In addition, the light received by the imaging unit 12031 may be visible light or invisible light such as infrared light.

The vehicle interior information detecting unit 12040 detects information inside the vehicle. To the vehicle interior information detecting unit 12040, for example, a driver state detecting unit 12041 for detecting the state of the driver is connected. The driver state detecting unit 12041 includes, for example, a camera that images the driver, and the vehicle interior information detecting unit 12040 may calculate the degree of fatigue or degree of concentration of the driver or determine whether or not the driver is dozing off, on the basis of the detection information input from the driver state detecting unit 12041.

The microcomputer 12051 can calculate the control target value of the driving force generating device, the steering mechanism or the braking device on the basis of the information inside and outside of the vehicle acquired by the vehicle exterior information detecting unit 12030 or the vehicle interior information detecting unit 12040, and output a control command to the drive system control unit 12010. For example, the microcomputer 12051 can perform cooperative control aiming for realizing the function of Advanced Driver Assistance System (ADAS) including collision avoidance or impact mitigation of the vehicle, follow-up running based on the distance between vehicles, vehicle speed maintenance running, vehicle collision warning, vehicle lane departure warning, and the like.

In addition, the microcomputer 12051 controls the driving force generating device, the steering mechanism, the braking device, or the like on the basis of the information about the surroundings of the vehicle acquired by the vehicle exterior information detecting unit 12030 or the vehicle interior information detecting unit 12040 to perform cooperative control aiming for automatic driving or the like of autonomous travel without depending on the operation of the driver.

In addition, the microcomputer 12051 can output a control command to the body system control unit 12020 on the basis of the outside-vehicle information acquired by the vehicle exterior information detecting unit 12030. For example, the microcomputer 12051 controls the head lamp according to the position of the preceding vehicle or the oncoming vehicle detected by the vehicle exterior information detecting unit 12030, and performs cooperative control aiming for antiglare such as switching the high beam to low beam.

The audio/image output unit 12052 transmits at least one of audio or image output signals to an output device capable of visually or audibly notifying the occupant of the vehicle or the outside of the vehicle of information. In the example of FIG. 49, as an output device, an audio speaker 12061, a display unit 12062, and an instrument panel 12063 are illustrated. The display unit 12062 may include at least one of an on-board display or a head-up display, for example.

Figure 50:
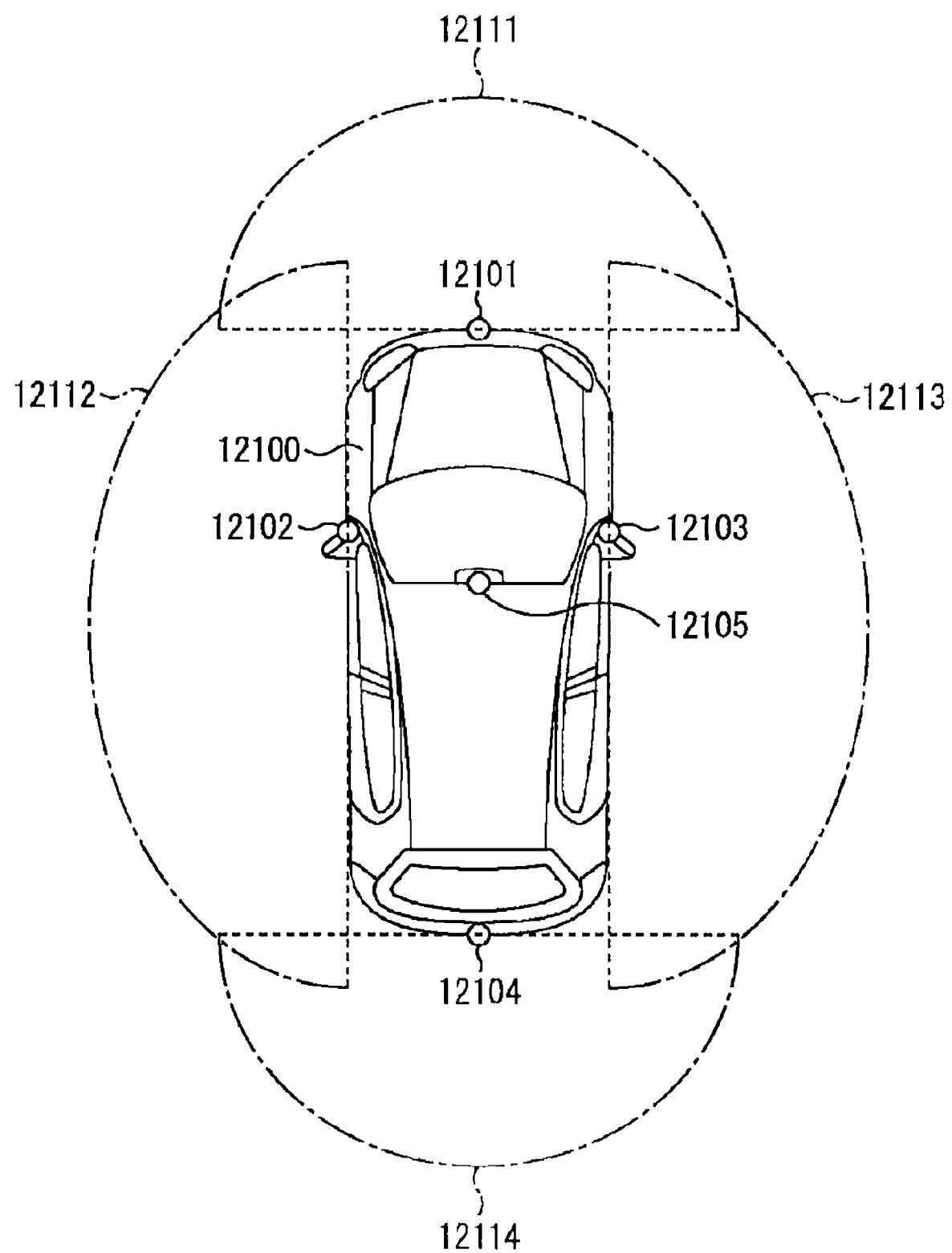
FIG. 50 is an explanatory diagram illustrating an example of installation positions of a vehicle exterior information detecting unit and an imaging unit.

FIG. 50 is a diagram illustrating an example of the installation position of the imaging unit 12031.

In FIG. 50, the vehicle 12100 includes imaging units 12101, 12102, 12103, 12104, and 12105 as the imaging unit 12031.

For example, the imaging units 12101, 12102, 12103, 12104, and 12105 are provided at positions such as the front nose, the side minors, the rear bumper, the back door, and the upper portion of the front glass in the passenger compartment of the vehicle 12100. The imaging unit 12101 provided at the front nose and the imaging unit 12105 provided in the upper portion of the windshield in the vehicle compartment mainly acquire an image ahead of the vehicle 12100. The imaging units 12102 and 12103 provided at the side mirrors mainly acquire images of the sides of the vehicle 12100. The imaging unit 12104 provided at the rear bumper or the back door mainly acquires an image behind the vehicle 12100. The front image acquired by the imaging units 12101 and 12105 is mainly used for detecting a preceding vehicle, pedestrians, obstacles, traffic signals, traffic signs, traffic lanes, or the like.

Note that FIG. 50 illustrates an example of the imaging range of the imaging units 12101 to 12104. An imaging range 12111 indicates the imaging range of the imaging unit 12101 provided at the front nose, imaging ranges 12112 and 12113 indicate the imaging ranges of the imaging units 12102 and 12103 provided at the side mirrors, and an imaging range 12114 indicates the imaging range of the imaging unit 12104 provided at the rear bumper or the back door. For example, by overlapping the image data captured by the imaging units 12101 to 12104, an overhead view of the vehicle 12100 viewed from above is obtained.

At least one of the imaging units 12101 to 12104 may have a function of acquiring distance information. For example, at least one of the imaging units 12101 to 12104 may be a stereo camera including a plurality of imaging elements, or may be an imaging device having pixels for phase difference detection.

For example, the microcomputer 12051 calculates the distance to three-dimensional objects located within the imaging ranges 12111 to 12114 and the temporal change (relative speed with respect to the vehicle 12100) of the distance on the basis of the distance information obtained from the imaging units 12101 to 12104. As a result, the microcomputer 12051 can particularly extract, as a preceding vehicle, the three-dimensional object located closest on a traveling road of the vehicle 12100 and traveling at a predetermined speed (e.g., at least 0 km/hour) in substantially the same direction as that of the vehicle 12100. Furthermore, the microcomputer 12051 can set an inter-vehicle distance to be secured in advance in front of the preceding vehicle, and can perform automatic brake control (including follow-up stop control), automatic acceleration control (including follow-up start control), and the like. Thus, it is possible to perform cooperative control aiming for automatic driving or the like of autonomous travel without depending on the operation of the driver.

For example, on the basis of the distance information obtained from the imaging units 12101 to 12104, the microcomputer 12051 can extract the data of three-dimensional objects by classifying three-dimensional objects into, for example, a two-wheeled vehicle, a general vehicle, a large vehicle, a pedestrian, a telephone pole, or other three-dimensional objects, and use such classified data for automatic avoidance of obstacles. For example, the microcomputer 12051 identifies an obstacle in the vicinity of the vehicle 12100 as an obstacle that the driver of the vehicle 12100 can see and an obstacle that the driver is difficult to see. Then, the microcomputer 12051 determines a collision risk indicating the possibility of collision with each obstacle and, when the collision risk is higher than a set value so that there is a possibility of collision, the microcomputer 12051 can alert to the driver through the audio speaker 12061 or the display unit 12062, or execute forced deceleration or risk-avoiding steering by the drive system control unit 12010, to enable driving assistance to prevent collision.

At least one of the imaging units 12101 to 12104 may be an infrared camera for detecting infrared rays. For example, the microcomputer 12051 can recognize a pedestrian by determining whether or not a pedestrian exists in the captured images of the imaging units 12101 to 12104. Such recognition of the pedestrian is carried out, for example, by a procedure of extracting feature points in a captured image of the imaging units 12101 to 12104 as an infrared camera and a procedure of performing pattern matching processing on a series of feature points indicating the outline of the object. When the microcomputer 12051 determines that a pedestrian exists in the captured images of the imaging units 12101 to 12104 and recognizes a pedestrian, the audio/image output unit 12052 controls the display unit 12062 to display a rectangular contour line for emphasizing the recognized pedestrian in a superimposing manner on the display. Furthermore, the audio/image output unit 12052 may control the display unit 12062 to display an icon or the like indicating the pedestrian at desired positions.

An example of the vehicle control system to which the technology according to the present disclosure can be applied has been described above. The technology according to the present disclosure can be applied to the imaging unit 12031 in the above-described configuration. Thus, in the vehicle control system 12000, it is possible to diagnose whether or not the imaging unit 12031 is operating properly by performing self-diagnosis. Then, in a case where a trouble occurs in the imaging unit 12031, the diagnosis result is reported, for example, to the microcomputer 12051 so that the vehicle control system 12000 can learn the occurrence of the trouble in the imaging unit 12031. As a result, the vehicle control system 12000 can perform appropriate processing such as, for example, urging the driver to call for attention, which improves reliability. Furthermore, the vehicle control system 12000 can restrict the function of controlling the vehicle on the basis of the result of diagnosis processing. Specific examples of the function of controlling the vehicle include a collision avoiding or collision mitigating function of the vehicle, a follow-up running function according to the inter-vehicle distance, a vehicle running speed maintaining function, a vehicle collision warning function, a traffic lane deviation of the vehicle warning function, and the like. In a case where the occurrence of the trouble is determined in the imaging unit 12031 as a result of the diagnosis processing, the vehicle control function is restricted or prohibited. Specifically, the vehicle control system 12000 can control the brake, the engine output, and the transmission. As a result, the vehicle control system 12000 can prevent accidents caused by erroneous detection due to the trouble of the imaging unit 12031.

Furthermore, for example, in a case where the vehicle control system 12000 includes two redundant imaging units 12031 (imaging units 12031A and 12031B) and if a trouble occurs in one imaging unit 12031A, the other imaging unit 12031B may be operated. Furthermore, in a case where the vehicle control system 12000 includes, for example, a distance measuring unit (e.g., a light detection and ranging (LIDAR) device or a time of flight (TOF) image sensor that detects the distance to the object, in addition to the imaging unit 12031, the distance measuring unit may be activated when the trouble occurs in the imaging unit 12031A. In this case, since at least the distance to the object can be detected, it is possible to prevent accidents caused by erroneous detection due to the trouble of the imaging unit 12031.

(Operation of Imaging Device Mounted On Vehicle)

In the vehicle, a microcontroller such as an engine control unit (ECU) or the like controls the operation of the vehicle. In a case where the imaging device is mounted on the vehicle, the ECU also controls the operation of the imaging device. Hereinafter, the operation of the imaging device mounted on the vehicle will be described.

Figure 51:
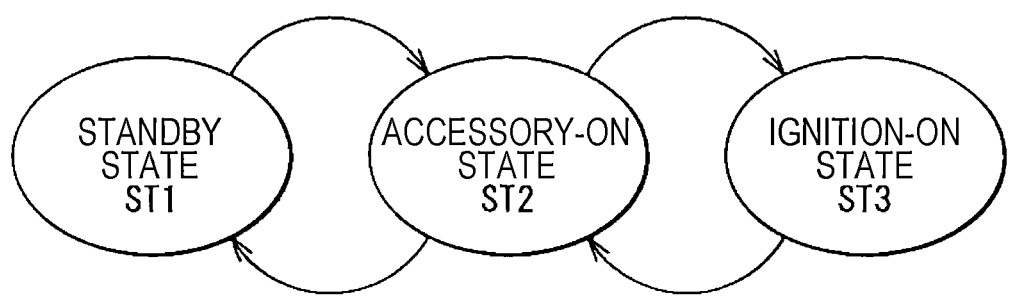
FIG. 51 is a state transition diagram illustrating the transition of an operation state of a vehicle.

FIG. 51 illustrates the transition of the operating state of the vehicle. The operating state of the vehicle generally includes a standby state ST1, an accessory-on state ST2, and an ignition-on state ST3. The standby state ST1 is a state in which most functions except for some functions such as the door lock function and the anti-theft function are in the off-state. In the accessory-on state ST2, electronic devices other than the vehicle drive system can operate. In the ignition-on state ST3, all components including the vehicle drive system can operate. In a case where the operation state of the vehicle is the standby state ST1, for example, the user gives an instruction to the vehicle by turning a key or operating an ignition switch to change the operation state from the standby state ST1 to the accessory-on state ST2, and then from the accessory-on state ST2 to the ignition-on state ST3. Similarly, in a case where the operating state of the vehicle is the ignition-on state ST3, when, for example, the user gives an instruction to the vehicle to change the operation state from the ignition-on state ST3 to the accessory-on state ST2 and then from the accessory-on state ST2 to the standby state ST1.

Figure 52:
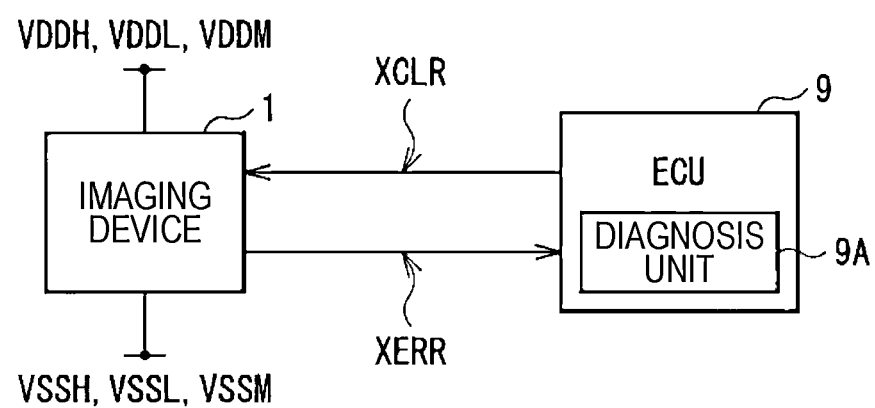
FIG. 52 is an explanatory diagram illustrating exchange of the error flag signal between the imaging device and an ECU.

FIG. 52 illustrates the exchange of the error flag signal XERR between the imaging device 1 and the ECU 9. The ECU 9 supplies the clear signal XCLR to the imaging device 1, and the imaging device 1 receives the clear signal XCLR. The clear signal XCLR is a so-called negative logic signal that goes low in the case of stopping the operation of the imaging device 1 and goes high in the case of operating the imaging device 1. In addition, the imaging device 1 supplies an error flag signal XERR to the ECU 9, and the ECU 9 receives this error flag signal XERR. Then, on the basis of the error flag signal XERR, the ECU 9 performs processing according to the trouble when the trouble occurs in the imaging device 1.

The ECU 9 includes a diagnosis unit 9A. The diagnosis unit 9A diagnoses whether or not the voltage of the error flag signal XERR is fixed in a period during which the imaging device 1 performs the startup operation. Furthermore, the diagnosis unit 9A also has a function of detecting, in a case where the error flag signal XERR is at the high level after the imaging device 1 starts the imaging operation, a voltage value of the error flag signal XERR and diagnosing whether or not the voltage value is a desired voltage corresponding to the power supply voltage VDDM.

Here, the ECU 9 corresponds to a specific example of the "monitoring device" in the present disclosure. The clear signal XCLR corresponds to a specific example of "activation signal" in the present disclosure.

Figure 53:
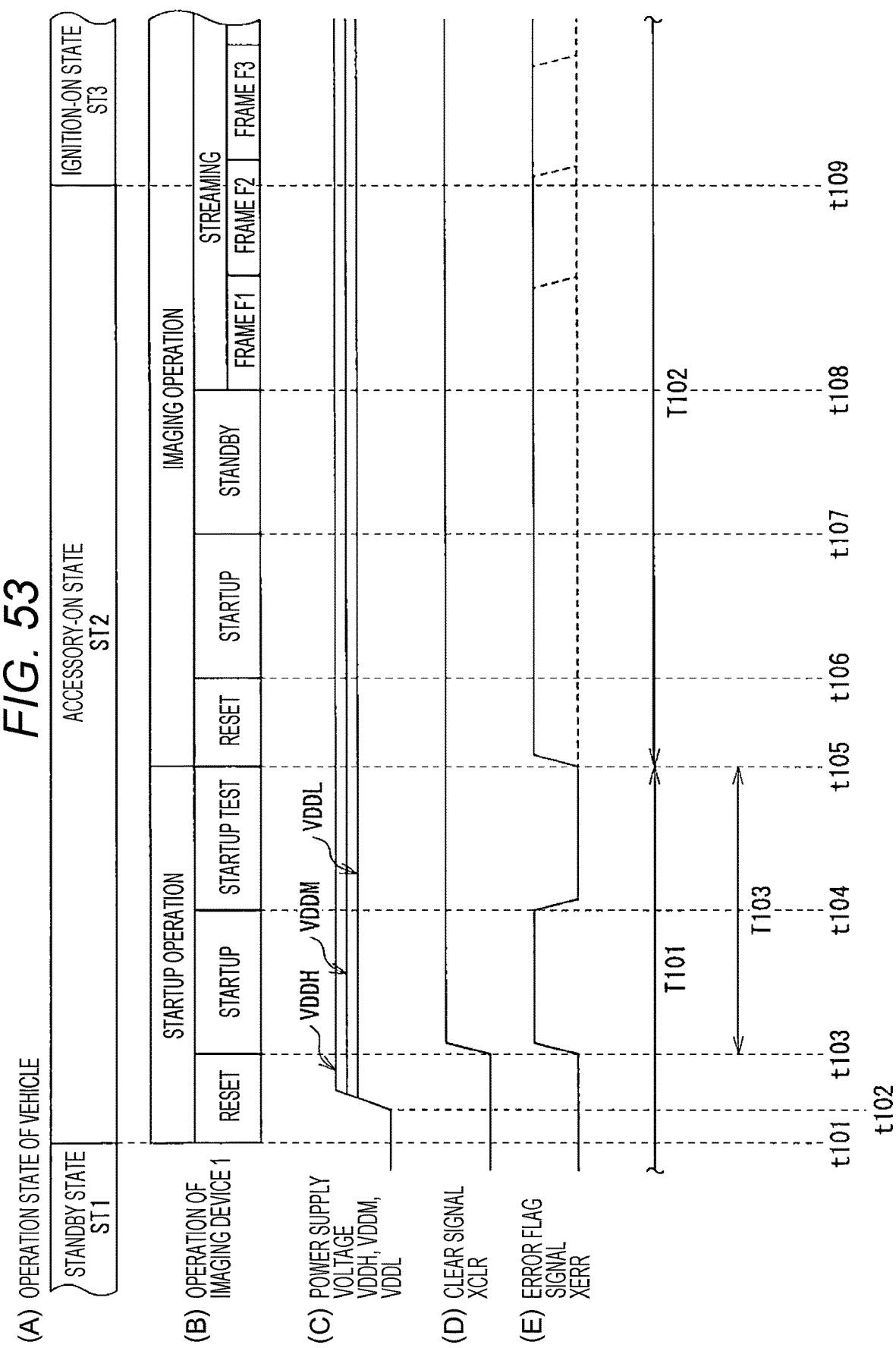
FIG. 53 is a timing chart of an operation example of the imaging device.

FIG. 53 illustrates an example of the operation of the imaging device 1 in the case where the operation state of the vehicle changes from the standby state ST1 to the ignition-on state ST3, in which (A) indicates the operation state of the vehicle, (B) indicates the operation state of the imaging device 1, and (C) indicates the waveforms of the power supply voltages VDDH, VDDM and VDDL, (D) indicates the waveform of the clear signal XCLR, and (E) indicates the waveform of the error flag signal XERR.

For example, when the user gives an instruction to the vehicle by turning the key or operating the ignition switch, the operation state of the vehicle changes from the standby state ST1 to the accessory-on state ST2 at timing t101 ((A) in FIG. 53). As a result, the ECU 9 causes the imaging device 1 to start the start amplifier operation ((B) in FIG. 53).

Next, at timing t102, three power supply voltages VDDH, VDDM, and VDDL are supplied to the imaging device 1 ((C) in FIG. 53).

Next, at timing t103, the ECU 9 changes the clear signal XCLR from a low level to a high level ((D) in FIG. 53). As a result, the imaging device 1 starts up ((B) in FIG. 53), reads data used for the start-up test from, for example, a one-time programmable (OTP) memory provided in the imaging device 1 during the period between timing t103 to t104, and develops the data in a register to initialize a static random access memory (SRAM) included in the signal processing unit 60. In this period, the imaging device 1 sets the error flag signal XERR to a high level ((E) in FIG. 53).

Next, the imaging device 1 performs a start-up test during the period between timing t104 to t105 ((B) in FIG. 53). Specifically, for example, the imaging device 1 performs self-diagnosis of the signal processing unit 60 and self-diagnosis of the SRAM included in the signal processing unit 60. In this period, the imaging device 1 sets the error flag signal XERR to a low level ((E) in FIG. 53).

Next, the imaging device 1 starts the imaging operation at timing t105. The imaging device 1 changes the error flag signal XERR from the low level to the high level in the case where no trouble is detected in the startup test performed immediately before. Note that, in the start-up test, in a case where the trouble is detected, the imaging device 1 maintains the error flag signal XERR at the low level as indicated by a broken line at (E) in FIG. 53.

Next, the imaging device 1 starts up again at timing t106 ((B) in FIG. 53), reads data used for the imaging operation from the OTP memory provided in the imaging device 1 during the period between timing t106 to t107, develops the data in the register, and initializes the SRAM included in the signal processing unit 60, for example.

Next, the imaging device 1 stands by in the period from timing t107 to t108. The length of this period is set to the length of time until various analog circuits of the imaging device 1 comes to a state where they can operate normally.

Then, the imaging device 1 starts streaming after timing t108. In the streaming, the diagnosis unit 61 of the imaging device 1 performs self-diagnosis as described above during the blanking period T20. Then, in a case where the diagnosis unit 61 detects trouble, the error flag signal XERR is changed from the high level to the low level as indicated by the broken line at (E) in FIG. 53.

Then, at timing t109 after the imaging device 1 starts streaming, the operation state of the vehicle changes from the accessory-on state ST2 to the ignition-on state ST3 ((A) in FIG. 53).

In this sequence, the ECU9 does not make an error determination on the basis of the error flag signal XERR during the period until timing t105 (determination suspension period T101). In other words, in this example, the imaging device 1 sets the error flag signal XERR to the high level during the period between timing t103 to t104 and sets the error flag signal XERR to the low level during the period between timing t104 to t105. In these periods, the ECU9 determines that no trouble has occurred in the imaging device 1.

In addition, in the timing from t103 to t105 (fixed diagnosis period T103), the diagnosis unit 9A of the ECU 9 diagnoses whether or not the voltage of the error flag signal XERR is fixed. Specifically, in a case where the error flag signal XERR is high level in the period from timing t103 to t104 and the error flag signal XERR is low level during the period between timing t104 to t105, the diagnosis unit 9A diagnoses that the voltage of XERR is not fixed. In addition, in a case where the error flag signal XERR maintains the low level or the high level over the period from timing t103 to t105, the diagnosis unit 9A determines that the voltage of the error flag signal XERR is fixed. In a case where the voltage of the error flag signal XERR is fixed, the diagnosis unit 9A performs processing according to the trouble.

Then, the ECU 9 makes an error determination on the basis of the error flag signal XERR in the period after timing t105 (determination period). When the trouble occurs in the imaging device 1, the ECU 9 performs processing according to the trouble.

Furthermore, the diagnosis unit 9A detects the voltage value (high-level voltage value) of the error flag signal XERR, when the error flag signal XERR is high during the period after timing t105 (determination period), and diagnoses whether or not the high level voltage value is a desired voltage corresponding to the power supply voltage VDDM. Specifically, the diagnosis unit 9A checks whether or not the high-level voltage value is within a predetermined voltage range corresponding to the power supply voltage VDDM. In a case where the high-level voltage value is not the desired voltage corresponding to the power supply voltage VDDM, the ECU 9 performs processing according to the trouble.

Although the present technology has been described with reference to the embodiment and modifications and specific application examples thereof, the present technology is not limited to these embodiments and the like, and various modifications are possible.

For example, the imaging device 1 is not limited to the configuration illustrated in FIG. 1 and so on, and may be modified as appropriate.

Note that the effects mentioned in this specification are only examples and not limited, and other effects may be obtained.

Note that the present technology may also be provided in the following configuration.

(A1) An imaging device, including
an imaging unit capable of performing an imaging operation,
a diagnosis unit capable of performing diagnosis processing of the imaging unit, and
an output unit capable of outputting a flag signal corresponding to a result of the diagnosis processing and setting the flag signal to a ground level in a case where the result of the diagnosis processing indicates an error.

(A2) The imaging device according to (A1) above, in which
the output unit is operable at a first power supply voltage, and
the flag signal is changeable between the ground level and a power supply voltage level corresponding to the first power supply voltage.

(A3) The imaging device according to (A2) above, in which the diagnosis unit is operable at a second power supply voltage.

(A4) The imaging device according to (A2) or (A3) above, in which the output unit is capable of setting the flag signal to the power supply voltage level in a first sub-period within a first period starting from activation timing of the imaging device, and setting the flag signal to the ground level in a second sub-period within the first period.

(A5) The imaging device according to (A4) above, in which the first sub-period is a period starting from the activation timing.

(A6) The imaging device according to (A4) or (A5) above, further including an image processing unit capable of performing predetermined image processing on the basis of a captured image obtained by the imaging unit, in which the image processing unit performs self-diagnosis in the first period.

(A7) The imaging device according to any one of (A4) to (A6) above, further including an image processing unit capable of performing predetermined image processing on the basis of the captured image obtained by the imaging unit, in which
the imaging unit is capable of performing the imaging operation in a second period after the first period has elapsed,
the image processing unit is capable of performing the predetermined image processing on the basis of the captured image in the second period,
the diagnosis unit is capable of performing the diagnosis processing in the second period, and
the output unit is capable of outputting the flag signal corresponding to the result of the diagnosis processing in the second period.

(A8) An imaging system, including:
an imaging device; and
a monitoring device capable of monitoring an operation of the imaging device, in which
the imaging device includes:
an imaging unit capable of performing an imaging operation;
a diagnosis unit capable of performing diagnosis processing of the imaging unit; and an output unit capable of outputting a flag signal in accordance with a result of the diagnosis processing and setting the flag signal to a ground level in a case where the result of the diagnosis processing indicates an error, and
the monitoring device is capable of monitoring the operation of the imaging device on the basis of the flag signal.

(A9) The imaging system according to (A8) above, in which
the monitoring device is capable of generating an activation signal for activating the imaging device,
the imaging device is capable of being activated in accordance with the activation signal,
the output unit is operable at a first power supply voltage,
the flag signal is changeable between the ground level and a power supply voltage level corresponding to the first power supply voltage,
the output unit is capable of setting the flag signal to the power supply voltage level in a first sub-period within a first period starting from activation timing of the imaging device, and setting the flag signal to the ground level in a second sub-period within the first period, and
the monitoring device is capable of stopping monitoring the operation of the imaging device based on the flag signal in a period before the activation timing and in the first period, while diagnosing a change of the flag signal in the first period.

(A10) The imaging system according to (A9) above, in which
the imaging device further includes an image processing unit capable of performing predetermined image processing on the basis of a captured image obtained by the imaging unit,
the imaging unit is capable of performing the imaging operation in a second period after the first period has elapsed,
the image processing unit is capable of performing predetermined image processing on the basis of the captured image in the second period,
the diagnosis unit is capable of performing the diagnosis processing in the second period,
the output unit is capable of outputting the flag signal corresponding to the result of the diagnosis processing in the second period, and
the monitoring device is capable of monitoring the operation of the imaging device on the basis of the flag signal in the second period.

(A11) The imaging system according to (A10) above, in which
the output unit is operable at a first power supply voltage, and
the monitoring device is capable of diagnosing a voltage of the flag signal in a case where the flag signal is at a high level in the second period.

(B1) An imaging device, comprising:
an imaging sensor configured to generate image data;
a diagnosis circuit configured to perform diagnosis processing for the imaging sensor; and
an output circuit configured to output a flag signal corresponding to a result of the diagnosis processing,
wherein the flag signal is set to a ground level signal in response to the result of the diagnosis processing indicating an error.

(B2) The imaging device according to (B1), wherein:
the output circuit is configured to be coupled to a first power supply voltage, and
the flag signal is changeable between the ground level signal and a first signal corresponding to the first power supply voltage.

(B3) The imaging device according to (B2), wherein the flag signal is set to the first signal in response to the result of the diagnosis processing indicating proper operation.

(B4) The imaging device according to (B2) or (B3), wherein
the output circuit is configured to output the ground level signal when the first power supply voltage is not supplied to the output circuit.

(B5) The imaging device according to any one of (B1) to (B4) described above, wherein
the flag signal comprises a digital signal.

(B6) The imaging device according to any one of (B1) to (B4) described above, wherein
the flag signal comprises an analog signal.

(B7) The imaging device according to any one of (B1) to (B6) described above, wherein
the flag signal is output through a dedicated terminal.

(B8) The imaging device according to any one of (B2) to (B4) described above, wherein
the diagnosis circuit is configured to be coupled to a second power supply voltage.

(B9) The imaging device according to any one of (B2) to (B4) described above, wherein
the output circuit is configured to output the first signal during a first period after an activation time corresponding to when the imaging device is changed to a powered on state, and
the output circuit is configured to output the ground level signal during a second period immediately after the first period.

(B10) The imaging device according to (B9), wherein
the first period begins at the activation time.

(B11) The imaging device according to (B9), wherein
the diagnosis circuit is configured to determine whether the flag signal is changeable between the ground level signal and the first signal during the first and second periods.

(B12) The imaging device according to (B11), wherein
the output circuit is configured to output the first signal during a third period after the second period if the flag signal is changeable between the ground level signal and the first signal during the first and second periods, and
the output circuit is configured to output the ground level signal in the third period if the flag signal is not changeable between the ground level signal and the first signal during the first and second periods.

(B13) The imaging device according to (B9), further comprising:
an image processor configured to perform predetermined image processing based on the image data, wherein
the image processor performs self-diagnosis during the first period or the second period.

(B14) The imaging device according to (B13), wherein
the output circuit is configured to output the first signal during a third period after the second period in response to the self-diagnosis not indicating a problem, and
the output circuit is configured to output the ground level signal in the third period in response to the self-diagnosis indicating a problem.

(B15) The imaging device according to (B9), wherein
the imaging sensor is configured to generate the image data during a third period after the second period,
the diagnosis circuit is configured to perform the diagnosis processing during the third period, and
the output circuit is configured to output the flag signal corresponding to the result of the diagnosis processing during the third period.

(B16) An imaging system, comprising:
an imaging device; and
a monitoring device configured to monitor an operation of the imaging device, wherein the imaging device includes:
an imaging sensor configured to generate image data;
a diagnosis circuit configured to perform diagnosis processing for the imaging sensor;
and
an output circuit configured to output a flag signal corresponding to a result of the diagnosis processing,
wherein the flag signal is set to a ground level signal in response to the result of the diagnosis processing indicating an error, and
wherein the monitoring device is configured to monitor the operation of the imaging device based on the flag signal.

(B17) The imaging system according to (B16), wherein
the monitoring device is configured to generate an activation signal for activating the imaging device,
the imaging device is configured to be activated based on the activation signal,
the output circuit is configured to be coupled to a first power supply voltage,
the flag signal is changeable between the ground level signal and a first signal corresponding to the first power supply voltage,
the output circuit is configured to output the first signal during a first period after an activation time corresponding to when the imaging device is changed to a powered on state, and
the output circuit is configured to output the ground level signal during a second period immediately after the first period,
the monitoring device is configured to stop monitoring the operation of the imaging device based on the flag signal during a period before the activation time,
the monitoring device is configured to monitor a change of the flag signal during the first and second periods.

(B18) The imaging system according to (B17), wherein
the imaging sensor is configured to generate the image data during a third period after the second period,
the diagnosis circuit is configured to perform the diagnosis processing during the third period,
the output circuit is configured to output the flag signal corresponding to the result of the diagnosis processing during the third period, and
the monitoring device is configured to monitor the operation of the imaging device based on the flag signal outputted by the output circuit during the third period.

(B19) The imaging system according to (B18), wherein
the imaging device and the monitoring device are equipped on a vehicle.

(B20) A method comprising:
performing diagnosis processing for an imaging sensor configured to generate image data; and
outputting a flag signal corresponding to a result of the diagnosis processing, wherein the flag signal is set to a ground level signal in response to the result of the diagnosis processing indicating an error.

It should be understood by those skilled in the art that various modifications, combinations, sub-combinations and alterations may occur depending on design requirements and other factors insofar as they are within the scope of the appended claims or the equivalents thereof.

REFERENCE SIGNS LIST 1, 1E, 1F, 2 Imaging device
9 ECU
9A Diagnosis unit
10, 90 Pixel array
21, 91 Scanning unit
22, 23 Signal generation unit
30A, 30B Voltage generation unit
31 Resistance circuit section
32 Selector
33 Temperature sensor
34 Selector
40, 40S, 40SC, 40SD, 40N, 40NC, 40ND Readout unit
41, 42 Capacitance element
44 Current source
45 Comparator
46 Counter
47 Latch
50, 98 Control unit
51 Reference signal generation unit
60, 99 Signal processing unit
61 Diagnosis unit
70 Processing unit
71 Average value calculation unit
72 Offset amount calculation unit
73 Average value calculation unit
74 Correction value calculation unit
75 Correction unit
80 Processing unit
81 Row average value calculation unit
82 Determination unit
83 Horizontal streak correction unit
84 Determination unit
85 Vertical streak correction unit
86 Selection control unit
87 Selector
100, 100S, 100S0, 100S1, 100S2, 100S3, 100N, 100N0, 100N1, 100N2, 100N3 Bus line
201, 202 Semiconductor substrate
201A to 201C, 202A to 202C Electrode region
203 Via
300 Semiconductor substrate
301 Peripheral circuit unit
302, 303 Terminal section
401, 402 Semiconductor substrate
403 Connecting portion
A, B Bit pattern
ADC AD conversion unit
AMP, FCG, FDG, RST, SEL, TG, TGL, TGS Transistor
AR Area
BF Buffer
BFOUT Output buffer
CLK Clock signal
CMP Signal
CNT Count value
CODE, CODE1 to CODE8 Digital code
DATA0, DATA0S, DATA1S, DATA2S, DATA3S, DATA0N, DATA1N, DATA2N,
DATA3N, DATA Image signal
D1 Accumulation start drive
D2 Reading drive
F Transfer order
FC Capacitance element
FCGL, FDGL, RSTL, SELL, TGLL, TGSL, VMAL, VMBL Control line
FD Floating diffusion
H Horizontal period
PD, PD1, PD2 Photodiode
P Pixel
P1, P1A, P1B, P1C, P1D Imaging pixel
P2, P2A, P2B Light shielding pixel
P3, P3A, P3B, P4, P4A, P4B Dummy pixel
RES Diagnosis result
SRST, SSEL, SSW, SUN, STG, VMA, VMB Control signal
REF Reference signal
R1 Regular pixel region
R21, R22 Light shielding pixel region
R3, R4 Dummy pixel region
SGL Signal line
SIG Signal
SW Switch portion
ST1 Standby state
ST2 Accessory-on state
ST3 Ignition-on state
TD D-phase period
TP P-phase period
TOUT Output terminal
T1 to T8 Conversion period
T10 Accumulation period
T20 Blanking period
T101 Determination suspension period
T102 Determination period
T103 Fixed diagnosis period
VAL1 to VAL4 Pixel value
VDDH, VDDL, VDDM Power supply voltage
VSSH, VSSL, VSSM Ground voltage
VP1 to VP8 Pixel voltage
Vpix Pixel voltage
Vreset Reset voltage
Vtemp, V1 to V7, V10 to V14 Voltage
XCLR Clear signal
XERR Error flag signal
XERR1 Signal
XHS Horizontal synchronization signal

The invention claimed is:
1. An imaging device, comprising:
an imaging sensor including a pixel array and a processor, the processor being configured to process a pixel signal corresponding to an image captured by the pixel array to generate an image signal and a diagnostic signal based on the pixel signal, the image signal and the diagnostic signal comprising image data of the pixel signal;
a diagnosis circuit configured to perform diagnosis processing for the imaging sensor based on the diagnostic signal; and
an output circuit configured to output a flag signal corresponding to a result of the diagnosis processing, wherein:
the flag signal is set to a ground level signal if the result of the diagnosis processing indicates an error,
the flag signal is changeable between the ground level signal and a first signal corresponding to a first power supply voltage, and
the output circuit is configured to output the first signal during a first period after an activation time corresponding to when the imaging device is changed to a powered on state, and the output circuit is config- ured to output the ground level signal during a second period after the first period.

2. The imaging device according to claim 1, wherein the output circuit is configured to be coupled to the first power supply voltage.

3. The imaging device according to claim 2, wherein the flag signal is set to the first signal in response to the result of the diagnosis processing indicating proper operation.

4. The imaging device according to claim 2, wherein the output circuit is configured to output the ground level signal when the first power supply voltage is not supplied to the output circuit.

5. The imaging device according to claim 2, wherein the diagnosis circuit is configured to be coupled to a second power supply voltage.

6. The imaging device according to claim 1, wherein the flag signal comprises a digital signal.

7. The imaging device according to claim 1, wherein the flag signal comprises an analog signal.

8. The imaging device according to claim 1, wherein the flag signal is output through a dedicated terminal.

9. The imaging device according to claim 1, wherein the first period begins at the activation time.

10. The imaging device according to claim 1, wherein the diagnosis circuit is configured to determine whether the flag signal is to be changed between the ground level signal and the first signal during the first and second periods.

11. The imaging device according to claim 10, wherein:
the output circuit is configured to output the first signal during a third period after the second period if the flag signal is determined to be changed between the ground level signal and the first signal during the first and second periods, and
the output circuit is configured to output the ground level signal in the third period if the flag signal is determined not to be changed between the ground level signal and the first signal during the first and second periods.

12. The imaging device according to claim 1, further comprising:
an image processor configured to perform predetermined image processing based on the image data, wherein the image processor performs a self-diagnosis during the first period or the second period.

13. The imaging device according to claim 12, wherein the output circuit is configured to output the first signal during a third period after the second period in response to the self-diagnosis not indicating a problem, and the output circuit is configured to output the ground level signal in the third period in response to the self-diagnosis indicating a problem.

14. The imaging device according to claim 1, wherein:
the imaging sensor is configured to generate the image signal and the diagnostic signal comprising the image data during a third period after the second period,
the diagnosis circuit is configured to perform the diagnosis processing during the third period, and
the output circuit is configured to output the flag signal corresponding to the result of the diagnosis processing during the third period.

15. An imaging system, comprising:
an imaging device; and
a microcomputer configured to receive an output from the imaging device,
wherein the imaging device includes:
an imaging sensor including a pixel array and a processor, the processor being configured to process a pixel signal corresponding to an image captured by the pixel array to generate an image signal and a diagnostic signal based on the pixel signal, the image signal and the diagnostic signal comprising image data of the pixel signal;
a diagnosis circuit configured to perform diagnosis processing for the imaging sensor based on the diagnostic signal; and
an output circuit configured to output a flag signal corresponding to a result of the diagnosis processing,
wherein the flag signal is set to a ground level signal if the result of the diagnosis processing indicates an error,
wherein the flag signal is changeable between the ground level signal and a first signal corresponding to a first power supply voltage,
wherein the output circuit is configured to output the first signal during a first period after an activation time corresponding to when the imaging device is changed to a powered on state, and the output circuit is configured to output the ground level signal during a second period after the first period, and
wherein the microcomputer is configured to monitor an operation of the imaging device based on the flag signal.

16. The imaging system according to claim 15, wherein:
the microcomputer is configured to generate an activation signal for activating the imaging device,
the imaging device is configured to be activated based on the activation signal,
the output circuit is configured to be coupled to the first power supply voltage,
the microcomputer is configured to stop monitoring the operation of the imaging device based on the flag signal during a period before the activation time, and
the microcomputer is configured to monitor a change of the flag signal during the first and second periods.

17. The imaging system according to claim 16, wherein:
the imaging sensor is configured to generate the image signal and the diagnostic signal comprising the image data during a third period after the second period,
the diagnosis circuit is configured to perform the diagnosis processing during the third period,
the output circuit is configured to output the flag signal corresponding to the result of the diagnosis processing during the third period, and
the microcomputer is configured to monitor the operation of the imaging device based on the flag signal outputted by the output circuit during the third period.

18. The imaging system according to claim 17, wherein the imaging device and the microcomputer are equipped on a vehicle.

19. A method of an imaging device, comprising:
processing a pixel signal corresponding to an image captured by a pixel array of an imaging sensor to generate an image signal and a diagnostic signal from the pixel signal;
performing diagnosis processing for the imaging sensor based on the diagnostic signal; and
outputting a flag signal corresponding to a result of the diagnosis processing, wherein:
the flag signal is set to a ground level signal if the result of the diagnosis processing indicates an error,
the flag signal is changeable between the ground level signal and a first signal corresponding to a first power supply voltage, and
the outputting outputs the first signal during a first period after an activation time corresponding to when the imaging device is changed to a powered on state, and outputs the ground level signal during a second period after the first period.

20. An imaging device, comprising:

an imaging sensor configured to generate an image signal and a diagnostic signal based on a pixel signal corresponding to an image captured by a pixel array of the imaging sensor, the image signal and the diagnostic signal comprising image data of the pixel signal;

a diagnosis circuit configured to perform diagnosis processing for the imaging sensor based on the image data; and an output circuit configured to be coupled to a first power supply voltage and to output a flag signal corresponding to a result of the diagnosis processing, wherein:

the flag signal is changeable between a ground level signal and a first signal corresponding to the first power supply voltage, the flag signal is set to the ground level signal if the result of the diagnosis processing indicates an error, the flag signal is set to the ground level signal if the result of the diagnosis processing indicates the first power supply voltage is not correctly supplied to the output circuit, the flag signal is changeable between the ground level signal and a first signal corresponding to a first power supply voltage, and the output circuit is configured to output the first signal during a first period after an activation time corresponding to when the imaging device is changed to a powered on state, and the output circuit is configured to output the ground level signal during a second period after the first period.

21. The imaging device according to claim 20, wherein:

the image sensor is disposed on a first semiconductor substrate, the diagnosis circuit and the output circuit are disposed on a second semiconductor substrate stacked on the first semiconductor substrate, and the diagnosis circuit is configured to diagnose an electrical connection between the first and second semiconductor substrates.

* * * * *